United States Patent [19]

Taussig et al.

[11] Patent Number: 5,008,518
[45] Date of Patent: Apr. 16, 1991

[54] DATA GATHERING SYSTEM INTERFACE

[75] Inventors: Andrew P. Taussig, Eugene; Blake L. Isaacs, Springfield, both of Oreg.

[73] Assignee: Spectra-Physics, Inc., San Jose, Calif.

[21] Appl. No.: 328,177

[22] Filed: Mar. 24, 1989

[51] Int. Cl.[5] .......................... G06K 7/14; G07G 1/12
[52] U.S. Cl. ..................................... 235/383; 235/462; 186/61; 177/4
[58] Field of Search ............... 235/383, 385, 462, 472; 364/405; 177/3, 4, 25.15, 50; 186/60, 61

[56] References Cited

U.S. PATENT DOCUMENTS

| | | | |
|---|---|---|---|
| 4,020,924 | 5/1977 | Conrotto et al. | 186/61 |
| 4,365,148 | 12/1982 | Whitney | 235/383 |
| 4,661,908 | 4/1987 | Hamano et al. | 235/383 X |
| 4,679,154 | 7/1987 | Blanford | 235/383 X |
| 4,700,656 | 10/1987 | Cone et al. | 235/462 X |
| 4,716,281 | 12/1987 | Amacher et al. | 235/383 |
| 4,855,581 | 8/1989 | Mertel et al. | 235/462 |
| 4,879,650 | 11/1989 | Kurimoto et al. | 364/405 |
| 4,894,522 | 1/1990 | Elliott | 235/462 X |

Primary Examiner—Stuart S. Levy
Assistant Examiner—Steven M. du Bois
Attorney, Agent, or Firm—Killworth, Gottman, Hagan & Schaeff

[57] ABSTRACT

A data gathering system for use in a checkout counter to determine information relating to products to be purchased and to provide such information to a cash register system includes a scale supported within the checkout counter for determining weights of products presented to the data gathering system. The scale includes a subplatter located below the upper surface of the checkout counter. An optical scanning arrangement is supported on the subplatter for reading coded labels on the products. A common interface circuit is responsive to both the scale and the optical scanning arrangement, for providing weight data and coded label data to the cash register system.

10 Claims, 5 Drawing Sheets

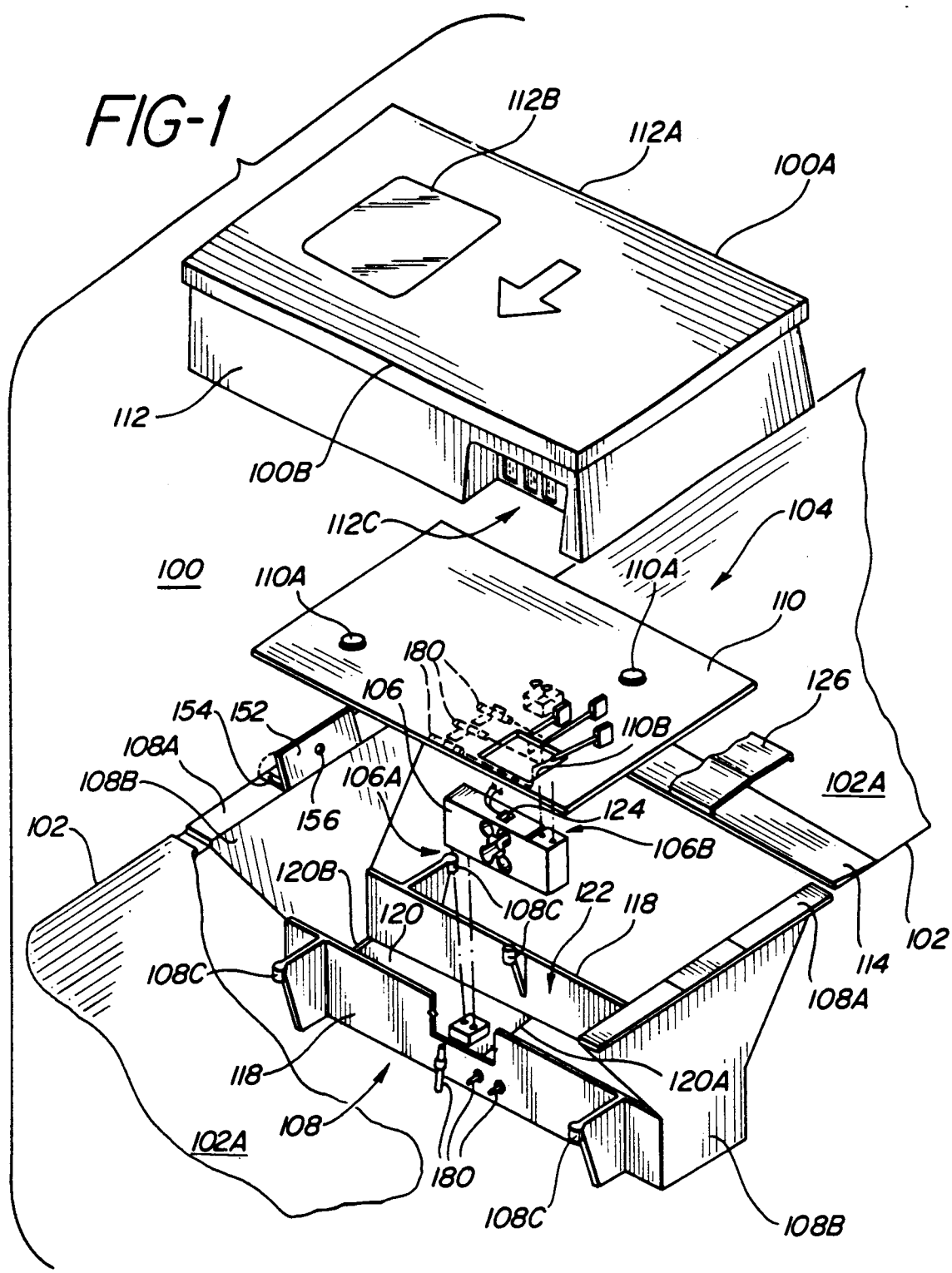

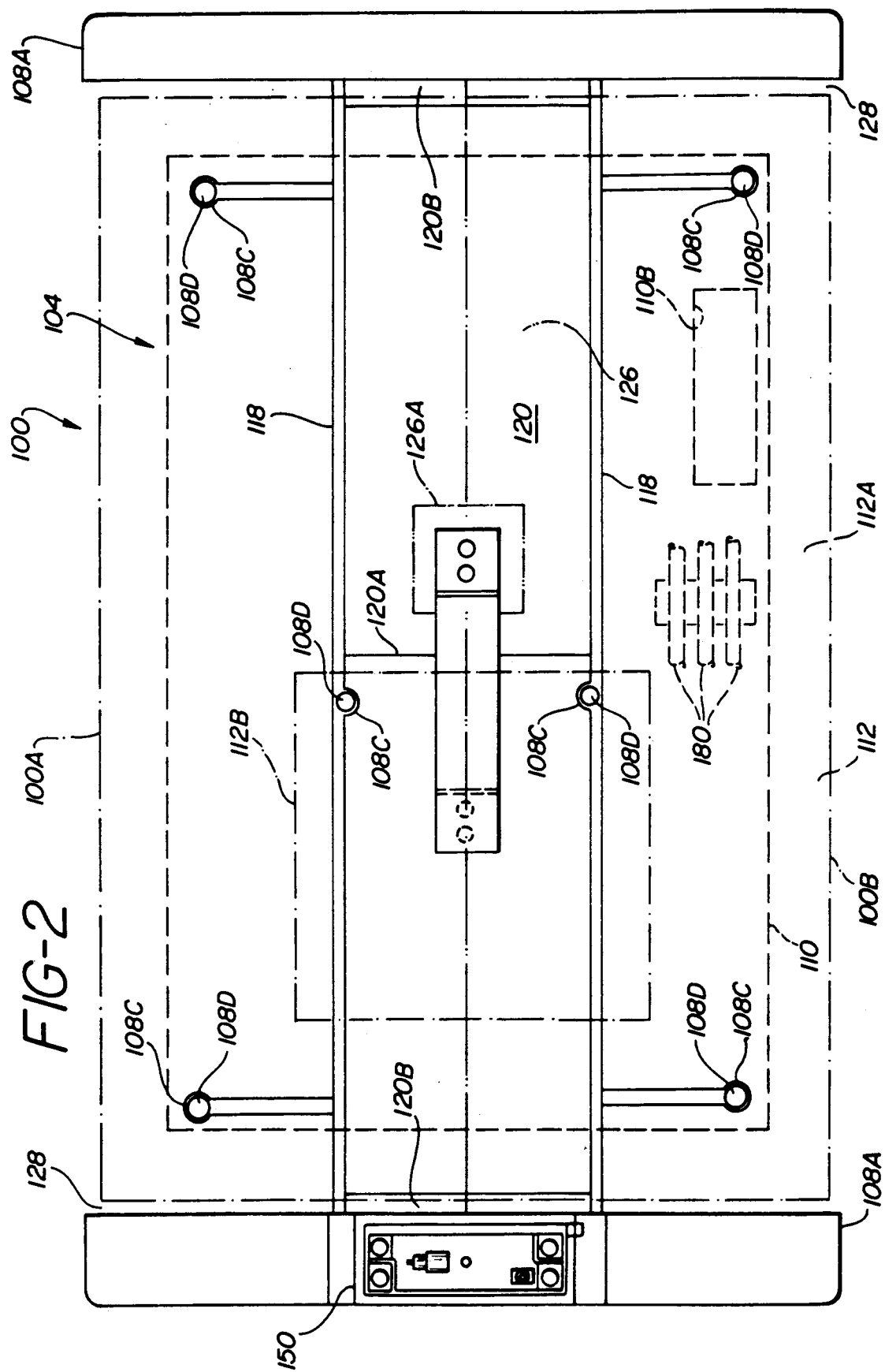

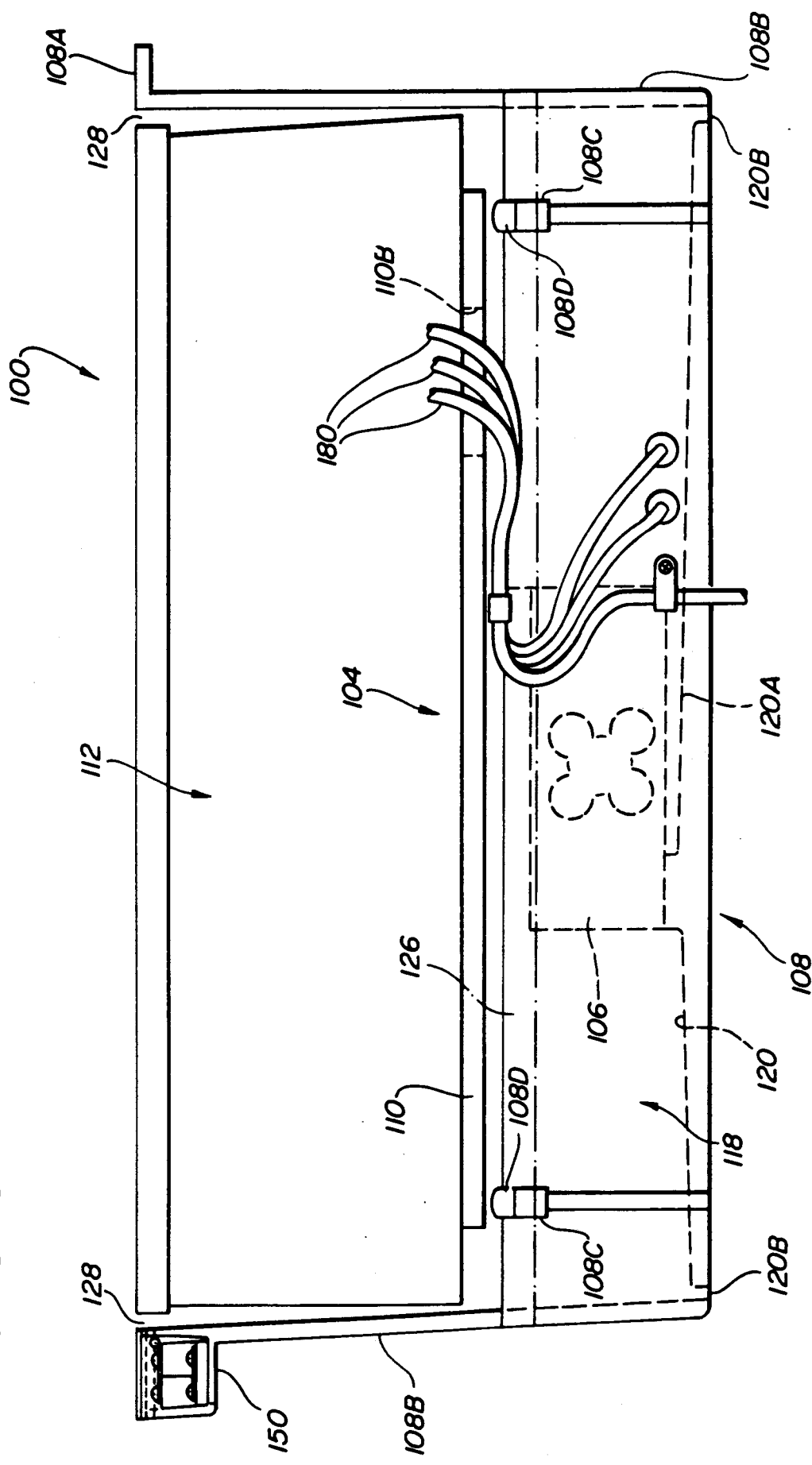

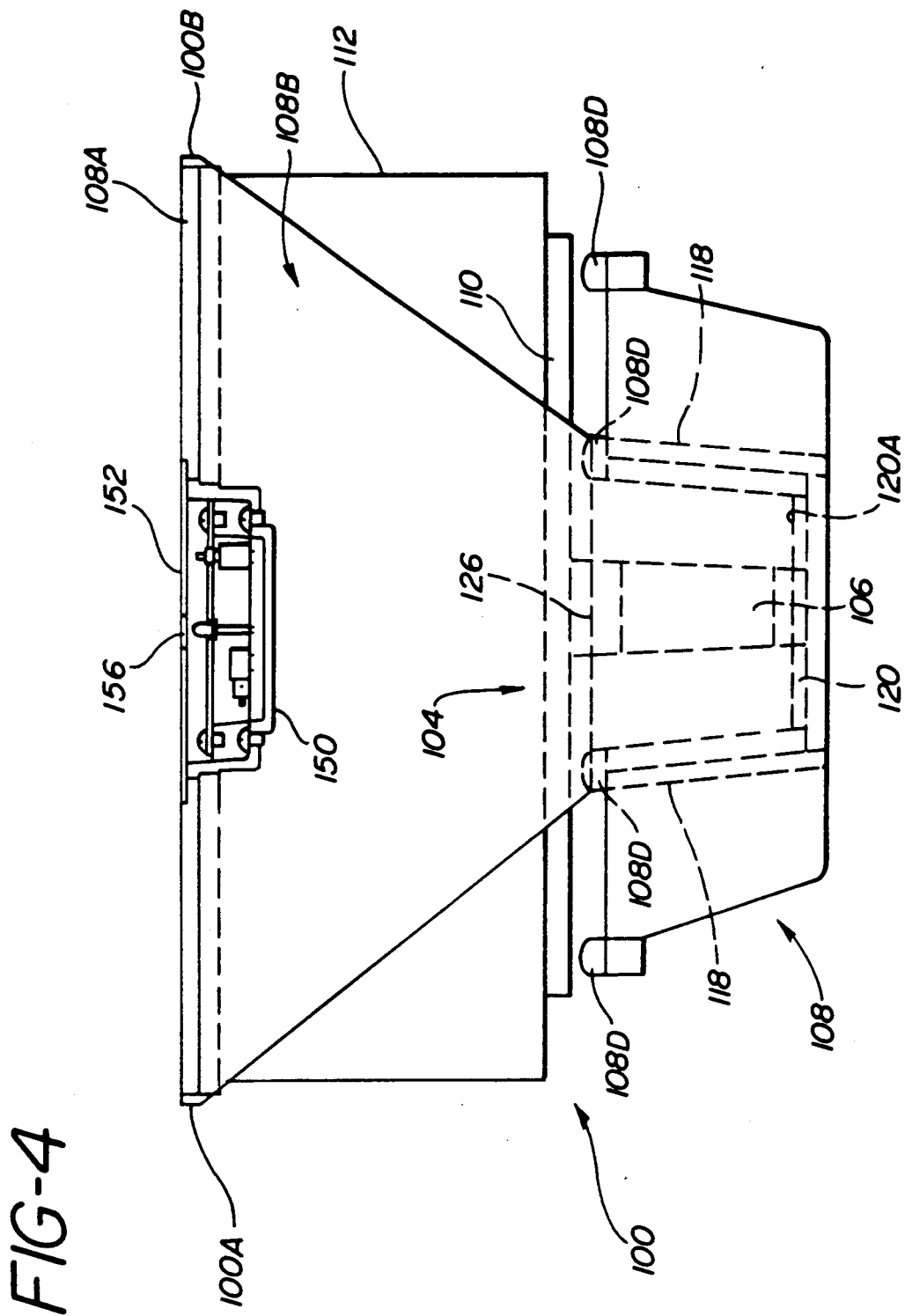

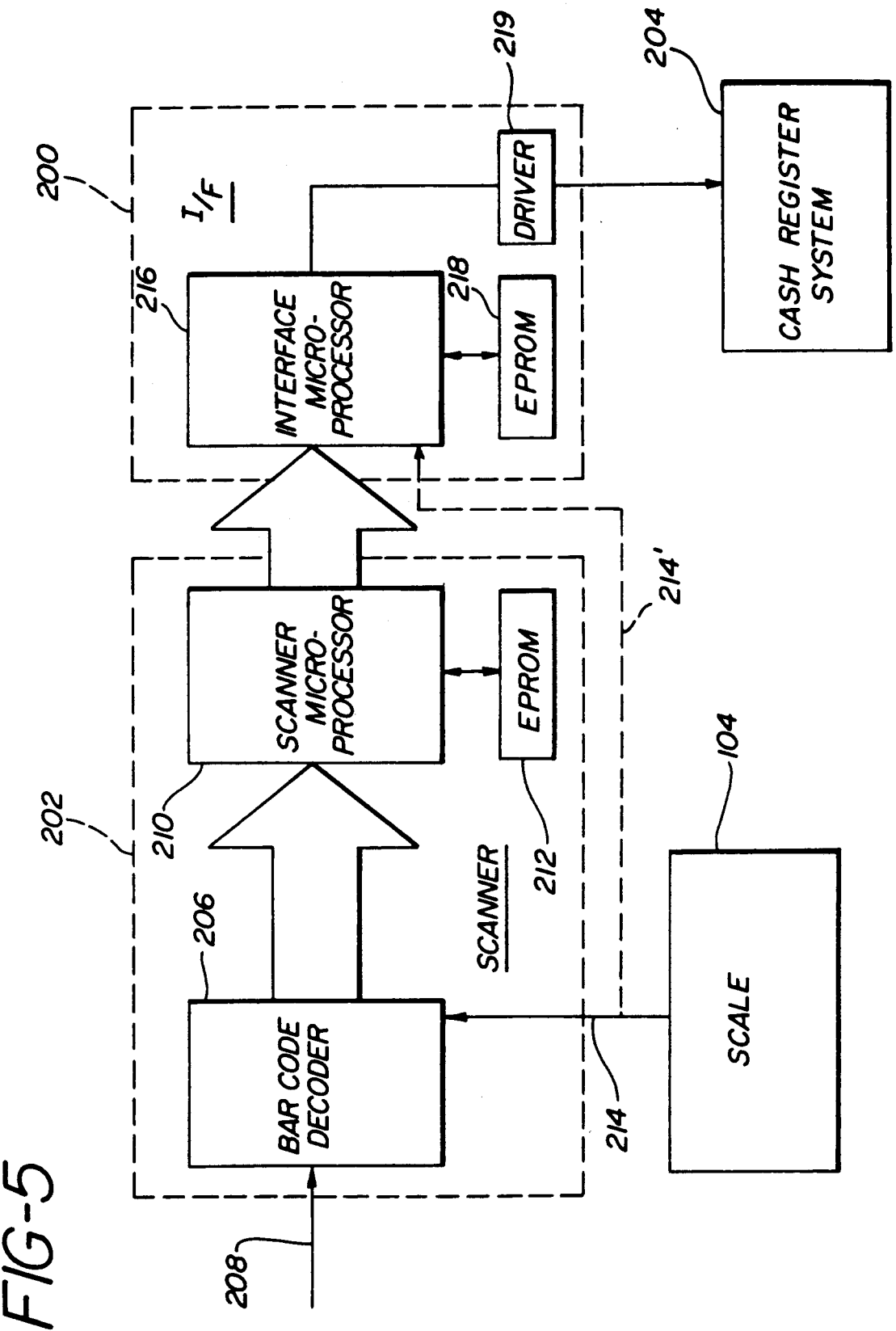

DATA GATHERING SYSTEM INTERFACE

CROSS REFERENCE TO RELATED APPLICATIONS

The present application is related to the following U.S. Patent Applications which are assigned to the same assignee as the present application: Method and Apparatus for Mounting Data Gathering System (07/328,229); Spill Control Mounting for Data Gathering System (07/328,230); Scale Calibration/Zeroing in Data Gathering System (07/328,188); and Scale Having Platter Including Removable Optical Scanner (07/328,178).

BACKGROUND OF THE INVENTION

The present invention relates generally to data gathering systems for use at point of sale checkout counters and, more particularly, to a data gathering system which comprises an optical scanner supported on a weighing scale, and support means for suspending the system within a counter such that the optical scanner provides a weighing platter for the scale at an upper surface of the counter. Thus, bar coded data imprinted upon product labels presented at the counter can be read by the optical scanner, and the weight of such products can be determined by placing the products on the optical scanner. In effect, the optical scanner becomes the weighing platter of the scale. The bar code data and the weight data are supplied to the cash register system via a common interface.

Supermarket checkout counters commonly include optical scanners mounted therein for optically scanning bar code labels on products to be purchased as the products are moved over scanning windows in the top surfaces of the scanners. The scanners read and convert the bar code labels into product identification and pricing information which is used for the sale and other merchandising purposes, such as inventory control. Since many products sold in supermarkets, for example produce, are sold by weight, oftentimes weighing scales are also positioned adjacent the checkout counters. The weighing scales can be manually operable such that sales clerks weigh products and then enter the resulting prices on associated cash registers. Alternately, the weighing scales can be partially or fully automated such that the weights and resulting price information are directly passed to the registers.

One example of an automated data gathering system is disclosed in U.S. Pat. No. 4,656,344, wherein a scale and an optical scanner are not only directly interconnected to an associated register but also are integrated into a single unit which fits within the checkout counter. While this integrated scale/scanner system offers advantages over the prior separated component systems in terms of convenience and space savings, still there are disadvantages and inconveniences associated with the integrated system. For example, by making the scale and scanner a single integrated unit, the system is heavy and difficult to install and/or remove from a receiving checkout counter. Adding to this problem, the system must be removed from the checkout counter each time the scale is to be zeroed or calibrated and then the system must be reinstalled.

The need for a data gathering system for use at a point of sale checkout counter which provides for both scanning coded labels and also weighing products which are to be sold by weight has been recognized, and a combined scanner and scale which meets this need is the subject of the above identified, commonly assigned, U.S. Patent Application entitled Scale Having Platter Including Removable Optical Scanner. The combined scanner and scale accomplishes is provided in a compact packaging arrangement which eases and facilitates removal and installation of the system for maintenance and repair.

It will be appreciated, however, that since the scanner and scale both communicate with the cash register system, such as for example an IBM Model 4683 System, it is necessary to provide for a communications interface between both of these components and the cash register system, even though the components are physically combined. Not only has this required redundant interface circuitry, but the use of redundant cabling, and interface ports in the cash register system. It is seen, therefore, that there is a need for an interface arrangement which avoids the difficulties heretofore encountered.

SUMMARY OF THE INVENTION

This need is met by a data gathering system according to the present invention for use in a checkout counter to determine information relating to products to be purchased and to provide such information to a cash register system. The data gathering system includes a scale means supported within the checkout counter for determining weights of products presented to the data gathering system. The scale means includes a scale weighing platter located below the upper surface of the checkout counter, optical scanning means supported upon the scale weighing platter for reading coded labels on the products, and a common interface circuit, response to both the scale means and the optical scanning means, for providing weight data and coded label data to the cash register system.

The scale weighing platter includes scanner locator means for positioning the optical scanning means on the scale weighing platter for assembly of the data gathering system. A support means is provided for suspending the data gathering system within the checkout counter. The scale means is secured to the support means.

The optical scanning means includes a bar code decoder circuit for decoding scan signals to provide coded label data, a scanner microprocessor for correlating coded label data and supplying the coded label data to the common interface circuit, and scanner memory means for storing control software for use by the scanner microprocessor.

The scale means may supply weight data to the bar code decoder circuit of the optical scanning means, and the bar code decoder circuit then supplies the weight data to the common interface circuit via the scanner microprocessor without alteration. Alternatively, the scale means may supply weight data directly to the common interface circuit.

The common interface circuit comprises an interface microprocessor, responsive to coded label data from the optical scanning means and to weight data from the scale means, interface memory means for storing control software for use by the interface microprocessor, and a driver circuit, responsive to the interface microprocessor, for supplying weight data and coded label data to the cash register system.

The data gathering system according to the present invention for use in a checkout counter determines information relating to products to be purchased and provides such information to a cash register system, including weight data and coded label data. The counter defines an upper surface upon which products are placed for access to the data gathering system. The data gathering system includes support means for suspending the data gathering system within the checkout counter, and scale means secured to the support means for determining weights of products presented to the data gathering system. The scale means includes a scale weighing platter located below the upper surface of the checkout counter. An optical scanning means is supported upon the scale weighing platter for reading coded labels on the products. The optical scanning means has an upper surface including an optical scanning window, and is sized such that its upper surface is substantially aligned with the upper surface of the checkout counter when supported upon the scale weighing platter. The data gathering system includes a common interface circuit, responsive to both the scale means and the optical scanning means, for providing both weight data and coded label data to the cash register system.

The scale weighing platter may include scanner locator means for positioning the optical scanning means on the scale weighing platter for assembly of the data gathering system.

The optical scanning means includes a bar code decoder circuit for decoding scan signals to provide coded label data, a scanner microprocessor for correlating coded label data and supplying the coded label data to the common interface circuit, and memory means for storing control software for use by the scanner microprocessor.

The scale means supplies weight data to the bar code decoder circuit of the optical scanning means, and the bar code decoder circuit supplies the weight data to the common interface circuit via the scanner microprocessor without alteration. Alternatively, the scale means supplies weight data directly to the common interface circuit.

The common interface circuit comprises an interface microprocessor, responsive to coded label data from the optical scanning means and to weight data from the scale means, memory means for storing control software for use by the interface microprocessor, and a driver circuit, responsive to the interface microprocessor, for supplying weight data and coded label data to the cash register system.

The data gathering system may further included cables connected between the scale means and the optical scanning means for conducting electrical signals and power, the cables being sized, positioned and secured to prevent interference with the operation of the scale means.

Accordingly, it is an object of the present invention to provide an improved combined scale and scanner system in which communication with a cash register system is facilitated; to provide such a combined scale and scanner system in which a single interface communicates between the scale and scanner, and the cash register system; and to provide such a combined scale and scanner system in which the interface is microprocessor controlled.

Other objects and advantages of the invention will be apparent from the following description, the accompanying drawings and the appended claims.

BRIEF DESCRIPTION OF THE DRAWINGS

FIG. 1 is an exploded perspective view of a data gathering system in accordance with the present invention for use in a checkout counter;

FIGS. 2-4 are top, side and end views, respectively, of the data gathering system of FIG. 1; and FIG. 5 is an electrical schematic representation of the common interface circuit, and associated circuitry, which is response to both the scale means and said optical scanning means, and which provides weight data and coded label data to the cash register system.

DETAILED DESCRIPTION OF THE INVENTION

Reference is now made to the drawings which show a data gathering system 100 in accordance with the present invention. The system 100 is designed for use in a point of sale checkout counter 102 and fits entirely within the counter 102. The system 100 is structured as two separate units which can be independently manufactured, packaged and shipped and also individually handled and installed. By structuring the system as two separate units, it initially can be easily installed in the counter 102 and thereafter easily removed and reinstalled for system maintenance and repair. Further, the scanning operation can be more easily and accurately performed since scanning light beams pass through a single scanning window as opposed to two or more windows and/or apertures in prior art systems.

The close proximity of the two separate units facilitates the transmitting both weight data and coded label data to a cash register system, such as for example an IBM Model 4683 cash register system. The data gathering system 100 conveniently provides for both reading bar-coded labels secured to products to be purchased and also weighing products which are placed upon the upper surface of the system.

This data is then sent to the cash register system via a common interface circuit, as will be explained more fully below. Not only does this utilize the system circuitry in a most efficient manner, but also reduces the amount of coaxial cabling and the number of cash register system input/output ports required. The data gathering system 100 comprises scale means, taking the form of a load cell scale 104 in the illustrated embodiment, which is supported within the checkout counter 102 by support means and provides for determining weights of products presented to the data gathering system 100. The scale 104 comprises a cantilever beam load cell 106 secured at one end 106A to the support means which comprises a support cradle 108 in the illustrated embodiment, and to a scale load receiving plate or subplatter 110 at its opposite end 106B. The subplatter 110 is located below the upper surface 102A of the checkout counter 102 as best shown in FIGS. 3 and 4.

Optical scanning means comprising a self-contained optical scanner 112 is supported upon the scale subplatter 110 for reading coded labels, such as bar-coded labels, on products presented for purchase at the checkout counter 102. The optical scanner 112 has an upper surface 112A including an optical scanning window 112B through which scanning light beams pass and is sized such that its upper surface 112A is substantially aligned with the upper surface 102A of the checkout counter 102 when the optical scanner 112 is supported upon the subplatter 110. The weight of the optical scanner 112 is subtracted from the weight which is measured by the scale 104 or treated as a tare weight for the scale 104 such that the upper surface 112A of the optical scanner 112 serves as an extension of the subplatter 110 for receiving products to be weighed.

The subplatter 110 includes scanner locator means comprising two raised circular bosses 110A which are received by corresponding indentations (not shown) formed into the bottom of the optical scanner 112 for positioning the optical scanner 112 on the subplatter 110 for assembly of the data gathering system 100. Of course, differently formed bosses or different locating means can be provided as will be apparent to those skilled in the art.

Preferably, the data gathering system 100 is positioned within the checkout counter 102 such that the upper surface 112A of the optical scanner 112 is slightly above the upper surface 102A of the counter 102. The tapered trim strip 114 is secured across the checkout counter 102 adjacent the entry side 100A of the data gathering system 100 to elevate slightly the upper surface 102A of the counter 102 above the upper surface 112A of the system.

The support means or support cradle 108 is adapted to be hung from the checkout counter 102 by means of support flanges 108A which extend from end plates 108B of the support cradle 108. It should be apparent that the counter 102 can be adapted to support the data gathering system 100 from the support flanges 108A such that the system can be precisely located relative to the counter 102 with convenient adjustment, if necessary, being provided by shims or otherwise. The support cradle 108 comprises at least two subplatter stop members 108C, six stop members 108C being included in the illustrated embodiment as best shown in FIGS. 1 and 2, positioned to engage the subplatter 110 at the maximum extent of its travel to thereby prevent potentially damaging overtravel of the load cell scale 104. Preferably, stop pads 108D made of rubber or other resilient material are secured to the upper surfaces of the stop members 108C as shown in FIGS. 2-4.

The support cradle 108 comprises generally vertical side walls 118 and a bottom wall 120 which define a channel 122 extending laterally across the checkout counter 102 for receiving and protecting the load cell flexure 106 and electrical circuitry (not shown) which is connected to and operable with one or more load cells 124, see FIG. 1, secured to the load cell flexure 106 in accordance with well known weighing scale technology. The bottom wall 120 is peaked near its center 120A such that it gradually tapers downward toward the end plates 108B of the support cradle 108 adjacent which the bottom wall 120 terminates in open slots 120B. A crowned channel cover 126, shown in FIGS. 1-4, includes an opening 126A through which the load cell flexure 106 is connected to the subplatter 110, see FIG. 2.

This support arrangement or mounting for the data gathering system 100 is preferred since it provides improved spill control over the prior art. In particular, any spilled liquids which flow over the entry side 100A or exit side 100B of the system will flow harmlessly down the sides of the optical scanner 112 to the floor beneath the system where it can be periodically or immediately attended to through access panels (not shown) in the counter 102. Spilled liquids which flow down the ends of the system will be limited due to the narrowness of slots 128 between the optical scanner 112 and the support flanges 108A/end plates 108B of the support cradle 108, see FIGS. 2 and 3. Further, the majority of such liquid will also flow harmlessly to the floor beneath the system due to the narrowness of the width of the channel 122 which is approximately one third of the width of the data gathering system 100. The remaining small portion of spilled liquid which passes through the narrow slots 128 will initially engage the crowned channel cover 126 and be diverted to the sides of the channel 122 and once again to the floor beneath the system.

Any spilled liquid which does manage to seep past the channel cover 126 will flow down the interior surfaces of the end plates 108B and/or be diverted by the tapered bottom wall 120 to pass to the floor beneath the system through the slots 120B. Spilled liquids are thus eliminated from the data gathering system 100 by paths which do not tend to interfere with the movement and hence the operation of the scale 104 of the system.

To maintain the accuracy of the scale 104, cables for conducting electrical signals and power between the optical scanner 112 and the scale 104 of the data gathering system 100 are formed and secured to the scale 104 during its manufacture. More particularly, cables 180 are sized such that they extend between and are secured to the subplatter 110 and one of the side walls 118 of the channel 122 such that the cables permit free movement of the scale flexure 106 but do not affect such movement, see FIGS. 1-3. By thus sizing the cables 180 such that they do not rest upon a portion of the data gathering system 100 dependent upon the deflection of the load cell flexure 106, the weight of the cables 180 can be compensated by calibration of the scale 104. This cabling arrangement is important since cables to the optical scanner 112 must be routed through the subplatter 110 via an opening 110B therethrough. The cables 180 pass through a corresponding opening 112C, see FIG. 1, in the bottom of the optical scanner 112 and are precisely located and secured therein to assist in stabilizing the accuracy of the scale 104.

Reference is made to FIG. 5 which illustrates schematically, the common interface circuit 200 of the present invention and circuitry associated therewith. The common interface circuit 200 is responsive to both the scale means 104 and the optical scanning means 112 including scanner circuit 202, for providing weight data and coded label data to the cash register system 204, which may be an IBM Model 4683 cash register system, as stated previously. The optical scanning means includes circuit 202 having a bar code decoder circuit 206 for decoding scan signals to provide coded label data. Circuit 202, preferably an NCR VLSI decoder circuit, decodes label segment data received on line 208. Scanner microprocessor 210 correlates the coded label data received from circuit 206 and supplies the coded label data to the common interface circuit 200 under control of control software stored in scanner memory means 212, preferably comprising an EPROM. Scanner microprocessor 210 is preferably an INTEL 8039 microprocessor.

The scale means 104 may supply weight data via line 214 to the bar code decoder circuit 206 of the optical scanning means, and the bar code decoder circuit 206 then supplies this weight data to the common interface circuit 200 via the scanner microprocessor 210 without alteration. As indicated in FIG. 5 by line 214', the scale means 104 may supply weight data directly to the common interface circuit, if desired.

The common interface circuit 200 comprises an interface microprocessor 216, responsive to coded label data from the optical scanning means 112 and to weight data from the scale means 104. Microprocessor 216 is preferably a ZILOG Super8 microprocessor. Circuit 200 also includes an interface memory means 218, preferably an EPROM, for storing control software for use by the interface microprocessor 216. A driver circuit 219 is responsive to the interface microprocessor 216 for supplying weight data and coded label data to the cash register system 204.

The control software stored in scanner memory means 212 may be exemplified by the following listing.

```
Fri Apr 29 1988 10:17

IBM 4683 INTERFACE SOFTWARE FOR SUPER8

2500 A.D. Super 8 Macro Assembler - Version 4.01e
         -------------------------------------------------

Input  Filename : s84683.asm
                     Output Filename : s84683.obj

1                            ; Super 8 Software for the IBM 4014 interface. The .Hex file produced
2                            ; is called S84683.HEX.
3
4                            ; Spectra-Physics Part Number R96-0159 Rev A
5                            ; Compiled by Blake Isaacs
6                            ; Date: 3-14-1988
7
8                            ; Interrupt vectors:
9
10     0000          dummy     equ    0
11
12     0000  045D 045F 0461    dw     vec_0,vec_2,vec_4,vec_6
       0006  0463
13     0008  0465 0442 0467    dw     vec_8,int_p33,vec_c,vec_e
       000E  0469
14     0010  046B 046D 046F    dw     vec_10,vec_12,vec_14,vec_16
       0016  0471
15     0018  0473 0475 0477    dw     vec_18,vec_1a,vec_1c,vec_1e
       001E  0479
16
17     0020             start:
18     0020  9F                ei              ; Zilog suggestion
19     0021  8F                di
20
21                             ; initialize PORT registers:
22                             ; Initialize ports before setting to outputs:
23
24     0022  B0 D0             clr  , P0
25     0024  B0 D2             clr    P2
26     0026  B0 D3             clr    P3
27     0028  B0 D4             clr    P4
28
29     002A  E6 F8 88          ld     P2AM,#%88    ; P31 is output (TxD)
30     002D  E6 F9 62          ld     P2BM,#%62
31     0030  E6 FA 09          ld     P2CM,#%09
32     0033  E6 FB 80          ld     P2DM,#%80
33
34                             ;    88 P2AM 10 00 10 00  P31 is TxD output, P30 is RxD input
35                             ; Modes        31 30 21 20  P20 and 21 wired together for uart ck
36                             ;
37                             ;                          P33 is interupt on end of data
38                             ; for  62 P2BM 01 10 00 10  P32 is Data ready to 8039, P22 is low if
39                             ;              33 32 23 22  S8 has data, and P23 is nmi from emulator
40                             ; Ports
41                             ;      08 P2CM 00 00 10 01
42                             ;              35 34 25 24  HKO on P24/25 conf for fast int?
43
```

```
 44            ;            80 P2DM 10 00 00 00  P37 enables 3695 Tx
 45            ;                     37 36 27 26  P27 is /ack from 8039 when in command
 46            ;                                  mode
 47
 48            ; 241/0/PM defaults to good stuff.
 49
 50  0036  E6 F1 30           ld      PM,#%30
 51
 52            ; 240/0/POM default is OK, too.
 53
 54  0039  E6 F0 FF           ld      POM,#%ff
 55
 56            ; 252 & 253/0/P2xIP defaults OK
 57            ; 246/0/P4D defaults to all inputs, which we want.
 58            ; 247/0/P4OD defaults to totem-pole, which we want.
 59
 60            ; 244/0/H0C : Handshake 0 used for Port 4, DMA to regs 0001 1101
 61
 62  003C  E6 F4 00           ld      H0C,#%0
 63
 64            ; 245/0/H1C ...not used
 65
 66  003F  E6 F0 FF           ld      POM,#%FF     ; programs rest of P0 as address lines
 67  0042  E6 00 00           ld      %0,#%0
 68  0045  E6 D8 FF           ld      SPH,#%ff     ; the high part of the stack pointer
 69  0048  E6 DD 01           ld      IMR,#%1      ; interupt mask reg, level 0 only
 70                                                ; ok for 23 and 33
 71  004B  E6 FF 10           ld      IPR,#%10     ; interupt priority register a>b>c
 72                                                ; (port 23 mode set above as interupt)
 73
 74            ; Counters
 75
 76            ; 224/0/C0CT and 225/0/C1CT : idle
 77            ; 224/1/C0M and 225/1/C1M : simple timers
 78
 79  004E  5F                 sb1
 80  004F  E6 E0 04           ld    * C0M,#4
 81  0052  E6 E1 04           ld      C1M,#4
 82  0055  4F                 sb0
 83
 84            ; initialize interrupt system
 85
 86            ; 255/0/IPR : default priorities OK.
 87            ; 222/SYM : Fast interrupts on IRQ4:
 88
 89  0056  E6 DE 10           ld      SYM,#%10     ;not needed yet, used dma
 90
 91            ; 221/IMR : enable IRQ4 for Handshake 0 later...
 92
 93            ; 254/0/EMT : defaults to stack in registers
 94            ; ..so put it at top of RAM (in registers)
 95
 96  0059  B0 FE              clr     EMT          ; fast memory; stack in registers
 97  005B  B0 D8              clr     SPH
 98  005D  E6 D9 FF           ld      SPL,#%FF
 99
100            ; Program the UART:
101            ; /1/UMA : clock *32 rcv flag = 1 (16 desired by SP)
102            ; /1/UMB : use system clock xtal/2 to P2,
103
104  0060  5F                 sb1
105  0061  E6 FE 00           ld      WUMCH,#%0    ; don't user wake up mask
106  0064  E6 FF 00           ld      WUMSK,#%0
107  0067  E6 FA 73           ld      UMA,#%73     ;0111 0011  ; div by 16 for 6 Mhz xtal,
108                                                            ; no parity, wake up bits are
109                                                            ; expected high for rec and sent
```

```
110                                                        ; high on xmit.
111   006A  E6 FB 44          ld      UMB,#%44    ;0100 0100
112   006D  4F                SBO
113
114                     ; /O/UTC : set up and enable transmitter:
115
116   006E  E6 EB BE          ld      UTC,#%BE    ; 10111110 12-bit chars, etc.
117                                               ; use P31 for xmit data, don't send
118                                               ; break, 2 stop bits, wake up enable!,
119                                               ; trans enable, zero count (not used),
120                                               ; TBE, and Trans DMA (off)
121
122                     ; /O/UIE : no interrupts for now
123
124   0071  B0 ED             clr     UIE
125   0073  E6 EC 7C          ld      URC,#%7C    ; 01111100 reset, but disabled
126
127                     ; When ready to start, ld URC with #2 to enable receiver.
128   0076              title   IBM 4683 INTERFACE SOFTWARE FOR SUPER8
129
130   0000              RSECT
131                     ; Output buffer format:
132                     ;   dev_addr/SDLC/stat1/stat2/stat3/message
133                     ; Device addr and status will remain here permanently.
134
135   0000              out_buff  ds    19    ; output buffer, starts at reg loc 0
136   0013              out_len   ds    1     ;
137   0014              out_sdlc  ds    1     ; 2nd byte of output msg
138   0015              in_flag   ds    1     ;
139   0016              in_len    ds    1     ; input length
140   0017              in_buff   ds    9     ; input buffer
141   0020              our_stat  ds    1     ; status byte:
142   0021              RRcntr    ds    1     ; RR_pend timeout counter
143
144         0000       online    equ   0     ; bit 0 = online
145         0001       RR_pend   equ   1     ; bit 1 = RR pending
146         0002       SNRMed    equ   2     ; bit 2 = SNRMed; owe him NSA
147
148   0022              stat_req  ds    1     ; 1 = send status on next cycle
149   0023              EC_req    ds    1     ; 1 = send EC on next cycle
150   0024              set_RR    ds    1
151
152         0002       Sta_byte1 equ   2     ; offset from 0 for status bytes
153         0003       Sta_byte2 equ   3     ; (adr is 0, 1 is SDLC byte)
154         0004       Sta_byte3 equ   4     ; not used
155
156   0025              delay1 ds  1
157   0026              delay2 ds  1
158   0027              sv11     ds   1      ;**********************
159   0051                       org  %51
160   0051              poll_ct ds  1        ;*    NOTE!
161                                          ;*    DON'T USE r1
162                              ends        ;*    (used by DMA)
163                                          ;**********************
164   0076              CODE
165
166                     ; Setup low register file:
167
168   0076  1C 50             ld      r1,#%50
169   0078  D6 C1 00    $lup:  ld      @r1,#%00
170   007B  1A FB             djnz    r1,$lup
171   007D  B0 00             clr     0
172   007F  0C 05             ld      r0,#%5
173   0081  B0 C2             clr     r2
174   0083  C6 CC 04 26       ldw     rr12,#hdr
175   0087  E3 3C      hdlp:  ldci    r3,@rr12    ; load up the above header in low reg space
```

```
176  0089  D7 23              ld      @r2,r3
177  008B  2E                 inc     r2
178  008C  0A F9               djnz    r0,hdlp
179  008E  46 D3 04           or      P3,#%04         ; be sure p32 is high (0000 0100)
180
181                            ;ROM checksum routine
182
183  0091  9C 00       chksm0: ld      r9,#0
184  0093  C6 CC 00 00         ldw     rr12,#0
185  0097  E3 8C       chksm1: ldci    r8,@rr12        ; load next byte into reg
186                                                    ; from program memory
187  0099  02 98               add     r9,r8           ; r9 to hold sum
188  009B  A6 CD 00            cp      r13,#0          ; Address of last byte in EPROM
189                                                    ; (low address byte)
190  009E  6B 02               jr      eq,chksm2       ; done adding ?
191  00A0  8B F5               jr      chksm1          ; no, loop back
192  00A2  A6 CC 10    chksm2: cp      r12,#%10        ; Address of last byte in EPROM
193  00A5  EB F0               jr      ne,chksm1       ; no, loop back
194  00A7  A6 C9 FF            cp      r9,#%FF         ; is checksum FF ?
195  00AA  6B 02               jr      eq,chksm3       ; yes, jump
196  00AC  8B E3               jr      chksm0          ; repeat checksum until passed
197                            chksm3:                 ; good checksum
198
199  00AE  56 03 FE            and     Sta_byte2,#%FE  ; set scanner not alive,
200                                                    ; status set to alive only
201                                                    ; after successful handshake
202                                                    ; with 8039
203                            ; END OF INITIALIZTION
204
205  00B1                uart_main:
206
207  00B1  46 EC FE            or      URC,#%FE        ; Rx on
208  00B4  E8 EF               ld      r14,UIO         ; trash random input
209  00B6  EC 17               ld      r14,#in_buff    ; point to buffer
210  00B8  B0 CC               clr     r12             ; count = 0
211  00BA                poll2
212  00BA  08 D2               ld      r0,p2           ; test 8039 PON line
213  00BC  37 0F 0D            btjrt   scnr_on,r0,#7   ; is the scanner on?
214  00BF  38 03               ld      r3,Sta_byte2    ; no
215  00C1  37 30 15            btjrf   pon_ovr,r3,#0   ; is scanner already marked off?
216  00C4  56 03 FE            and     Sta_byte2,#%fe  ; no, mark scanner off bit
217  00C7  E6 22 01            ld      stat_req,#%1    ; queue in an unrequested status
218  00CA  8B 00               jr      pon_ovr
219
220  00CC  38 03       scnr_on ld      r3,Sta_byte2
221  00CE  37 31 08            btjrt   pon_ovr,r3,#0   ; jmp, scanner alive bit already set
222  00D1  2C 77               ld      r2,#%77         ; load valid checksum to send to 8039
223  00D3  F6 03 80            call    tell_8039       ; send checksum result to 8039
224                                                    ; successful handshake with 8039 will
225                                                    ; mark scanner alive bit
226  00D6  E6 22 01            ld      stat_req,#%1    ; queue in an unrequested status
227
228                            ; SERVICE 4683
229
230  00D9                pon_ovr
231  00D9  88 EC               ld      R8,URC
232  00DB  37 80 DC            btjrf   poll2,r8,#0     ; loop until RDA
233  00DE
234  00DE  98 EF       poll3   ld      R9,UIO          ; get input
235  00E0  46 EC FE            ld      URC,#%FE        ; reset UART recvr
236  00E3  37 8E D4            btjrf   poll2,r8,#7     ; loop until WUD
237
238  00E6  37 9E 08    poll4   btjrf   addred,r9,#7    ; go if an address
239  00E9  A6 C9 CA            cp      r9,#%CA         ; 1010 1010 4a + 80
240  00EC  EB CC               jr      ne,poll2        ; not my poll
241  00EE  8D 02 3D            jp      polled          ; ...else, polled
```

```
242  00F1                    addred:
243  00F1  A6 C9 4A                   cp      r9,#%4A        ; for me?
244  00F4  6B 05                      jr      eq,me          ; ..yes
245  00F6  A6 C9 7A                   cp      r9,#%7A        ; broadcast?
246  00F9  EB BF                      jr      ne,poll2       ; ..no - try again
247
248                          me:                             ; A message for me!
249  00FB  76 C8 18                   tm      R8,#%18        ; any UART errors?
250  00FE  ED 01 74                   jp      nz,ERR01       ; ..yes
251
252  0101  C6 CA FF FF                ldw     RR10,#%FFFF    ; init. CRC
253  0105  D7 E9        p_4_a  ld     @r14,R9                ; save input
254  0107  A6 CC 08                   cp      r12,#%08       ; limit in_buff to 9 bytes
255  010A  6B 02                      jr      z,poll5
256  010C  EE                         inc     r14
257  010D  CE                         inc     r12            ; bump count
258
259  010E  08 EC        poll5  ld     R0,URC
260  0110  37 00 FB                   btjrf   poll5,r0,#0    ; loop for RDA
261
262  0113  98 EF        poll6  ld     R9,UIO         ; get input
263  0115  A6 C9 7E                   cp      R9,#%7E        ; flag (EOM)?
264  0118  EB 03                      jr      ne,poll7       ; ..no
265  011A  37 0F 06                   btjrt   crc0,R0,#7     ; go if 9th bit
266  011D  37 0E E5     poll7  btjrf   p_4_a,R0,#7           ; error if 9th bit and not EOM
267  0120  8D 01 7E                   jp      ERR23          ; (needs a long jump)
268
269                          ;========== EOM received ====================
270
271                          ; check CRC's
272
273  0123  C9 16        crc0   ld     in_len,r12     ; stash count in buffer
274  0125  C6 CA FF FF                ldw     rr10,#%FFFF    ; init CRC
275  0129  EC 17                      ld      r14,#in_buff
276  012B  C7 9E        crc1   ld     r9,@r14
277  012D  F6 03 F7                   call    chksum         ; do CRC check on byte
278  0130  EE                         inc     r14            ; set to next byte
279  0131  CA F8                      djnz    r12,crc1       ; length of message in r12
280
281  0133  A6 CA B8                   cp      r10,#%B8
282  0136  EB 41                      jr      ne,ERR20
283  0138  A6 CB F0                   cp      r11,#%F0
284  013B  EB 3C                      jr      ne,ERR20       ; bad CRC
285  013D
286                          ; check SDLC counts...
287
288  013D  88 18                      ld      R8,in_buff+1
289  013F  76 C8 11                   tm      r8,#%11        ; is it RRROSSS0 ?
290  0142  6B 0C                      jr      z,poll9        ; ..yes - msg
291  0144  98 C8                      ld      r9,r8
292  0146  56 C9 1F                   and     r9,#%1F
293  0149  A6 C9 01                   cp      r9,#%01
294  014C  6B 0B                      jr      eq,poll10      ; RR
295  014E  8B 1F                      jr      poll11         ; other SDLC protocol bytes
296  0150                     poll9:
297  0150  56 C8 0E                   and     r8,#%0E
298  0153  D0 C8                      sra     r8
299  0155  A2 85                      cp      r8,r5          ; vs my rrr
300  0157  EB 2A                      jr      ne,ERR24
301  0159  88 18        poll10  ld    r8,in_buff+1
302  015B  F0 C8                      swap    r8
303  015D  56 C8 0E                   and     r8,#%0E
304  0160  D0 C8                      sra     r8
305  0162  A2 84                      cp      r8,r4          ; vs my sss
306  0164  EB 22                      jr      ne,ERR25
307  0166  88 18                      ld      r8,in_buff+1   ; one more time
```

```
308  0168  37 81 04              btjrt   poll11,r8,#0     ; go if protocol
309  016B  5E                    inc     r5               ; bump my RRR
310  016C  56 C5 07              and     r5,#7            ; RRR is 3 bits
311
312                      poll11:                          ; Have a good input message...
313
314  016F  E6 15 FF              ld      in_flag,#%FF     ; flag = good msg
315  0172  8B 19                 jr      T0126            ; exit
316
317  0174  E6 15 01      ERR01   ld      in_flag,#%01     ; UART error
318  0177  8B 14                 jr      T0126
319
320  0179  E6 15 20      ERR20   ld      in_flag,#%20     ; CRC error
321  017C  8B 0F                 jr      T0126
322
323  017E  E6 15 23      ERR23   ld      in_flag,#%23     ; improper 9th bit
324  0181  8B 0A                 jr      T0126
325
326  0183  E6 15 24      ERR24   ld      in_flag,#%24     ; his S <> my R
327  0186  8B 05                 jr      T0126
328
329  0188  E6 15 25      ERR25   ld      in_flag,#%25     ; his R <> my S
330  018B  8B 00                 jr      T0126
331
332                     ; Common exit from this routine...
333
334  018D  56 EC FD      T0126   and     URC,#%FF-%02     ; stop UART receiver
335
336                     ; At this point, we have either:
337                     ;     An error
338                     ;     An input message
339                     ;     A SNRM
340                     ;     An RR
341                     ;
342                     ; If we are offline, only a SNRM is acceptable; we should send
343                     ; NSA, reset our counts, and mark ourselves on-line.
344
345  0190  38 20                 ld      r3,our_stat      ; get our status
                                                          ; (used throughout below code)
346
347
348  0192  A6 15 FF              cp      in_flag,#%FF     ; did we get a message?
349  0195  ED 00 B1              jp      ne,uart_main     ; ..nope
350  0198  A6 18 83              cp      in_buff+1,#%83   ; is it SNRM?
351  019B  EB 17                 jr      ne,no_SNRM       ; ..no
352
353  019D  3C 32                 ld      r3,#50           ; initialize RR timeout counter
354  019F  39 21                 ld      RRcntr,r3
355  01A1  3C 00                 ld      r3,#%0           ; clear the world on a SNRM
356  01A3  F6 04 28              call    mk_ready         ; could remove this part from main
357  01A6  9F                    ei                       ; where it leads into the uart call
358
359  01A7  77 35                 bits    r3,#SNRMed       ; ..yes - mark it
360  01A9  77 31                 bits    r3,#online       ; ..and put us online
361  01AB  39 20                 ld      our_stat,r3      ; save stat
362
363  01AD  B0 C4                 clr     r4               ; clear msg counts
364  01AF  B0 C5                 clr     r5               ; ...
365
366  01B1  8D 00 B1              jp      uart_main        ; and exit
367
368                     ; If we just sent a message, then we only expect an RR.
369
370  01B4  37 32 15      no_SNRM btjrf   no_RR,r3,#RR_pend ; go if no RR reqd
371  01B7  28 18                 ld      r2,in_buff+1     ; get SDLC byte
372  01B9  56 C2 1F              and     r2,#%1F          ; should be RRR00001
373  01BC  A6 C2 01              cp      r2,#1
```

```
374  01BF  EB 0B              jr      ne,no_RR           ; ..but it isnt
375  01C1  77 32              bitr    r3,#RR_pend        ; reset RR pending bit
376  01C3  39 20              ld      our_stat,r3        ; save status
377  01C5  F6 04 2B           call    mk_ready           ; scans from the 8039
378  01C8  9F                 ei
379  01C9  8D 00 B1           jp      uart_main          ; and exit
380
381  01CC  37 31 03    no_RR  btjrt   we_is_on,r3,#online  ; go if online
382  01CF  8D 00 B1           jp      uart_main          ; ERROR - no valid msgs here
383
384  01D2               we_is_on:
385  01D2  28 18              ld      r2,in_buff+1       ; get SDLC byte
386  01D4  56 C2 11           and     r2,#%11            ; should be RRROSSS0
387  01D7  ED 00 B1           jp      nz,uart_main       ; ..but it isnt
388
389                    ; Got a good message...process it
390
391  01DA  E6 24 01           ld      set_RR,#%1         ; flag that next poll gets RR
392'
393  01DD  28 19              ld      r2,in_buff+2       ; get command byte
394  01DF  A6 C2 00           cp      r2,#%00            ;.
395  01E2  6B 39              jr      z,sys_cmd          ; go if system command
396
397  01E4  A6 C2 11           cp      r2,#%11            ; enable command
398  01E7  EB 09              jr      ne,cmd1
399  01E9  46 03 02           or      Sta_byte2,#%2      ; 0000 0010
400  01EC  F6 03 80           call    tell_8039
401  01EF  8D 00 B1           jp      uart_main
402
403  01F2  A6 C2 12    cmd1   cp      r2,#%12
404  01F5  EB 09              jr      ne,cmd2            ; disable
405  01F7  56 03 FD           and     Sta_byte2,#%fd     ; 1111 1101
406  01FA  F6 03 80           call    tell_8039
407  01FD  8D 00 B1           jp      uart_main
408
409  0200  A6 C2 14    cmd2   cp      r2,#%14
410  0203  EB 09              jr      ne,cmd3            ; beep enable
411  0205  46 02 10           or      Sta_byte1,#%10     ; 0001 0000
412  0208  F6 03 80           call    tell_8039
413  020B  8D 00 B1           jp      uart_main
414
415  020E  A6 C2 18    cmd3   cp      r2,#%18
416  0211  ED 00 B1           jp      ne,uart_main       ; disable-beep
417  0214  56 02 EF           and     Sta_byte1,#%ef     ; 1110 1111
418  0217  F6 03 80           call    tell_8039
419  021A  8D 00 B1           jp      uart_main
420
421  021D  28 1A     sys_cmd ld      r2,in_buff+3       ; get system command
422
423  021F  37 28 0F           btjrt   stat_set,r2,#5     ; status req
424  0222  37 2F 12           btjrt   EC_set,r2,#7       ; EC# req
425  0225  37 29 09           btjrt   stat_set,r2,#4     ; test req = status req
426  0228  37 2D 03           btjrt   sys_reset,r2,#6    ; system reset
427
428  022B  8D 00 B1           jp      uart_main          ; bad system command
429
430  022E              sys_reset:
431  022E  8D 00 20           jp      %0020              ; restart program!
432
433  0231              stat_set:
434  0231  E6 22 01           ld      stat_req,#%1       ; send status on next poll
435  0234  8D 00 B1           jp      uart_main
436
437  0237              EC_set:
438  0237  E6 23 01           ld      EC_req,#%1         ; send EC on next poll cycle
439  023A  8D 00 B1           jp      uart_main
```

```
440
441                          ; We got 1st poll character...look for 2nd
442
443   023D   88 EC      polled  ld    R8,URC
444   023F   37 80 FB           btjrf polled,R8,#0         ; loop until RDA
445   0242   98 EF              ld    r9,UIO              ; get input
446   0244   E6 EC FF           ld    URC,#%FF            ; clear status
447   0247   A6 C9 CA           cp    r9,#%CA
448   024A   6B 03              jr    eq,poll_4me
449
450   024C   8D 00 BA           jp    poll2               ; else, ignore
451
452   024F              poll_4me:
453
454                    ; If offline, we will always send ROL.
455                    ; If SNRMd, we will send NSA.
456                    ; If out_len <> 0, send message from out_buff.
457                    ; If out_len = 0, simply send EOP.
458
459   024F              ok:
460   024F   38 20              ld    r3,our_stat
461   0251   37 31 06           btjrt p_4a,r3,#online     ; go if on_line
462   0254   F6 03 C7           call  SEND_ROL            ; send ROL
463   0257   8D 00 B1           jp    uart_main           ; ..and exit
464
465   025A   37 34 00   p_4a    btjrf p_4b,r3,#SNRMed     ; go if not SNRMed
466   025D   F6 03 CC           call  SEND_NSA            ; if SNRM, send NSA
467   0260   77 34              bitr  r3,#SNRMed          ; reset request for NSA
468   0262   39 20              ld    our_stat,r3         ; ..in rsect
469   0264   E6 22 01           ld    stat_req,#%1        ; queue an unrequested status
470   0267   8D 00 B1           jp    uart_main           ; ..and exit
471   026A              p_4b:
472   026A   A6 24 00           cp    set_RR,#%0          ; check if RR is needed
473   026D   6D 02 79           jp    z,p_4bb
474   0270   E6 24 00           ld    set_RR,#%0          ; clear flag
475   0273   F6 03 B1           call  SEND_RR
476   0276   8D 00 B1           jp    uart_main
477
478   0279   A6 22 00   p_4bb:  cp    stat_req,#%0        ; see if we need to send status
479   027C   6B 16              jr    z,p_4c              ; skip if no request for status
480   027E   E6 01 00           ld    out_buff+1,#%0      ; need to wipe the SDLC byte
481   0281   EC 00              ld    r14,#%0             ; msg pointer
482   0283   CC 05              ld    r12,#%5             ; length = 5
483   0285   E6 22 00           ld    stat_req,#%0        ; clear status request
484   0288   F6 02 F8           call  MSG_OUT
485   028B   38 20              ld    r3,our_stat
486   028D   77 33              bits  r3,#RR_pend         ; mark RR pending
487   028F   39 20              ld    our_stat,r3
488   0291   8D 00 B1           jp    uart_main
489
490   0294              p_4c:
491   0294   A6 23 00           cp    EC_req,#%0          ; see if an EC req has been queued
492   0297   6B 1F              jr    z,p_4d              ; again skip if no EC request
493   0299   E6 01 00           ld    out_buff+1,#%0      ; must wipe SDLC byte or MSG_OUT fails
494   029C   46 02 01           or    out_buff+2,#%01     ; flag that EC present
495   029F   E6 05 04           ld    out_buff+5,#%04     ; the observed EC #
496   02A2   EC 00              ld    r14,#out_buff       ; EC might overlay first char in msg
497   02A4   CC 06              ld    r12,#%6             ; length =6
498   02A6   E6 23 00           ld    EC_req,#%0          ; clear EC request
499   02A9   F6 02 F8           call  MSG_OUT
500   02AC   56 02 FE           and   out_buff+2,#%fe     ; clear EC present from status
501   02AF   38 20              ld    r3,our_stat
502   02B1   77 33              bits  r3,#RR_pend         ; mark RR pending
503   02B3   39 20              ld    our_stat,r3
504   02B5   8D 00 B1           jp    uart_main
```

```
505
506   02B8  A6 13 00       p_4d:    cp     out_len,#0      ; last check for msgs to go
507   02BB  EB 06                   jr     ne,p_4e         ; there is a msg to go
508   02BD  F6 03 D1                call   SEND_EOP        ; else, send EOP
509   02C0  8D 00 B1                jp     uart_main
510
511                        ; may have already sent msg and could be awaiting RR
512
513   02C3                 p_4e:
514   02C3  38 20                   ld     r3,our_stat
515   02C5  37 32 16                btjrf  p_4f,r3,#RR_pend ; test to keep msg from dup xmits
516   02C8  70 C9                   push   r9
517   02CA  98 21                   ld     r9,RRcntr       ; RR timeout counter
518   02CC  00 C9                   dec    r9
519   02CE  A6 C9 00                cp     r9,#0
520   02D1  EB 02                   jr     nz,p_4ee        ; if RR timeout, mark ourselves
521   02D3  77 30                   bitr   r3,#online      ; offline
522   02D5  99 21        p_4ee:    ld     RRcntr,r9
523   02D7  50 C9                   pop    r9
524   02D9  39 20                   ld     our_stat,r3
525   02DB  8D 00 B1                jp     uart_main
526
527   02DE  CC 32         p_4f:     ld     r12,#50         ; reset RR timeout counter
528   02E0  C9 21                   ld     RRcntr,r12      ; get ready to send label
529   02E2  C8 13                   ld     r12,out_len     ; get length
530   02E4  EC 00                   ld     r14,#out_buff   ; ..and address
531   02E6  EE                      inc    r14             ; point to SDLC byte
532   02E7  D6 CE 00                ld     @r14,#%0        ; clear byte (see MSG_OUT for why)
533   02EA  00 CE                   dec    r14             ; point back to start
534   02EC  F6 02 F8                call   MSG_OUT         ; send msg
535   02EF  38 20                   ld     r3,our_stat
536   02F1  77 33                   bits   r3,#RR_pend     ; mark RR pending
537   02F3  39 20                   ld     our_stat,r3
538   02F5  8D 00 B1                jp     uart_main       ; exit
539
540                        ; Message output... assumes register usage:
541                        ;     R14 = address of msg to send (RSECT)
542                        ;     R12 = length of message (max. 20 )
543                        ;     RR10 : will be used for checksums
544                        ;     R9   : will carry one byte for output
545                        ;     R8   : will carry flags for output
546                        ;     RR4  : SDLC counts
547   02F8                 MSG_OUT:
548   02F8  56 EC FD                and    URC,#%FF-%02    ; receiver off
549   02FB  46 D3 80                or     P3,#%80         ; P37 on (3695 xmitter)
550   02FE  0C 0C                   ld     R0,#12          ;                         10
551   0300  0A FE         llll:    djnz   R0,llll         ; delay for awhile        12/n
552   0302  5F                      sb1                    ;                         6
553   0303  46 FA 01                or     UMA,#%01        ; 9th bit high (1 state)  10
554   0306  4F                      sb0                    ;                         6
555   0307  C7 9E                   ld     R9,@R14         ; get 1st byte            10
556   0309  EE                      inc    R14             ;                         6
557   030A  99 EF                   ld     UIO,R9          ; ..send it               10
558                        ;                                    need 380-388 for address
559   030C  C6 CA FF FF             ldw    RR10,#%FFFF     ; init. CRC               12
560   0310  F6 03 F7                call   chksum          ; 18+166
561
562                        ; set SDLC counts:
563   0313  C7 8E                   ld     R8,@R14         ; get byte                6
564   0315  76 C8 11                tm     R8,#%11         ; normal msg?             10
565   0318  EB 0C                   jr     nz,MOX          ; ..no - protocol         12
566
567   031A  88 C5                   ld     R8,r5           ; SDLC rrr                6
568   031C  F0 C8                   swap   r8              ;                         6
569   031E  42 84                   or     R8,r4           ; SDLC sss                6
570   0320  90 C8                   rl     r8              ;                         6
```

| | | | | | | | |
|---|---|---|---|---|---|---|---|
| 571 | 0322 | D7 E8 | | ld | @R14,R8 | ; stuff counts | 6 |
| 572 | 0324 | 88 07 | | jr | M_0_0 | ; | 12 |
| 573 | | | | | | | |
| 574 | 0326 | FF | MOX | nop | | | |
| 575 | 0327 | FF | | nop | | | |
| 576 | 0328 | FF | | nop | | | |
| 577 | 0329 | FF | | nop | | | |
| 578 | 032A | FF | | nop | | | |
| 579 | 032B | 88 00 | | jr | M_0_0 | ; | 12 |
| 580 | | | | | | | |
| 581 | 032D | 89 14 | M_0_0: | ld | out_sdlc,R8 | ; remember it | 10 |
| 582 | 032F | 5F | | sb1 | | ; | 6 |
| 583 | 0330 | 56 FA FE | | and | UMA,#%FF-%01 | ; 9th bit 0 state | 10 |
| 584 | 0333 | 4F | | sb0 | | ; | 6 |
| 585 | 0334 | 00 CC | M_0_1 | dec | R12 | ; | 6 |
| 586 | 0336 | 6B 0A | | jr | z,M_0_2 | ; go if no more data | 10 |
| 587 | 0338 | C7 9E | | ld | R9,@R14 | ; get byte | 6 |
| 588 | 033A | EE | | inc | R14 | ; | 6 |
| 589 | | | | | | | |
| 590 | 033B | 99 EF | | ld | UIO,R9 | ; (192 2nd) total 384 | 10 |
| 591 | | | | | | | |
| 592 | 033D | F6 03 F7 | | call | chksum | ; | 12+166 |
| 593 | 0340 | 8B F2 | | jr | M_0_1 | ; | 12 |
| 594 | | | | | | | |
| 595 | 0342 | 98 CA | M_0_2 | ld | R9,R10 | ; get 1st chksum | 6 |
| 596 | 0344 | B9 27 | | ld | sv11,R11 | ; ..save 2nd | 6 |
| 597 | 0346 | 60 C9 | | com | R9 | ; compl. 1st one | 6 |
| 598 | 0348 | 99 EF | | ld | UIO,R9 | ; ..send it (close) | 10 |
| 599 | | | | | | | |
| 600 | 034A | F6 03 F7 | | call | chksum | ; ..and add to CRC | 178 |
| 601 | 034D | 98 27 | | ld | R9,sv11 | ; get original 2nd CRC | 6 |
| 602 | 034F | 60 C9 | | com | R9 | ; | 6 |
| 603 | 0351 | 99 EF | | ld | UIO,R9 | ; send it  total? | 10 |
| 604 | | | | | | | |
| 605 | 0353 | F6 03 F7 | | call | chksum | ; | 178 |
| 606 | 0356 | 9C 7E | | ld | R9,#%7E | ; load flag byte | 10 |
| 607 | 0358 | 5F | | sb1 | | ; | 6 |
| 608 | 0359 | 46 FA 01 | | or | UMA,#%01 | ; 9th bit 1 state | 10 |
| 609 | 035C | 4F | | sb0 | | ; | 6 |
| 610 | 035D | 0C 0F | | ld | r0,#15 | ; | 10 |
| 611 | 035F | 0A FE | MOX5 | djnz | r0,MOX5 | ; | 152 |
| 612 | 0361 | 99 EF | | ld | UIO,R9 | ; xmit | 10 |
| 613 | | | | | | | |
| 614 | 0363 | 9C 15 | | ld | r9,#21 | | |
| 615 | 0365 | 9A FE | M_0_3a | djnz | r9,M_0_3a | | |
| 616 | | | | | | | |
| 617 | 0367 | 56 D3 7F | | and | P3,#%7F | ; 3695 Tx off | |
| 618 | 036A | 88 EF | | ld | r8,UIO | | |
| 619 | 036C | 46 EC FE | | or | URC,#%FE | ; UART Rx on | |
| 620 | 036F | 5F | | sb1 | | | |
| 621 | 0370 | 56 FA FE | | and | UMA,#%FF-%01 | ; 9th bit 0 state | |
| 622 | 0373 | 4F | | sb0 | | ; .. | |
| 623 | 0374 | 88 14 | | ld | R8,out_sdlc | ; get SDLC byte | |
| 624 | 0376 | 76 C8 11 | | tm | R8,#%11 | ; was it protocol? | |
| 625 | 0379 | EB 04 | | jr | nz,M_0_4 | ; ..yes | |
| 626 | 037B | 4E | | inc | r4 | ; inc sss | |
| 627 | 037C | 56 C4 07 | | and | r4,#7 | ; sss is 3 bits | |
| 628 | 037F | AF | M_0_4 | ret | | ; exit routine | |
| 629 | | | | | | | |
| 630 | | | tell_8039: | | | ; RR will go out on next poll, | |
| 631 | 0380 | E6 22 01 | | ld | stat_req,#%1 | ; send status on poll after that | |
| 632 | | 8000 | ls374 | equ | %8000 | ; anything beyond rom will do | |
| 633 | 0383 | B7 21 00 80 | | lde | ls374,r2 | ; stuff command byte into buffer chip | |
| 634 | 0387 | C6 C6 00 64 | | ldw | rr6,#100 | ; adjustable timeout for 8039 to respond | |
| 635 | 038B | 56 D3 FB | | and | P3,#%FB | ; bit 2 on port 3 (P27 on 8039) | |

| | | | | | | | |
|---|---|---|---|---|---|---|---|
| 636 | 038E | 80 C6 | Sloc: | decw | rr6 | | |
| 637 | 0390 | 6B 1E | | jr | z,give_up | | |
| 638 | 0392 | 08 D2 | | ld | r0,P2 | ; sample | |
| 639 | 0394 | 56 C0 08 | | and | r0,#%08 | ; 0000 1000 | |
| 640 | 0397 | A6 C0 00 | | cp | r0,#%0 | ; P12 will go low and stay that way | |
| 641 | 039A | EB F2 | | jr | nz,Sloc | ; indicating data has been read. | |
| 642 | | | | | | ; When found low, | |
| 643 | 039C | 46 D3 04 | | or | P3,#%04 | ; 0000 0100 raise line to 8039 | |
| 644 | | | | | | | |
| 645 | 039F | 80 C6 | Sloc2 | decw | rr6 | | |
| 646 | 03A1 | 6B 00 | | jr | z,give_up | ; and wait until | |
| 647 | 03A3 | 08 D2 | | ld | r0,P2 | ; p23 (P12 on 8039) | |
| 648 | 03A5 | 56 C0 08 | | and | r0,#%08 | ; comes back up. High state indicates | |
| 649 | 03A8 | A6 C0 00 | | cp | r0,#%0 | ; the 8039 is ready to take another cmd | |
| 650 | 03AB | 6B F2 | | jr | z,Sloc2 | | |
| 651 | 03AD | 46 03 01 | | or | Sta_byte2,#%01 | ; successful communication to 8039 so | |
| 652 | | | | | | ; mark scanner alive bit | |
| 653 | | | | | | | |
| 654 | | | give_up: | | | ; time out | |
| 655 | 03B0 | AF | | ret | | | |
| 656 | | | | | | | |
| 657 | | | ; ============ send Receive-Ready =========== | | | | |
| 658 | 03B1 | | SEND_RR: | | | | |
| 659 | 03B1 | 88 C5 | | ld | r8,r5 | ; my RRR | |
| 660 | 03B3 | F0 C8 | | swap | r8 | | |
| 661 | 03B5 | 90 C8 | | rl | r8 | | |
| 662 | 03B7 | 46 C8 01 | | or | r8,#1 | | |
| 663 | 03BA | 89 01 | | ld | out_buff+1,r8 | | |
| 664 | 03BC | | common_short: | | | | |
| 665 | 03BC | E6 00 4A | | ld | out_buff,#%4A | ; my addr | |
| 666 | 03BF | EC 00 | | ld | r14,#out_buff | ; point to buffer | |
| 667 | 03C1 | CC 02 | | ld | r12,#2 | ; count = 2 | |
| 668 | 03C3 | F6 02 F8 | | call | MSG_OUT | | |
| 669 | 03C6 | AF | | ret | | | |
| 670 | | | | | | | |
| 671 | | | ; ========= Send ROL ============== | | | | |
| 672 | 03C7 | | SEND_ROL: | | | | |
| 673 | 03C7 | E6 01 0F | | ld | out_buff+1,#%0F | ; ROL | |
| 674 | 03CA | 8B F0 | | jr | common_short | | |
| 675 | | | | | | | |
| 676 | | | ;========= Send NSA ============== | | | | |
| 677 | 03CC | | SEND_NSA: | | | | |
| 678 | 03CC | E6 01 63 | | ld | out_buff+1,#%63 | ; NSA | |
| 679 | 03CF | 8B EB | | jr | common_short | | |
| 680 | | | | | | | |
| 681 | | | ;========= Send EOP ============== | | | | |
| 682 | 03D1 | | SEND_EOP: | | | | |
| 683 | 03D1 | 56 EC FD | | and | URC,#%FF-%02 | ; receiver off | |
| 684 | 03D4 | 46 D3 80 | | or | P3,#%80 | ; P37 on (3695 xmitter) 195 to xmit | |
| 685 | 03D7 | 0C 0E | | ld | R0,#14 | ; NOT hex # 10 cyc | |
| 686 | 03D9 | 0A FE | LL17 | djnz | R0,LL17 | ; delay for awhile n*10 (12 last) | |
| 687 | 03DB | FF | | nop | | ; 6 | |
| 688 | 03DC | 5F | | sb1 | | ; 6 | |
| 689 | 03DD | 46 FA 01 | | or | UMA,#%01 | ; 9th bit 1 state 10 | |
| 690 | 03E0 | 4F | | sb0 | | ; 6 | |
| 691 | | | | | | | |
| 692 | 03E1 | E6 EF 5A | | ld | UIO,#%5A | ; send EOP 10 total 192 | |
| 693 | | | | | | | |
| 694 | 03E4 | 0C 11 | | ld | r0,#17 | ; need 195 cycles 10 | |
| 695 | 03E6 | | Sloc_del: | | | | |
| 696 | 03E6 | 0A FE | | djnz | r0,Sloc_del | ; n*12 | |
| 697 | 03E8 | FF | | nop | | ; | |
| 698 | 03E9 | 56 D3 7F | | and | P3,#%7F | ; 3695 Tx off total 198 10 | |
| 699 | 03EC | 88 EF | | ld | r8,UIO | ; trash input? | |
| 700 | 03EE | 46 EC FE | | or | URC,#%FE | ; UART Rx on | |
| 701 | 03F1 | 5F | | sb1 | | | |

```
702  03F2  56 FA FE          and    UMA,#%FF-%01    ; 9th bit 0 state
703  03F5  4F                sb0                    ; 12/24/86
704  03F6  AF                ret
705
706                          ;
707                          ; ===== Checksum routine =================
708                          ;   Uses RR10 for chksums.
709                          ;   Current byte in R9.
710  03F7  70 C3     chksum: push   r3              ; 10
711  03F9  B2 9A             xor    R9,R10          ; 6
712  03FB  08 C9             ld     R0,R9           ; 6
713  03FD  F0 C9             swap   R9              ; 8
714  03FF  56 C9 F0          and    R9,#%F0         ; 10
715  0402  B2 90             xor    R9,R0           ; 6
716  0404  38 C9             ld     R3,R9           ; 6
717  0406  F0 C9             swap   R9              ; 6
718  0408  56 C9 0F          and    R9,#%0F         ; 10
719  040B  B2 98             xor    R9,R11          ; 6
720  040D  A8 C9             ld     R10,R9          ; 6
721  040F  98 C3             ld     R9,R3           ; 6
722  0411  B8 C9             ld     R11,R9          ; 6
723  0413  F0 C9             swap   R9              ; 6
724  0415  E0 C9             rr     R9              ; 6
725  0417  08 C9             ld     R0,R9           ; 6
726  0419  56 C0 07          and    R0,#%07         ;10
727  041C  56 C9 F8          and    R9,#%F8         ;10
728  041F  B2 A9             xor    R10,R9          ; 6
729  0421  B2 B0             xor    R11,R0          ; 3
730  0423  50 C3             pop    r3              ; 10
731  0425  AF                ret                    ; 14
732
733  0426  4A 00 10 01 00  hdr:  db   %4a,%00,%10,%01,%00
734
735                                                  ; device address, SDLC byte,
736                                                  ; and default status bytes (enabled)
737  042B            mk_ready:
738  042B  46 D2 20          or     P2,#%20         ; be sure P25 is high state
739                                                  ; 0010 0000
740  042E  46 D3 04          or     P3,#%04         ; also p32 high (0000 0100)
741
742  0431  5F                sb1
743  0432  E6 F0 00          ld     DCH,#%0         ; DMA high byte
744  0435  E6 F1 20          ld     DCL,#%20        ; DMA low byte, will int when zero
745  0438  4F                sb0
746
747  0439  1C 05             ld     r1,#%5          ; used to point into register file, by DMA
748                                                  ; on int will hold msg length ->out_len
749  043B  E6 13 00          ld     out_len,#%0     ; clear semaphore to communication side
750  043E  E6 F4 1D          ld     HOC,#%1d        ; load/reload for handshake operation.
751                                                  ; note-do not split this command!
752  0441  AF                ret
753
754                  int_p33:                         ; hdw derived from msb on last byte
755  0442  4F                sb0                     ; set register bank pointer
756  0443  E6 D6 C0          ld     RP0,#%C0        ; note, r1 will contain # of char+1
757  0446  E6 F4 00          ld     HOC,#%0         ; turn off handshake and set T0 low
758  0449  56 D2 DF          and    P2,#%df         ; 1101 1111  P25 = T0
759  044C  E6 FC FF          ld     P2AIP,#%ff      ; reset int pending reg (see 8.7.4)
760                                                  ; in super8 book
761
762                  ; Have EOT. r1 is size of output msg. (buff must be a 0)
763                  ; semaphore to the
764                  ; UART code via out_len. (EOT not part of msg)
765                          *
766  044F  00 C1             dec    r1              ; compensates for EOT byte
767  0451  19 13             ld     out_len,r1      ; semaphore to UART code (out_len ne 0)
```

```
768                                        ; uart code will find this set and
769                                        ; xmit
770  0453  BF                 iret
771
772              ;CODE CHECKSUM
773  0454  CD                 DB      CDH
774              ;DATE
775  0455  03 23 88           DB      03H,23H,88H
776              ;PART NUMBER
777  0458  52 96 01 3B        DB      'R',96H,01,59
778              ;REV
779  045C  41                 DB      'A'
780
781  045D             vec_0
782  045D  6C 00              ld      r6,#%0
783  045F             vec_2
784  045F  6C 02              ld      r6,#%2
785  0461             vec_4
786  0461  6C 04              ld      r6,#%4
787  0463             vec_6
788  0463  6C 06              ld      r6,#%6
789  0465             vec_8
790  0465  6C 08              ld      r6,#%8
791  0467             vec_c
792  0467  6C 0C              ld      r6,#%C
793  0469             vec_e
794  0469  6C 0E              ld      r6,#%E
795  046B             vec_10
796  046B  6C 10              ld      r6,#%10
797  046D             vec_12
798  046D  6C 12              ld      r6,#%12
799  046F             vec_14
800  046F  6C 14              ld      r6,#%14
801  0471             vec_16
802  0471  6C 16              ld      r6,#%16
803  0473             vec_18
804  0473  6C 18              ld      r6,#%18
805  0475             vec_1a
806  0475  6C 1A              ld      r6,#%1a
807  0477             vec_1c
808  0477  6C 1C              ld      r6,#%1c
809  0479             vec_1e
810  0479  6C 1E              ld      r6,#%1e
811  047B  7C FF              ld      r7,#%ff
812  047D  79 FC              ld      P2AIP,r7      ; to clear int pending reg.
813  047F  79 FD              ld      P2BIP,r7
814  0481  BF                 iret
815
816                           ends
817  0482                     end
817  0482                     end
```

The control software stored in interface memory means 218 may be exemplified by the following listing.

| Defined | Symbol Name | Value | References | | |
|---|---|---|---|---|---|
| Pre | CODE | 0000 | 162 | 164 | 816 |
| Pre | DATA | 0000 | | | |
| 149 | EC_req | 0023 | 438 | 491 | 498 |
| 437 | EC_set | 0237 | 424 | | |
| 317 | ERR01 | 0174 | 250 | | |
| 320 | ERR20 | 0179 | 282 | 284 | |
| 323 | ERR23 | 017E | 267 | | |
| 326 | ERR24 | 0183 | 300 | | |
| 329 | ERR25 | 0188 | 306 | | |
| 574 | HOX | 0326 | 565 | | |

| | | | | | | | | | | | |
|---|---|---|---|---|---|---|---|---|---|---|---|
| 611 | MOX5 | | 035F | 611 | | | | | | | |
| 547 | MSG_OUT | | 02F8 | 484 | 499 | 534 | 668 | | | | |
| 581 | M_O_0 | | 032D | 572 | 579 | | | | | | |
| 585 | M_O_1 | | 0334 | 593 | | | | | | | |
| 595 | M_O_2 | | 0342 | 586 | | | | | | | |
| 615 | M_O_3a | | 0365 | 615 | | | | | | | |
| 628 | M_O_4 | | 037F | 625 | | | | | | | |
| 145 | RR_pend | = | 0001 | 370 | 375 | 486 | 502 | 515 | 536 | | |
| 142 | RRcntr | | 0021 | 354 | 517 | 522 | 528 | | | | |
| Pre | RSECT | | 0000 | 130 | 159 | | | | | | |
| 682 | SEND_EOP | | 0301 | 508 | | | | | | | |
| 677 | SEND_NSA | | 03CC | 466 | | | | | | | |
| 672 | SEND_ROL | | 03C7 | 462 | | | | | | | |
| 658 | SEND_RR | | 03B1 | 475 | | | | | | | |
| 146 | SNRMed | = | 0002 | 359 | 465 | 467 | | | | | |
| 152 | Sta_byte1 | = | 0002 | 411 | 417 | | | | | | |
| 153 | Sta_byte2 | = | 0003 | 199 | 214 | 216 | 220 | 399 | 405 | 651 | |
| 154 | Sta_byte3 | = | 0004 | | | | | | | | |
| 334 | T0126 | | 018D | 315 | 318 | 321 | 324 | 327 | 330 | | |
| 242 | addred | | 00F1 | 238 | | | | | | | |
| 183 | chksm0 | | 0091 | 196 | | | | | | | |
| 185 | chksm1 | | 0097 | 191 | 193 | | | | | | |
| 192 | chksm2 | | 00A2 | 190 | | | | | | | |
| 197 | chksm3 | | 00AE | 195 | | | | | | | |
| 710 | chksum | | 03F7 | 277 | 560 | 592 | 600 | 605 | | | |
| 403 | cmd1 | | 01F2 | 398 | | | | | | | |
| 409 | cmd2 | | 0200 | 404 | | | | | | | |
| 415 | cmd3 | | 020E | 410 | | | | | | | |
| 664 | common_short | | 03BC | 674 | 679 | | .. | | | | |
| 273 | crc0 | | 0123 | 265 | | | | | | | |
| 276 | crc1 | | 012B | 279 | | | | | | | |
| 156 | delay1 | | 0025 | | | | | | | | |
| 157 | delay2 | | 0026 | | | | | | | | |
| 10 | dummy | = | 0000 | | | | | | | | |
| 654 | give_up | | 03B0 | 637 | 646 | | | | | | |
| 175 | hdlp | | 0087 | 178 | | | | | | | |
| 733 | hdr | | 0426 | 174 | | | | | | | |
| 140 | in_buff | | 0017 | 209 | 275 | 288 | 301 | 307 | 350 | 371 | 385 | 393 | 421 |
| 138 | in_flag | | 0015 | 314 | 317 | 320 | 323 | 326 | 329 | 348 | |
| 139 | in_len | | 0016 | 273 | | | | | | | |
| 754 | int_p33 | | 0442 | 13 | | | | | | | |
| 551 | lll1 | | 0300 | 551 | | | | | | | |
| 686 | lll7 | | 0309 | 686 | | | | | | | |
| 632 | ls374 | = | 8000 | 633 | | | | | | | |
| 248 | me | | 00FB | 244 | | | | | | | |
| 737 | mk_ready | | 042B | 356 | 377 | | | | | | |
| 381 | no_RR | | 01CC | 370 | 374 | | | | | | |
| 370 | no_SNRM | | 01B4 | 351 | | | | | | | |
| 459 | ok | | 024F | | | | | | | | |
| 144 | online | = | 0000 | 360 | 381 | 461 | 521 | | | | |
| 141 | our_stat | | 0020 | 345 | 361 | 376 | 460 | 468 | 485 | 487 | 501 | 503 | 514 | 524 |
| | | | | 535 | 537 | | | | | | |
| 135 | out_buff | | 0000 | 480 | 493 | 494 | 495 | 496 | 500 | 530 | 663 | 665 | 666 | 673 |
| | | | | 678 | | | | | | | |
| 136 | out_len | | 0013 | 506 | 529 | 749 | 767 | | | | |
| 137 | out_sdlc | | 0014 | 581 | 623 | | | | | | |
| 253 | p_4_a | | 0105 | 266 | | | | | | | |
| 465 | p_4a | | 025A | 461 | | | | | | | |
| 471 | p_4b | | 026A | 465 | | | | | | | |
| 478 | p_4bb | | 0279 | 473 | | | | | | | |
| 490 | p_4c | | 0294 | 479 | | | | | | | |
| 506 | p_4d | | 02B8 | 492 | | | | | | | |
| 513 | p_4e | | 02C3 | 507 | | | | | | | |
| 522 | p_4ee | | 02D5 | 520 | | | | | | | |
| 527 | p_4f | | 02DE | 515 | | | | | | | |
| 301 | poll10 | | 0159 | 294 | | | | | | | |
| 312 | poll11 | | 016F | 295 | 308 | | | | | | |
| 211 | poll2 | | 00BA | 232 | 236 | 240 | 246 | 450 | | | |
| 234 | poll3 | | 00CE | | | | | | | | |
| 238 | poll4 | | 00E6 | | | | | | | | |

| | | | | | | | | | | | |
|---|---|---|---|---|---|---|---|---|---|---|---|
| 259 | poll5 | | 010E | 255 | 260 | | | | | | |
| 262 | poll6 | | 0113 | | | | | | | | |
| 266 | poll7 | | 011D | 264 | | | | | | | |
| 296 | poll9 | | 0150 | 290 | | | | | | | |
| 452 | poll_4me | | 024F | 448 | | | | | | | |
| 160 | poll_ct | | 0051 | | | | | | | | |
| 443 | polled | | 0230 | 241 | 444 | | | | | | |
| 230 | pon_ovr | | 0009 | 215 | 218 | 221 | | | | | |
| 220 | scnr_on | | 00CC | 213 | | | | | | | |
| 150 | set_RR | | 0024 | 391 | 472 | 474 | | | | | |
| 17 | start | | 0020 | | | | | | | | |
| 148 | stat_req | | 0022 | 217 | 226 | 434 | 469 | 478 | 483 | 631 | |
| 433 | stat_set | | 0231 | 423 | 425 | | | | | | |
| 158 | sv11 | | 0027 | 596 | 601 | | | | | | |
| 421 | sys_cmd | | 021D | 395 | | | | | | | |
| 430 | sys_reset | | 022E | 426 | | | | | | | |
| 630 | tell_8039 | | 0380 | 223 | 400 | 406 | 412 | 418 | | | |
| 205 | uart_main | | 00B1 | 349 | 366 | 379 | 382 | 387 | 401 | 407 | 413 | 416 | 419 | 428 |
| | | | | 435 | 439 | 463 | 470 | 476 | 488 | 504 | 509 | 525 | 538 |
| 781 | vec_0 | | 045D | 12 | | | | | | | |
| 795 | vec_10 | | 046B | 14 | | | | | | | |
| 797 | vec_12 | | 046D | 14 | | | | | | | |
| 799 | vec_14 | | 046F | 14 | | | | | | | |
| 801 | vec_16 | | 0471 | 14 | | | | | | | |
| 803 | vec_18 | | 0473 | 15 | | | | | | | |
| 805 | vec_1a | | 0475 | 15 | | | | | | | |
| 807 | vec_1c | | 0477 | 15 | | | | | | | |
| 809 | vec_1e | | 0479 | 15 | | | | | | | |
| 783 | vec_2 | | 045F | 12 | | | | | | | |
| 785 | vec_4 | | 0461 | 12 | | | | | | | |
| 787 | vec_6 | | 0463 | 12 | | | | | | | |
| 789 | vec_8 | | 0465 | 13 | | | | | | | |
| 791 | vec_c | | 0467 | 13 | | | | | | | |
| 793 | vec_e | | 0469 | 13 | | | | | | | |
| 384 | we_is_on | | 01D2 | 381 | | | | | | | |

```
LOC  OBJ       LINE     SOURCE STATEMENT

1 ;*********************************************************
                2 ; FILE: GHA095.SRC   04-16-87         DREW TAUSSIG
                3 ;
                4 ; FIRMWARE FOR THE 750SL SCANNER
                5 ; WILL READ UPC-A,E AND EAN/JAN8,13
                6 ; IBM-4683 SERIAL I/O CHANNEL, I/F OPTION #95.
                7 ;
                8 ; S-P PART NUMBER R96-0153
                9 ;
               10 ;*********************************************************
               11 $       INCLUDE(:F1:HISTRY.SRC)
             = 12 ;*********************************************************
             = 13 ; FILE: HISTRY.SRC  01-23-87 11:50  BOB ACTIS
             = 14 ;
             = 15 ; IVRD53 - 750F IG DEMO, SP-OC, VERSION D3 W/ 2ND CHECK    MAY 1983
             = 16 ;
             = 17 ; FVRD53 - 750F FT DEMO, SP-OC, VERSION D3 W/ 2ND CHECK    OCT 1983
             = 18 ;
             = 19 ; GHA053 - 750SL, SP-OC/NCR-OCIA, READS ALL UPC,EAN & JAN  JUN 1986
             = 20 ;
             = 21 ; GHA069 - 750SL, SWEDA PARALLEL/OMRON, READS ONLY A,E,8,13 OCT 1986
             = 22 ;
             = 23 ; GHA066 - 750SL, IBM-OCR/FUJITSU                          OCT 1986
             = 24 ;         IBM-OCR READS ONLY A,E,8,13
             = 25 ;         FUJITSU WILL ALSO READ VERSION D
             = 26 ;
             = 27 ; IFTP95 - 750F, IBM4683 SERIAL I/O CHANNEL, ONLY A,E,8,13 APR 1987
             = 28 ;
             = 29 ;*********************************************************
               30 $       INCLUDE(:F1:FTDEFS.SRC)
             = 31 ;*********************************************************
             = 32 ; FILE: FTDEFS.SRC  12-09-86 13:50  BOB ACTIS
             = 33 ;
             = 34 ; *** SYSTEM DEFINITION ***
             = 35 ;
             = 36 ; PORT 1 DEFINITION:
             = 37 ;
0001         = 38 ETEST    EQU    00000001B         ;P10-0-ENABLE TEST MODE
             = 39                                   ;P10-0-I/F RESET
```

```
0002        =  40 ETMARK  EQU   00000010B     ;P11-O-TEST MARK
0002        =  41 EMTREB  EQU   00000010B     ;P11-O-ENABLE MOTOR
0004        =  42 EP12    EQU   00000100B     ;P12-O-HANDSHAKE FOR SUPER-8 TO 8039 I/F
0008        =  43 EP13    EQU   00001000B     ;P13-I-MODE CONTROL FOR S8-8039 I/F
0010        =  44 ELASDB  EQU   00010000B     ;P14-O-DISABLE LASER
0020        =  45 EGDLT   EQU   00100000B     ;P15-O-ENABLE GOOD LIGHT
0040        =  46 EBDLT   EQU   01000000B     ;P16-O-ENABLE BAD LIGHT
0080        =  47 ETONE   EQU   10000000B     ;P17-O-TONE BIT (AC COUPLED)
            =  48 ;
            =  49 ;  PORT 2 DEFINITION:
            =  50 ;
            =  51 ;         EQU   00001111B   ;P20-P23 EXTERNAL PROGRAM ADDRESS LINES
0010        =  52 ESENT   EQU   00010000B     ;P24-I-VLSI DATA SENT* (USED ONLY FOR TEST)
0020        =  53 EUP2SP  EQU   00100000B     ;P25-I-MOTOR UP2SPD SIGNAL (750SL ONLY)
0040        =  54 EVLSIR  EQU   01000000B     ;P26-O-VLSI POWER RESET* (750SL ONLY)
0080        =  55 EDISHS  EQU   10000000B     ;P27-I-HANDSHAKE FOR SUPER-8 TO 8039 I/F
            =  56 ;
            =  57 ;                           ;T0-I-HANDSHAKE FOR 8039 TO SUPER-8 I/F
            =  58 ;
            =  59 ;**********************************************************
            =  60 ;  FRAME CONTROL ARRAY:
            =  61 ;
            =  62 ;     EXTERNAL MEMORY ADDRESSES
            =  63 ;
0000        =  64 EPARRD  EQU   00H           ;R - PARITY BYTE
0001        =  65 ESRRD   EQU   01H           ;R - SEGMENT REGISTER
0001        =  66 EFRRST  EQU   01H           ;W - FRAME RESET*(CLEARS SEGMENT)
0002        =  67 EOCIA   EQU   02H           ;R/W - OCIA REGISTERS
0003        =  68 EFCRST  EQU   03H           ;W - RESET FCA
0004        =  69 EPRDEC  EQU   04H           ;R - DECODED PARITY BYTE
            =  70 ;
            =  71 ;     PARITY DECODE BYTE
            =  72 ;
000F        =  73 EDECOD  EQU   00001111B     ;0-9 IS DECODED DIGIT
000A        =  74 EDECBL  EQU   00001010B     ;A IS BL
000B        =  75 EDECBR  EQU   00001011B     ;B IS BR
000D        =  77 EDECAR  EQU   00001101B     ;D IS AR
000E        =  78 EDECBE  EQU   00001110B     ;E IS NOT USED
000F        =  79 EDECBF  EQU   00001111B     ;F IS "NO DECODE" (ERROR)
0010        =  80 EDECE   EQU   00010000B     ;E-TAG
0020        =  81 EDECD   EQU   00100000B     ;D-TAG
0040        =  82 EDECBK  EQU   01000000B     ;BACKWARD CAPTURE
0080        =  83 EDECB7  EQU   10000000B     ;NOT USED. ALWAYS=1.
            =  84 ;
            =  85 ;     SHIFT REGISTER READ
            =  86 ;
000F        =  87 ESRCHR  EQU   00001111B     ;BCD CHARACTER
0010        =  88 ESR4CH  EQU   00010000B     ;4-CHAR CAPTURE
0020        =  89 ESRF13  EQU   00100000B     ;FRAME 1 OR 3 CAPTURE
0040        =  90 ESRPER  EQU   01000000B     ;PERIODICAL CAPTURE
0080        =  91 ESRSDT  EQU   10000000B     ;SDATA BYTE AVAILABLE
            =  92 ;**********************************************************
            =  93 ;  FLAG REGISTERS:
            =  94 ;
            =  95 ;     RB0-R4  SCAN FLAGS
            =  96 ;
0001        =  97 ESCNG   EQU   00000001B     ;SCANNING (FLAG CKFCA TO GET SEGMENTS)
0002        =  98 ER4B1   EQU   00000010B     ;NOT USED
0004        =  99 ER4B2   EQU   00000100B     ;NOT USED
0008        = 100 ESBFUL  EQU   00001000B     ;SEND BUFFER HAS DATA TO SEND
0010        = 101 ER4B4   EQU   00010000B     ;NOT USED
0020        = 102 EBFREQ  EQU   00100000B     ;BUFMAN REQUEST FLAG
0040        = 103 ER4B6   EQU   01000000B     ;NOT USED
0080        = 104 ER4B7   EQU   10000000B     ;NOT USED
            = 105 ;
            = 106 ;     RB0-R6  VERSION POINTER/FLAG
            = 107 ;
0000        = 108 EVER00  EQU   00H           ;NO VALID VERSIONS
0001        = 109 EVERA   EQU   01H           ;UPC-A
0002        = 110 EVER13  EQU   02H           ;EAN-13
0003        = 111 EVERE   EQU   03H           ;UPC-E
0004        = 112 EVER8   EQU   04H           ;EAN-8
0005        = 113 EVERD1  EQU   05H           ;UPC-D1
0006        = 114 EVERD2  EQU   06H           ;UPC-D2
0007        = 115 EVERD3  EQU   07H           ;UPC-D3
0008        = 116 EVERD4  EQU   08H           ;UPC-D4
0009        = 117 EVERD5  EQU   09H           ;UPC-D5
            = 118 ;
0010        = 119 ER6B4   EQU   00010000B     ;NOT USED
0020        = 120 ER6B5   EQU   00100000B     ;NOT USED
0040        = 121 ER6B6   EQU   01000000B     ;NOT USED
0080        = 122 ER6B7   EQU   10000000B     ;NOT USED
            = 123 ;
            = 124 ;  SCANNER CONFIGURATION BYTE - CONFIG
            = 125 ;
0001        = 126 E4CH2S  EQU   00000001B     ;4 CHAR SEG 2 SCAN BIT
0002        = 127 E6CH2S  EQU   00000010B     ;6 CHAR SEG 2 SCAN BIT
            = 128 ;**********************************************************
```

```
                = 129 ; TIMER CONSTANTS:
                = 130 ;
0004            = 131 E80MS    EQU    4            ;80 MSEC
000A            = 132 E200MS   EQU    10           ;200 MSEC
0018            = 133 E480MS   EQU    24           ;480 MSEC
0032            = 134 E1000M   EQU    50           ;1000 MSEC, 1.0 SECOND
0064            = 135 E2000M   EQU    100          ;2000 MSEC, 2.0 SECOND
                = 136 ;
0004            = 137 EGDTON   EQU    4            ;80 MSEC, GOOD TONE ON TIME
0014            = 138 EBDTON   EQU    20           ;400 MSEC, BAD TONE ON TIME
                = 139 ;
0028            = 140 ETONCT   EQU    40           ;TONE COUNT (CYCLES/20MS)
FFFA            = 141 ETONFQ   EQU    -6           ;TONE FREQUENCY CONSTANT (500US)
                = 142 ;
                = 143 ; SUPER-8 INTERFACE EXTERNAL MEMORY ADDRESS
0008            = 144 ESUP8    EQU    08H
                = 145 ;
                = 146 ; COMMUNICATIONS ROUTINE CONSTANTS
008B            = 147 EMSNBY   EQU    08BH         ;MISSCAN BYTE FOR SEND BUFFER
00CC            = 148 ETRMBY   EQU    0CCH         ;TERMINATION BYTE FOR SEND BUFFER
                = 149 ;
                = 150 ; COMMUNICATIONS ROUTINE RECEIVE COMMANDS (SUPER-8 TO 8039)
0011            = 151 ENSCAN   EQU    11H          ;ENABLE SCANNING (LASER ON)
0012            = 152 DISCAN   EQU    12H          ;DISABLE SCANNING (LASER OFF)
0018            = 154 DIBEEP   EQU    18H          ;DISABLE TONE AFTER GOOD READ
0032            = 155 COMRST   EQU    32H          ;RESET SCANNER COMMAND
0077            = 156 IFRSMG   EQU    77H          ;I/F ROM CHECKSUM GOOD "COMMAND"
                = 157 ;
                = 158 ; FLATTOP TIME CONSTANTS
0008            = 159 EWAIT    EQU    8            ;VALUE FOR "NO SEGS" WAIT
002A            = 160 EGDLTW   EQU    50-EWAIT     ;GD-LT ON WAIT CONSTANT
0016            = 161 EDRDLY   EQU    30-EWAIT     ;DOUBLE READ WAIT, IBM-OCR, 0.6 SEC
002A            = 162 EDRDLF   EQU    50-EWAIT     ;DOUBLE READ WAIT, FUJITSU, 1.0 SEC
                = 163 ;
                = 164 ; RAM POINTERS AND CONSTANTS USED IN THE HORSE TEST
0030            = 165 TSEG1    EQU    30H          ;SEGMENT BUFFER
0034            = 166 TSEG2    EQU    34H
0038            = 167 TCNT1    EQU    38H          ;SEGMENT COUNTER
003A            = 168 TCNT2    EQU    3AH
0050            = 169 TSCBUF   EQU    50H          ;FCA READ BUFFER
0001            = 170 EHCNTL   EQU    001H         ;HORSE CONTROL BYTE
                = 171 ;************************************************
                = 172 ; DATA MEMORY MAP - RAM - 8039 NEEDED
                = 173 ;
                = 174 ;     REGISTER BANK 0 (NON-INTERRUPT USEAGE)
0000            = 175        ORG    000H
0000            = 176 MRB0:   DS     4             ;R0 TO R3 - SCRATCH
0004            = 177 SCNFLG: DS     1             ;R4 - SCAN FLAGS
0005            = 178 DRTIMR: DS     1             ;R5 - DOUBLE READ TIMER
0006            = 179 VERFLG: DS     1             ;R6 - VERSION POINTER/FLAG
0007            = 180 TIMREG: DS     1             ;R7 - GENERAL PURPOSE TIMER/COUNTER
                = 181 ;
                = 182 ;     STACK AREA
0008            = 183 STACK:  DS     16            ;8 LEVELS OF SUBROUTINES ALLOWED
                = 184 ;
                = 185 ;     REGISTER BANK 1 (INTERRUPT USEAGE)
0018            = 186 MRB1:   DS     3             ;R0 TO R2 - SCRATCH (NOT USED)
001B            = 187 MRB1R3: DS     1             ;R3 - GOOD READ TONE DISABLE FLAG
001C            = 188 MRB1R4: DS     1             ;R4 - NOT USED
001D            = 189 TONCNT: DS     1             ;R5 - TONE CYCLE COUNTER (CYCLES/20MS)
001E            = 190 TONLTH: DS     1             ;R6 - TONE LENGTH COUNTER
001F            = 191 TASAVE: DS     1             ;R7 - TIMER "A" SAVE REGISTER
                = 192 ;
                = 193 ;     FREE MEMORY AREA
                = 194 ;
                = 195 ;        SEGMENT BUFFERS
0020            = 196 SEGBUF  EQU    $
0020            = 197 SCNBUF: DS     4             ;SCAN BUFFER
                = 198 ;
0024            = 199 BF6CST  EQU    $
0024            = 200 L6S1:   DS     4             ;SCAN 1 BUFFER
0028            = 201 L6S2:   DS     4             ;SCAN 2 BUFFER
002C            = 202 L6SCNT: DS     1             ;PACKED SCAN COUNTER (SCAN2/SCAN1)
002D            = 203 L6STOT: DS     1             ;TOTAL COUNTER
                = 204 ;
002E            = 205 R6S1:   DS     3
0031            = 206 R6S2:   DS     3
0034            = 207 R6SCNT: DS     1
0035            = 208 R6STOT: DS     1
0012            = 209 BF6CNT  EQU    $-BF6CST
                = 210 ;
0036            = 211 BF4CST  EQU    $
0036            = 212 L4S1:   DS     2
0038            = 213 L4S2:   DS     2
003A            = 214 L4SCNT: DS     1
003B            = 215 L4STOT: DS     1
                = 216 ;
003C            = 217 R4S1:   DS     2
```

```
003E        = 218 R4S2:    DS    2
0040        = 219 R4SCNT:  DS    1
0041        = 220 R4STOT:  DS    1
            = 221 ;
0042        = 222 M1S1:    DS    2
0044        = 223 M1S2:    DS    2
0046        = 224 M1SCNT:  DS    1
0047        = 225 M1STOT:  DS    1
            = 226 ;
0048        = 227 M2S1:    DS    2
004A        = 228 M2S2:    DS    2
004C        = 229 M2SCNT:  DS    1
            = 231 ;
004E        = 232 M3S1:    DS    2
0050        = 233 M3S2:    DS    2
0052        = 234 M3SCNT:  DS    1
0053        = 235 M3STOT:  DS    1
            = 236 ;
0054        = 237 M4S1:    DS    2
0056        = 238 M4S2:    DS    2
0058        = 239 M4SCNT:  DS    1
0059        = 240 M4STOT:  DS    1
            = 241 ;
005A        = 242 M5S1:    DS    2
005C        = 243 M5S2:    DS    2
005E        = 244 M5SCNT:  DS    1
005F        = 245 M5STOT:  DS    1
            = 246 ;
0060        = 247 M6S1:    DS    2
0062        = 248 M6S2:    DS    2
0064        = 249 M6SCNT:  DS    1
0065        = 250 M6STOT:  DS    1
0030        = 251 BF4CNT   EQU   $-BF4CST
            = 252 ;
            = 253 ;    SEND BUFFER
0066        = 254 SBFPNT:  DS    1                        ;POINTER
            = 255 ;                                       ;FIRST DATA BYTE ADDRESS
0067        = 256 SBUFAD   EQU   $                        ;DATA BUFFER
0067        = 257 SBUF:    DS    18
00CE        = 258 SBSTRT   EQU   2*SBUF                   ;PACKED BUFFER START POINTER
0012        = 259 SBUFSZ   EQU   $-SBUF                   ;BYTES IN SEND BUFFER
0078        = 260 SBFEND   EQU   $-1                      ;LAST RAM LOCATION IN BUFFER
            = 261 ;
            = 262 ; WORK AREA USED BY ENCD10 ROUTINE
0079        = 263 WRKBUF:  DS    3
            = 264 ;
            = 265 ; DOUBLE READ LABEL DATA SUM LOCATION
007C        = 266 DRSUM:   DS    1
            = 267 ;
            = 268 ; SCANNER CONFIGURATION BYTE LOCATION
007D        = 269 CONFIG:  DS    1
            = 270 ;                                       ;LAST USED RAM LOCATION
007D        = 271 LSTUSD   EQU   $-1
            = 272 ; FVECTR.SRC INCLUDES FTIMER.SRC
            = 273 $        INCLUDE(:F1:FVECTR.SRC)
            = 274 ;***************************************************
            = 275 ; FILE: FVECTR.SRC  06-16-86 13:00 BOB ACTIS
            = 276 ;
            = 277 ; RESET AND INTERRUPT VECTORS
            = 278 ;
                           ORG   000H                     ;RESET TRAP
0000        = 279
0000 E5     = 280 RSTTRP:  SEL   MB0
0001 649F   = 281          JMP   POWUP                    ;GO START PROGRAM
            = 282 ;
                           ORG   003H                     ;EXTERNAL INTERRUPT TRAP
0003        = 283                                         ;RETURN FROM SPURIOUS INTERRUPTS
0003 93     = 284 INTTRP:  RETR
            = 285 ;
                           ORG   007H                     ;INTERNAL TIMER INTERRUPT TRAP
0007        = 286                                         ;GO TO TIMER ROUTINE
0007        = 287 TIMTRP   EQU   $
            = 288 $        INCLUDE(:F1:FTIMER.SRC)
           1= 289 ;***************************************************
           1= 290 ; FILE: FTIMER.SRC  10-08-86 15:40 BOB ACTIS
           1= 291 ; FUNCTION: IF NO TONE IN PROGRESS, DECREMENT RB0-R5 & R7 UNTIL 0.
           1= 292 ;           IF TONE IN PROGRESS, DECREMENT RB1-R6 UNTIL 0.
           1= 293 ; ENTRY:  RB1-R6 = TONE LENGTH IN 20'S OF MS.
           1= 294 ;         RB1-R4 = IBM-4683 CLOCK TIMER
           1= 295 ;         RB0-R5 = DOUBLE READ TIMER COUNTER
           1= 296 ;         RB0-R7 = GENERAL PURPOSE TIMER COUNTER
           1= 297 ; EXIT:   RB1-R7 = ACCUMULATOR SAVE
           1= 298 ;         RB1-R5 = TONE CYCLE COUNTER
           1= 299 ;         RB1-R6 = DECREMENTED UNTIL 0
           1= 300 ;         RB1-R4 = DECREMENTED UNTIL 0
           1= 301 ;         RB0-R5 = DECREMENTED UNTIL 0
           1= 302 ;         RB0-R7 = DECREMENTED UNTIL 0
0007 D5    1= 303 TIMER:   SEL   RB1
0008 AF    1= 304          MOV   R7,A                     ;SAVE A
0009 FE    1= 305          MOV   A,R6                     ;GET TONE COUNTER
000A 961F  1= 306          JNZ   TIME30                   ;JUMP IF TONE IN PROGRESS
```

```
000C FC       1= 308            MOV      A,R4
000D C610     1= 309            JZ       TIME02       ;JUMP IF IBM-4683 TIMER = 0
000F CC       1= 310            DEC      R4
              1= 311 ;
0010 C5       1= 312 TIME02:    SEL      RB0
0011 FF       1= 313            MOV      A,R7
0012 C615     1= 314            JZ       TIME05       ;JUMP IF TIMER COUNTER = 0
0014 CF       1= 315            DEC      R7
              1= 316 ;
0015 FD       1= 317 TIME05:    MOV      A,R5
0016 C619     1= 318            JZ       TIME10       ;JUMP IF DOUBLE READ TIMER = 0
0018 CD       1= 319            DEC      R5
              1= 320 ;
0019 2306     1= 321 TIME10:    MOV      A,#-250      ;20MS/80US = 250
001B 62       1= 322 TIME20:    MOV      T,A          ;SET TIMER COUNTER
001C D5       1= 323            SEL      RB1
001D FF       1= 324            MOV      A,R7         ;RESTORE A
001E 93       1= 325            RETR
              1= 326 ;
001F 09       1= 327 TIME30:    IN       A,P1         ;GET TONE BIT
0020 997F     1= 328            ANL      P1,#255-ETONE ;SET TONE BIT LOW
0022 F226     1= 329            JB7      TIME40       ;JUMP IF TONE BIT WAS HIGH
0024 8980     1= 330            ORL      P1,#ETONE    ;SET TONE BIT HIGH
              1= 331 ;
0026 55       1= 332 TIME40:    STRT     T            ;CLEAR THE PRESCALAR
0027 ED3B     1= 333            DJNZ     R5,TIME60    ;JUMP IF NOT 20MS YET
0029 BD28     1= 334            MOV      R5,#ETONCT   ;SET TONE CYCLE COUNTER
              1= 335 ;
002B FC       1= 336            MOV      A,R4
002C C62F     1= 337            JZ       TIME45       ;JUMP IF IBM-4683 TIMER = 0
002E CC       1= 338            DEC      R4
              1= 339 ;
002F C5       1= 340 TIME45:    SEL      RB0
0030 FF       1= 341            MOV      A,R7
0031 C634     1= 342            JZ       TIME50       ;JUMP IF TIMER COUNTER = 0
0033 CF       1= 343            DEC      R7
              1= 344 ;
0034 D5       1= 345 TIME50:    SEL      RB1
0035 EE3B     1= 346            DJNZ     R6,TIME60    ;JUMP IF TONE NOT FINISHED
0037 8980     1= 347            ORL      P1,#ETONE    ;LEAVE TONE LINE HIGH
0039 0419     1= 348            JMP      TIME10
              1= 349 ;
003B 23FA     1= 350 TIME60:    MOV      A,#ETONFQ    ;SET TONE FREQ CONSTANT
003D 041B     1= 351            JMP      TIME20
                 352 $          INCLUDE(:F1:FSDATA.SRC)
               = 353 ;****************************************************
               = 354 ; FILE: FSDATA.SRC  10-06-86 14:05  BOB ACTIS
               = 355 ;
               = 356 ; ROUTINE: SDATA
               = 357 ; FUNCTION: CLEAR THE SDATA BYTE THEN RETURN.
               = 358 ;           THE 750SL DOES NOT IMPLEMENT HORSE OR RESET FROM SDATA
               = 359 ; ENTRY: RB0
               = 360 ;        SDATA READY IN FCA
               = 361 ; EXIT: USES R0,A
               = 362 ;
003F B802      = 363 SDATA:     MOV      R0,#EOCIA    ;ENTERED FROM CKFCA ROUTINE
0041 80        = 364            MOVX     A,@R0        ;GET SDATA BYTE
               = 365 ;
0042 D301      = 366 SDATA4:    XRL      A,#EHCNTL
0044 9656      = 367            JNZ      SDATA9       ;JUMP IF NOT THE HORSE CONTROL BYTE
0046 27        = 368 SDATAH:    CLR      A            ;CLEAR STACK POINTER/RETURN LINKAGE SINCE WE
0047 D7        = 369            MOV      PSW,A        ;WILL JUMP INTO HORSE TEST AND STAY THERE
0048 C5        = 370            SEL      RB0          ;SETUP FOR HORSE TEST ENTRY
0049 85        = 371            CLR      F0
004A 95        = 372            CPL      F0           ;SET FLAG FOR CONTROL BYTE RECEIVED
004B A5        = 373            CLR      F1
004C B830      = 374            MOV      R0,#TSEG1
004E BB10      = 375            MOV      R3,#16
0050 990F      = 376            ANL      P1,#255-EGDLT
0052 8952      = 377            ORL      P1,#EBDLT+ELASDB+ENTREB ;BOLT & MOTOR ON, LASER OFF
0054 840A      = 378            JMP      TH005        ;BOLT INDICATES CNTL BYTE RECEIVED
               = 379 ;
0056 83        = 380 SDATA9:    RET                   ;SPURIOUS SDATA
                 381 ;************************************
0057 A3          382 TROPG0:    MOVP     A,@A
0058 83          383            RET
                 385 $          INCLUDE(:F1:TROMSM.SRC)
               = 386 ;****************************************************
               = 387 ; ROUTINE: TROMSM  10-07-86 10:40  BOB ACTIS
               = 388 ;
               = 389 ; FUNCTION - SUM ALL BYTES IN BOTH MEMORY BANKS
               = 390 ;            ASSUMES THAT EACH OF THE SIXTEEN PAGES CONTAINS THE
               = 391 ;            SEQUENCE "TROPGX: MOVP A,@A ; RET" FOR PAGE X.
               = 392 ;
0100 B90B      = 393 TROMSM:    MOV      R1,#STACK+3  ; R1 POINTS TO SECOND STACK ENTRY
               = 394 ;
               = 395 ; DO SIXTEEN PAGES WITH 256 BYTES PER PAGE
               = 396 ;
```

```
0102 27      = 397           CLR    A
0103 A1      = 398           MOV    @R1,A        ; STACK+3 = PAGE 0 TO START
0104 AA      = 399           MOV    R2,A         ; R2 = BYTE ADDRESS
0105 BB10    = 400           MOV    R3,#16       ; R3 = PAGES TO DO
0107 A8      = 401           MOV    R0,A         ; R0 = SUM OF BYTES
0108 D7      = 402           MOV    PSW,A        ; INSURE STACK IS EMPTY
             = 403 ;
             = 404 ; PUT PAGE ACCESS ADDRESS IN STACK
             = 405 ;
0109 F1      = 406 TRO10:    MOV    A,@R1
010A 0321    = 407           ADD    A,#LOW TROTAB
010C A3      = 408           MOVP   A,@A
010D C9      = 409           DEC    R1
010E A1      = 410           MOV    @R1,A
010F 19      = 411           INC    R1
             = 412 ;
             = 413 ; DO A PAGE
             = 414 ;
0110 341C    = 415 TRO20:    CALL   TRO50        ; FETCH BYTE
0112 68      = 416           ADD    A,R0         ; ADD TO SUM
0113 A8      = 417           MOV    R0,A
0114 EA10    = 418           DJNZ   R2,TRO20     ; JMP = NOT DONE WITH PAGE
0116 11      = 419           INC    @R1          ; PAGE NUMBER INCREMENTED
0117 EB09    = 420           DJNZ   R3,TRO10     ; JMP = NOT THRU WITH PAGES
0119 17      = 421           INC    A            ; (A) = ZERO FOR CORRECT SUM
011A 644F    = 422           JMP    TRORET
             = 423 ;
             = 424 ; LINK TO EACH PAGE
             = 425 ;
011C 2302    = 426 TRO50:    MOV    A,#02
011E D7      = 427           MOV    PSW,A        ; SET STACK POINTER AHEAD
011F FA      = 428           MOV    A,R2         ; A = ADDRESS OF BYTE TO FETCH
0120 83      = 429           RET                 ; JMP TO SELECTED PAGE
             = 430 ;
             = 431 ; TABLE FOR ADDRESS OF FETCH ROUTINE IN EACH PAGE
             = 432 ;
0121 57      = 433 TROTAB:   DB     LOW TROPG0
0122 76      = 434           DB     LOW TROPG1
0123 B0      = 435           DB     LOW TROPG2
0124 E3      = 436           DB     LOW TROPG3
0125 C6      = 437           DB     LOW TROPG4
0126 43      = 438           DB     LOW TROPG5
0127 D3      = 439           DB     LOW TROPG6
0128 6E      = 440           DB     LOW TROPG7
0129 E4      = 441           DB     LOW TROPG8
012A D4      = 442           DB     LOW TROPG9
012B CC      = 443           DB     LOW TROPGA
012C D7      = 444           DB     LOW TROPGB
012D E8      = 445           DB     LOW TROPGC
012E E3      = 446           DB     LOW TROPGD
012F AB      = 447           DB     LOW TROPGE
0130 AD      = 448           DB     LOW TROPGF
             = 449 $  INCLUDE(:F1:TRAM.SRC)
             = 450 ;********************************************************
             = 451 ; FILE:    TRAM.SRC  6-19-86 11:20  BOB ACTIS
             = 452 ; FUNCTION: TEST THE 8039 RAM LOCATIONS 0 TO 7FH
             = 453 ; ENTRY:   NO SETUP
             = 454 ; EXIT:    RAM HAS GARBAGE (TEST PATTERN)
             = 455 ;
             = 456 ; START BY WRITTING EACH RAM ADDRESS INTO ITSELF
0131 B87F    = 457 TRAM:     MOV    R0,#7FH      ;SIZE OF 8039 RAM
0133 F8      = 458 TRAM10:   MOV    A,R0         ;GET RAM ADDRESS
0134 A0      = 459           MOV    @R0,A        ;STORE RAM ADDRESS IN IT'S LOCATION
0135 E833    = 460           DJNZ   R0,TRAM10    ;DO ALL LOCATIONS
             = 462 ; CHECK IF EACH LOCATION HAS IT'S OWN ADDRESS
0137 B87F    = 463           MOV    R0,#7FH
0139 F8      = 464 TRAM20:   MOV    A,R0         ;GET RAM ADRESS
013A D0      = 465           XRL    A,@R0        ;COMPARE ADDRESS TO CONTENTS
013B 9674    = 466           JNZ    TRAMER       ;JUMP IF ERROR
013D E839    = 467           DJNZ   R0,TRAM20    ;DO ALL LOCATIONS
             = 468 ;
             = 469 ; TRY A 055H/0AAH CHECKER BOARD PATTERN
013F B802    = 470           MOV    R0,#2        ;POINTER WILL GO FROM 2 TO 7FH
0141 2355    = 471 TRAM30:   MOV    A,#055H
0143 A0      = 472           MOV    @R0,A        ;WRITE EVEN LOCATION
0144 37      = 473           CPL    A            ;PATTERN IS NOW 0AAH
0145 18      = 474           INC    R0
0146 A0      = 475           MOV    @R0,A        ;WRITE ODD LOCATION
0147 18      = 476           INC    R0
0148 F8      = 477           MOV    A,R0         ;GET NEXT ADDRESS
0149 37      = 478           CPL    A
014A F241    = 479           JB7    TRAM30       ;JUMP IF NOT DONE YET, R0 < 80H
             = 480 ;
             = 481 ; CHECK THE 055H/0AAH TEST PATTERN
014C B902    = 482           MOV    R1,#2        ;USE R1 AS POINTER IN THIS SECTION
014E F1      = 483 TRAM40:   MOV    A,@R1        ;GET EVEN BYTE DATA, 055H
014F 19      = 484           INC    R1
0150 61      = 485           ADD    A,@R1        ;ADD ODD BYTE DATA, 0AAH
```

```
0151 17        = 486          INC    A                    ;055H+0AAH+1=000H
0152 9674      = 487          JNZ    TRAMER               ;JUMP IF ERROR
0154 19        = 488          INC    R1
0155 F9        = 489          MOV    A,R1                 ;GET NEXT ADDRESS
0156 37        = 490          CPL    A
0157 F24E      = 491          JB7    TRAM40               ;JUMP IF NOT DONE YET
               = 492 ;
               = 493 ;  TRY A 0AAH/055H CHECKER BOARD PATTERN
0159 8902      = 494          MOV    R1,#2                ;POINTER WILL GO FROM 2 TO 7FH
015B 23AA      = 495 TRAM50:  MOV    A,#0AAH
015D A1        = 496          MOV    @R1,A                ;WRITE EVEN LOCATION
015E 37        = 497          CPL    A                    ;PATTERN IS NOW 055H
015F 19        = 498          INC    R1
0160 A1        = 499          MOV    @R1,A                ;WRITE ODD LOCATION
0161 19        = 500          INC    R1
0162 F9        = 501          MOV    A,R1                 ;GET NEXT ADDRESS
0163 37        = 502          CPL    A
0164 F25B      = 503          JB7    TRAM50               ;JUMP IF NOT DONE YET, R1 < 80H
               = 504 ;
               = 505 ;  CHECK THE 0AAH/055H TEST PATTERN
0166 B802      = 506          MOV    R0,#2                ;USE R0 AS POINTER IN THIS SECTION
0168 F0        = 507 TRAM60:  MOV    A,@R0                ;GET EVEN BYTE DATA, 0AAH
0169 18        = 508          INC    R0
016A 60        = 509          ADD    A,@R0                ;ADD ODD BYTE DATA, 055H
016B 17        = 510          INC    A                    ;0AAH+055H+1=000H
016C 9674      = 511          JNZ    TRAMER               ;JUMP IF ERROR
016E 18        = 512          INC    R0
016F F8        = 513          MOV    A,R0                 ;GET NEXT ADDRESS
0170 37        = 514          CPL    A
0171 F268      = 515          JB7    TRAM60               ;JUMP IF NOT DONE YET
               = 516 ;
0173 27        = 517          CLR    A                    ;A=0 INDICATES TEST PASSED
0174 6457      = 518 TRAMER:  JMP    TRARET               ;RETURN FROM RAM TEST
               = 519 ;        INCLUDE(:F1:TOCIA.SRC)      ; 750F ONLY              <----
               = 520 ;****************************************************************
0176 A3        = 521 TROPG1:  MOVP   A,@A
0177 83        = 522          RET
0200           = 523          ORG    200H
               = 524 $        INCLUDE(:F1:TTAG.SRC)
               = 525 ;****************************************************************
               = 526 ; ROUTINE: TTAG  06-19-86 15:30  BOB ACTIS
               = 527 ;
               = 528 ; FUNCTION: CHECK DIGITAL LOGIC FOR CAPTURE OF 6 INCREASINGLY
               = 529 ;           LARGER TAGS - 012345 678912 . THE SYMBOL CAPTURE
               = 530 ;           PROCESSING IS USED TO COLLECT THE SEGMENTS FROM THE FCA.
               = 531 ;
0200 FE        = 532 TTATAB:  DB     0FEH,9AH,64H,16H,0B7H,0D0H,0ABH
0201 9A        =
0202 64        =
0203 16        =
0204 B7        =
0205 D0        =
0207 3A        = 533          DB     3AH,0B9H,42H,0B6H,59H,2EH,03EH
0208 89        =
0209 42        =
020A B6        =
020B 59        =
020C 2E        =
020D 3E        =
020E B803      = 534 TTAG:    MOV    R0,#EFCRST
0210 90        = 535          MOVX   @R0,A                ;RESET FCA
0211 8901      = 536          ORL    P1,#ETEST            ;TEST CONTROL ACTIVE
0213 B800      = 537          MOV    R0,#LOW TTATAB       ; R0 POINTS TO CHAR GEN TABLE
0215 BE06      = 538          MOV    R6,#06H              ;THIS ROUTINE CHECKS DIGITAL LOGIC
0217 BF06      = 539          MOV    R7,#06H              ;FOR CAPTURE OF 6 INCREASINGLY LARGER
0219 B908      = 540          MOV    R1,#08H              ;TAGS 012345 678912.................
021B BB0E      = 541          MOV    R3,#0EH              ;UNPACK DATA CONSTANT
021D F8        = 542 UNPK1:   MOV    A,R0
021E BA04      = 543          MOV    R2,#04H              ;UNPACK DATA CONSTANT
0220 A3        = 544          MOVP   A,@A
0221 AC        = 545          MOV    R4,A                 ;TEMP STORE
0222 5301      = 546 UNPK2:   ANL    A,#01H               ;STRIP OUT ONE BIT
0224 E7        = 547          RL     A
0225 17        = 548          INC    A
0226 47        = 549          SWAP   A
0227 AD        = 550          MOV    R5,A
0228 FC        = 551          MOV    A,R4
0229 77        = 552          RR     A
022A AC        = 553          MOV    R4,A
022B 5301      = 554          ANL    A,#01H
022D E7        = 555          RL     A
022E 17        = 556          INC    A
022F 60        = 557          ADD    A,R5
0230 A1        = 558          MOV    @R1,A
0231 19        = 559          INC    R1
0232 FC        = 560          MOV    A,R4
0233 77        = 561          RR     A
0234 AC        = 562          MOV    R4,A
```

```
0235 EA22    = 563           DJNZ    R2,UNPK2
0237 18      = 564           INC     R0
0238 EB1D    = 565           DJNZ    R3,UNPK1
             = 566 ;
             = 567 ; SETUP TEST BIT ON PORT 1
             = 568 ;
023A 2390    = 569           MOV     A,#ETEST+EP12+EP13+ELASDB+ETONE
023C 39      = 570           OUTL    P1,A
             = 571 ;
023D BB02    = 572           MOV     R3,#02H
023F BD06    = 573           MOV     R5,#06H
0241 BA38    = 574 TEST1:    MOV     R2,#38H   ;START TAG POINTER
0243 B83F    = 575           MOV     R0,#3FH
0245 FD      = 576 TEST2:    MOV     A,R5      ;START TAG OUTPUT
0246 6B      = 577           ADD     A,R3
0247 AC      = 578           MOV     R4,A
0248 EC48    = 579 TEST3:    DJNZ    R4,TEST3
024A F0      = 580           MOV     A,@R0
             = 581 ;
024B 3251    = 582           JB1     TST31     ;JUMP = SEND SPACE
024D 99FD    = 583           ANL     P1,#0FFH-ETMARK
024F 4455    = 584           JMP     TST32
0251 8902    = 585 TST31:    ORL     P1,#ETMARK
0253 00      = 586           NOP
0254 00      = 587           NOP
             = 588 ;
0255 FD      = 589 TST32:    MOV     A,R5
0256 6B      = 590           ADD     A,R3
0257 AC      = 591           MOV     R4,A
0258 EC58    = 592 TEST4:    DJNZ    R4,TEST4
025A F0      = 593           MOV     A,@R0
             = 594 ;
025B 47      = 595           SWAP    A
025C 3262    = 596           JB1     TST41     ;JUMP = SEND SPACE
025E 99FD    = 597           ANL     P1,#0FFH-ETMARK
0260 4466    = 598           JMP     TST42
0262 8902    = 599 TST41:    ORL     P1,#ETMARK
0264 00      = 600           NOP
0265 00      = 601           NOP
0267 EA45    = 604           DJNZ    R2,TEST2  ;END OF TAG
0269 ED41    = 605           DJNZ    R5,TEST1  ;END OF ALL TAGS
             = 606 ;
026B F5      = 607           SEL     MB1
026C 1400    = 608           CALL    CLR6SG    ;CLEAR 6 CHAR SEG BUFFS & COUNTERS
026E E5      = 609           SEL     MB0
             = 610 ;                           ;SHOULD BE ONLY 12 SEGS, TRY FOR MORE
026F BE18    = 611           MOV     R6,#24
0271 FC      = 612           MOV     A,R4
0272 4301    = 613           ORL     A,#ESCNG  ;SET SCAN FLAG SO CKFCA WILL
0274 AC      = 614           MOV     R4,A      ;PUT SEGMENTS INTO THE SCAN BUFF
0275 F5      = 615 GETLUP:   SEL     MB1
0276 14A4    = 616           CALL    CKFCA     ;GET SEG, IF ANY, FROM FCA
0278 5404    = 617           CALL    PROCSG    ;PUT SEG, IF ANY, INTO SEG BUFF
027A E5      = 618           SEL     MB0
027B EE75    = 619           DJNZ    R6,GETLUP ;GO CHECK FOR MORE SEGMENTS
             = 620 ;                           ;SETUP FOR RIGHT HALF LOOP
027D 85      = 621           CLR     F0
027E B82C    = 622           MOV     R0,#L6SCNT
0280 F0      = 623 TCKCNT:   MOV     A,@R0     ;GET L OR R COUNT
0281 18      = 624           INC     R0
0282 60      = 625           ADD     A,@R0     ;GET L OR R TOTAL
0283 03F4    = 626           ADD     A,#-12
0285 96A7    = 627           JNZ     TTA90     ;JUMP IF X6SCNT+X6STOT<>12
             = 628 ;
0287 B834    = 629           MOV     R0,#R6SCNT
0289 95      = 630           CPL     F0
028A B680    = 631           JF0     TCKCNT    ;JUMP TO DO RIGHT HALF
             = 632 ;                           ;4 BYTES TO COMPARE
028C BA04    = 633           MOV     R2,#4
028E B824    = 634           MOV     R0,#L6S1
0290 B9A9    = 635           MOV     R1,#LOW TTACHK ;DATA CHECK TABLE
0292 F9      = 636 LOOPCK:   MOV     A,R1
0293 A3      = 637           MOVP    A,@A
0294 D0      = 638           XRL     A,@R0
0295 96A7    = 639           JNZ     TTA90     ;JMP IF BAD CHECK OF DATA
             = 640 ;
0297 18      = 641           INC     R0
0298 19      = 642           INC     R1
0299 EA92    = 643           DJNZ    R2,LOOPCK
             = 644 ;
029B B82E    = 645           MOV     R0,#R6S1
029D BA03    = 646           MOV     R2,#3     ;3 BYTES TO COMPARE
029F 95      = 647           CPL     F0
02A0 B692    = 648           JF0     LOOPCK    ;JUMP TO DO RIGHT HALF
             = 649 ;                           ;LOOP COUNTER, RAM SIZE
02A2 B87F    = 650           MOV     R0,#7FH   ;A=0 AT THIS POINT, TEST PASSED
02A4 A0      = 651 CLRRAM:   MOV     @R0,A
```

```
02A5 E8A4      = 652          DJNZ    R0,CLRRAM        ;CLEAR ALL RAM AFTER TESTING
               = 653 ;
02A7 6469      = 654 TTA90:   JMP     TTARET           ;A=0 FOR SUCCESFUL COMPLETION
               = 655 ;
02A9 01        = 656 TTACHK:  DB      01H,23H,45H,0CH
02AA 23        =
02AB 45        =
02AC 0C        =
02AD 67        = 657          DB      67H,89H,12H
02AE 89        =
02AF 12        =
                 658 ;****************************************
02B0 A3          659 TROPG2:  MOVP    A,@A
02B1 83          660          RET
0300             661          ORG     300H
                 662 $        INCLUDE(:F1:TMOTOR.SRC)    ; NOT USED IN 750F    <----
               = 663 ;*********************************************************
               = 664 ; FILE: TMOTOR.SRC  9-11-86 08:45  BOB ACTIS
               = 665 ; FUNCTION: TEST THE MOTOR AND UP2SPD SIGNAL
               = 666 ; ENTRY: NO SETUP
               = 667 ; EXIT: USES R3,R7
               = 668 ;
0300 8912      = 669 TMOTOR:  ORL     P1,#ELASDB+EMTREB       ;LASER OFF, MOTOR ON
0302 55        = 670          STRT    T
0303 25        = 671          EN      TCNTI            ;ENABLE THE TIMER
               = 672 ;
0304 BF05      = 673          MOV     R7,#5            ;SET TIMER FOR 100MSEC
0306 FF        = 674 TMOT10:  MOV     A,R7
               = 676 ;
0309 0A        = 677          IN      A,P2
030A 37        = 678          CPL     A
030B 822F      = 679          JB5     TMOT50           ;JUMP IF NOT UP2SPD
               = 680 ;
               = 681 ; MOTOR OFF AND WAIT FOR IT TO SLOW.  FLASH BOTH LIGHTS.
030D 99FD      = 682          ANL     P1,#255-EMTREB   ;MOTOR OFF
030F BB32      = 683 TMOT20:  MOV     R3,#50           ;SET LOOP COUNTER
0311 BF05      = 684 TMOT22:  MOV     R7,#5            ;SET TIMER FOR 100MSEC
0313           = 685 TMOT24   EQU     $
               = 686 ;        CALL    CK4HRS           ;CHECK FOR HORSE CONTROL BYTE (NOT IMPLEMENTED)
0313 FF        = 687          MOV     A,R7             ;20MSEC*5*50=5SEC
0314 9613      = 688          JNZ     TMOT24           ;WAIT BETWEEN LIGHT TOGGLES
               = 689 ;
0316 CB        = 690          DEC     R3               ;DECREMENT LOOP COUNTER
0317 FB        = 691          MOV     A,R3
0318 C623      = 692          JZ      TMOT28           ;JUMP IF FINISHED WAITING
               = 693 ;
031A 09        = 694          IN      A,P1
031B 999F      = 695          ANL     P1,#255-(EGDLT+EBDLT)  ;LIGHTS OFF
031D B211      = 696          JB5     TMOT22           ;JUMP IF GDLT WAS ON
               = 697 ;
031F 8960      = 698          ORL     P1,#EGDLT+EBDLT  ;LIGHTS ON
0321 6411      = 699          JMP     TMOT22
               = 700 ;
0323 999F      = 701 TMOT28:  ANL     P1,#255-(EGDLT+EBDLT)  ;LIGHTS OFF
               = 702 ;
0325 8902      = 703          ORL     P1,#EMTREB       ;MOTOR ON
0327 BF05      = 704          MOV     R7,#5            ;SET TIMER FOR 100 MSEC
0329 FF        = 705 TMOT40:  MOV     A,R7
032A 9629      = 706          JNZ     TMOT40           ;WAIT FOR MOTOR CIRCUIT TO POWER UP
               = 707 ;
032C 0A        = 708          IN      A,P2
032D B246      = 709          JB5     TMOT90           ;JUMP IF ALREADY UP2SPD ... FAILED
               = 710 ;
               = 711 ; WAIT 30 SECONDS FOR THE MOTOR TO GET UP2SPD.  FLASH GREEN LIGHT.
032F BBFA      = 712 TMOT50:  MOV     R3,#250          ;SET LOOP COUNTER
0331 BF06      = 713 TMOT60:  MOV     R7,#6            ;SET TIMER FOR 120 MSEC
0333           = 714 TMOT80   EQU     $
               = 715 ;        CALL    CK4HRS           ;CHECK FOR HORSE CONTROL BYTE (NOT IMPLEMENTED)
0333 FF        = 716          MOV     A,R7             ;20MS*6*250=30SEC
0334 9633      = 717          JNZ     TMOT80           ;WAIT BETWEEN LIGHT TOGGLES
               = 718 ;
0336 0A        = 719          IN      A,P2
0337 B24B      = 720          JB5     TMOT95           ;JUMP IF MOTOR IS UP2SPD ... PASSED
               = 721 ;
0339 CB        = 722          DEC     R3               ;DECREMENT LOOP COUNTER
033A FB        = 723          MOV     A,R3
033B C646      = 724          JZ      TMOT90           ;JUMP IF TIMED OUT ... FAILED
               = 725 ;
033D 09        = 726          IN      A,P1             ;TOGGLE GDLT WHILE WAITING FOR UP2SPD
033E 990F      = 727          ANL     P1,#255-EGDLT    ;GDLT OFF
0340 B231      = 728          JB5     TMOT60           ;JUMP IF GDLT WAS ON
               = 729 ;
0342 8920      = 730          ORL     P1,#EGDLT        ;GDLT ON
0344 6431      = 731          JMP     TMOT60           ;CONTINUE WAITING FOR UP2SPD
               = 732 ;
               = 733 ; COME HERE IF THE TEST FAILED
0346 99FD      = 734 TMOT90:  ANL     P1,#255-EMTREB   ;MOTOR OFF
```

```
0348 27        = 735            CLR     A
0349 37        = 736            CPL     A           ;SET FAILED FLAG
034A 83        = 737            RET
               = 738 ;
               = 739 ; COME HERE IS THE TEST PASSED
034B 27        = 740 TMOT95:    CLR     A           ;SET PASSED FLAG
034C 83        = 741            RET
               742 $   INCLUDE(:F1:TPONSL.SRC)
               = 743 ;**********************************************************
               = 744 ; FILE: TPONSL.SRC  4-16-87 DREW TAUSSIG
               = 745 ; FUNCTION: PERFORM SELF-TESTS FOR 750SL
               = 746 ;
034D 2400      = 747 TPON:      JMP     TROMSM
034F C655      = 748 TRORET:    JZ      TPON20      ;JUMP IF THE CHECKSUM PASSED
0351 B800      = 749            MOV     R0,#0       ;NO BEEPS WITH THIS ERROR
0353 647B      = 750            JMP     TPON90
               = 751 ;
0357 C65D      = 753 TRARET:    JZ      TPON30      ;JUMP IF THE RAM TEST PASSED
0359 B801      = 754            MOV     R0,#1       ;ONE BEEP FOR THIS ERROR
035B 647B      = 755            JMP     TPON90
               = 756 ;
035D F5        = 757 TPON30:    SEL     MB1
035E 3400      = 758            CALL    MCOMM       ;GET CHECKSUM BYTE FROM SUPER8
0360 E5        = 759            SEL     MB0
0361 C667      = 760            JZ      TPON40      ;VALID CHKSUM SETS A TO 0
0363 B805      = 761            MOV     R0,#5       ;5 BEEPS FOR I/F ROM CHECKSUM ERROR
0365 647B      = 762            JMP     TPON90
               = 763 ;
0367 440E      = 764 TPON40:    JMP     TTAG
0369 99FC      = 765 TTARET:    ANL     P1,#255-(ETEST+ETMARK)  ;CLEAR TEST AND TEST MARK LINES
036B C671      = 766            JZ      TPON50      ;JUMP IF THE TTAG TEST PASSED
036D B803      = 767            MOV     R0,#3       ;THREE BEEPS FOR THIS ERROR
036F 647B      = 768            JMP     TPON90
               = 769 ;
0371 7400      = 770 TPON50:    CALL    TMOTOR
0373 C679      = 771            JZ      TPON60      ;JUMP IF THE MOTOR TEST PASSED
0375 B804      = 772            MOV     R0,#4       ;FOUR BEEPS FOR THIS ERROR
0377 647B      = 773            JMP     TPON90
               = 774 ;
0379 6482      = 775 TPON60:    JMP     TPORET      ;RETURN FROM THE POWER UP TESTS
               = 776 ;
037B 747F      = 777 TPON90:    CALL    TERRWT      ;ERRORS COME HERE
037D 0400      = 778            JMP     RSTTRP      ;RESTART THE PROGRAM
               = 779 ;**********************************************************
               = 780 ; ROUTINE: TERRWT  6-17-86 16:25 BOB ACTIS
               = 781 ; FUNCTION: SELFTEST ERROR ROUTINE
               = 782 ;           BEEP R0 TIMES AND WAIT 1 SECOND
               = 783 ; ENTRY: R0 = NUMBER OF BEEPS
               = 784 ; EXIT: USES R0, R7
               = 785 ;
037F 990F      = 786 TERRWT:    ANL     P1,#255-ECOLT    ;COLT OFF
0381 8940      = 787            ORL     P1,#EBOLT        ;BOLT ON
               = 788 ;
0383 55        = 789            STRT    T
0384 25        = 790            EN      TCNTI            ;ENABLE THE TIMER OPERATION
               = 791 ;
0385 F8        = 792 TERR02:    MOV     A,R0
0386 C698      = 793            JZ      TERR10           ;JUMP IF NO BEEPS
               = 794 ;
0388 D5        = 795 TERR04:    SEL     RB1
0389 BD28      = 796            MOV     R5,#ETONCT       ;SET THE TONE CYCLE COUNTER
038B BE02      = 797            MOV     R6,#2            ;SET BEEP TIMER FOR 40 MSEC
038D FE        = 798 TERR06:    MOV     A,R6
038E 968D      = 799            JNZ     TERR06           ;WAIT FOR BEEP TO END
0390 C5        = 800            SEL     RB0
               = 801 ;
0391 BF03      = 802            MOV     R7,#3            ;SET TIMER FOR 60 MSEC
0393 FF        = 803 TERR08:    MOV     A,R7
0394 9693      = 804            JNZ     TERR08           ;WAIT BETWEEN BEEPS
               = 805 ;
0396 E888      = 806            DJNZ    R0,TERR04        ;BEEP LOOP
               = 807 ;
0398 BF32      = 808 TERR10:    MOV     R7,#E1000M       ;SET TIMER FOR 1 SECOND
039A FF        = 809 TERR12:    MOV     A,R7
039B 969A      = 810            JNZ     TERR12
               = 811 ;
039D 83        = 812            RET
               813 $   INCLUDE(:F1:FPOWUP.SRC)
;**********************************************
TROPG3: MOVP   A,@A
        RET
        ORG    400H
$       INCLUDE(:F1:HO
               = 814 ;**********************************************************
               = 815 ; FILE: FPOWUP.SRC 12-09-86 13:50 BOB ACTIS
               = 816 ; ROUTINE: POWUP
               = 817 ; FUNCTION: INITIALIZE SYSTEM
               = 818 ;
039E 93        = 819 POW00:     RETR                    ;RESET THE IIP FLIP-FLOP
```

```
039F              = 820  POWUP  EQU    $
039F 15           = 821         DIS    I
03A0 35           = 822         DIS    TCNTI
03A1 27           = 823         CLR    A
03A2 D7           = 824         MOV    PSW,A
                  = 826 ;
                  = 827 ; SETUP PORTS
03A5 238F         = 828         MOV    A,#255-EVLSIR    ;PWR RST THE VLSI (NO EFFECT ON 750F)
03A7 3A           = 829         OUTL   P2,A
03A8 8A40         = 830         ORL    P2,#EVLSIR       ;ENABLE VLSI TO RUN
03AA 239C         = 831         MOV    A,#EP12+EP13+ETONE+ELASDB
03AC 39           = 832         OUTL   P1,A
                  = 833 ;
                  = 834 ; RESET THE FRAME CONTROL ARRAY
03AD 8803         = 835         MOV    R0,#EFCRST
03AF 90           = 836         MOVX   @R0,A
                  = 837 ;
                  = 838 ; GO PERFORM THE POWER UP TESTS.
                  = 839 ; STICK IN TPON LOOP IF ANY FAILURES.
03B0 644D         = 840         JMP    TPON
03B2              = 841  TPORET EQU    $
                  = 842 ;
                  = 843 ; TPON PASSED.  START THE INTERNAL TIMER
03B2 D5           = 844         SEL    RB1
03B3 BD28         = 845         MOV    R5,#ETONCT       ;SET THE TONE CYCLE COUNTER
03B5 C5           = 846         SEL    RB0
03B6 55           = 847         STRT   T
03B7 25           = 848         EN     TCNTI
                  = 849 ;
                  = 850 ; GREEN LIGHT, GOOD POWER UP TONE, LASER ON AND WAIT 1 SEC.
03B8 8920         = 851         ORL    P1,#EGDLT
03BA D5           = 852         SEL    RB1
03BB BE04         = 853         MOV    R6,#E80MS        ;200MSEC BEEP FOR 750SL, 80MS FOR 750F
03BD C5           = 854         SEL    RB0
03BE 99EF         = 855         ANL    P1,#255-ELASDB   ;LASER ON, TIME TO START BEFORE RDTAG
03C0 BF32         = 856         MOV    R7,#E1000H
03C2 FF           = 857  TPON15: MOV   A,R7
03C3 96C2         = 858         JNZ    TPON15           ;WAIT
                  = 859 ;
                  = 860 ; REINITIALIZE AFTER TEST SEQUENCE
03C5 99CF         = 861  POW20: ANL    P1,#255-(EGDLT+ELASDB)  ;GOOD LIGHT OFF & LASER ON
03C7 8942         = 862         ORL    P1,#EBDLT+EMTREB        ;BAD LIGHT ON & MOTOR ON (NO MOTOR ON F)
                  = 863 ;
03C9 8803         = 864         MOV    R0,#EFCRST
03CB 90           = 865         MOVX   @R0,A            ;RESET THE FCA
03CC BF02         = 866         MOV    R7,#2            ;SET TIMER FOR 40 MSEC
03CE FF           = 867  POW25: MOV    A,R7
03CF 96CE         = 868         JNZ    POW25            ;WAIT FOR FCA TO SEE SEGS IF ANY
                  = 869 ;
                  = 870 ; CLEAR DATA MEMORY AND PSW
03D1 27           = 871         CLR    A
03D2 D7           = 872         MOV    PSW,A            ;CLEAR THE PSW
03D3 B87F         = 873         MOV    R0,#7FH
03D5 A0           = 874  POW30: MOV    @R0,A            ;CLEAR MEMORY
03D6 E8D5         = 875         DJNZ   R0,POW30
                  = 876 ;
03D8 D5           = 877         SEL    RB1
03D9 BD28         = 878         MOV    R5,#ETONCT       ;SET THE TONE CYCLE COUNTER
03DB C5           = 879         SEL    RB0
                  = 880 ;
03DC B87D         = 881         MOV    R0,#CONFIG
03DE B000         = 882         MOV    @R0,#0           ;SETUP CONFIGURATION REGISTER
                  = 883 ;
03E0 F5           = 884         SEL    MB1
03E1 C400         = 885         JMP    RDTAG
                  886  ;*****************************************
03E3 A3           887  TRPG3: MOVP    A,@A
03E4 83           888         RET
0400              889         ORG     400H
                  890  $     INCLUDE(:F1:HORSE1.SRC)
                  = 891 ;**************************************************************
                  = 892 ; FILE: HORSE1.SRC   HORSE TEST PART 1 OF 3.
                  = 893 ; 07-03-86 09:05 BOB ACTIS
                  = 894 ;
                  = 895 ; ROUTINE: THORSE
                  = 896 ;
                  = 897 ;      HORSE TEST (HOST ORIGINATED SEGMENT EVALUATION) WILL RECEIVE
                  = 898 ;      TEST TAG DEFINITION FROM HOST, COUNT THE NUMBER OF TIMES IT
                  = 899 ;      'SEES' EACH SEGMENT OF THE TAG AND THEN SEND THE COUNT
                  = 900 ;      INFORMATION TO THE HOST....REMAINS IN HORSE TEST UNTIL
                  = 901 ;      DSATA=0, OR POWER RESET.
                  = 903 ; BYTE DEFINITION
                  = 904 ;
                  = 905 ; TEST CONTROL BYTE = D1H
                  = 906 ; THHDR = COUNT HEADER BYTE = 15H (AFTER PARITY INSERT = 95H)
                  = 907 ; THTRLR = COUNT TRAILER BYTE = 2AH (AFTER PARITY INSERT = 6AH)
                  = 908 ;
0400 85           = 909  TH000: CLR    F0               ;F0 INDICATES CONTROL BYTE RECEIVED IF ON
```

```
0401 A5        = 910          CLR    F1             ;F1 ON INDICATES ODD BYTE RECEIVED
0402 B830      = 911          MOV    R0,#TSEG1      ;R0=SEG TABLE POINTER
0404 BB10      = 912          MOV    R3,#16         ;R3=LOOP COUNTER TO RECEIVE 16 DATA CHAR'S
0406 999F      = 913          ANL    P1,#255-(EGDLT+EBDLT)  ;LIGHTS OFF
0408 8910      = 914          ORL    P1,#ELASDB     ;LASER OFF
040A 860E      = 915 TH005:   JNI    TH010          ;JMP IF FCA HAS DATA
040C 840A      = 916          JMP    TH005
               = 917 ;
               = 918 ;        FETCH DATA FROM FCA, DO FRAME RESET TO FCA, FETCH COMM DATA
               = 919 ;        IF BIT 7 SET, JMP TO POWER UP RESET IF COMM DATA=0.
               = 920 ;
040E B901      = 921 TH010:   MOV    R1,#01H
0410 81        = 922          MOVX   A,@R1          ;READ FCA S.R.
0411 91        = 923          MOVX   @R1,A          ;DO FCA FRAME RESET
0412 37        = 924          CPL    A
0413 F20A      = 925          JB7    TH005          ;RETURN IF FCA DOES NOT HAVE COMM DATA
               = 926 ;
               = 927 ;        OTHERWISE, FETCH COMM DATA
               = 928 ;
0415 19        = 929          INC    R1             ;TO 02H TO READ COMM REG
0416 81        = 930          MOVX   A,@R1          ;READ FCA COMM REG
0417 A9        = 931          MOV    R1,A           ;R1=COMM DATA
0418 961C      = 932          JNZ    TH014          ;JMP IF DATA NOT=0
041A 0400      = 933 TH012:   JMP    RSTTRP         ;JMP TO POWER UP RESET IF COMM DATA=0
               = 934 ;
041C B40E      = 935 TH014:   CALL   CPARTY         ;CPARTY WILL CHK FOR CORRECT PARITY
041E 17        = 936          INC    A
041F 9600      = 937          JNZ    TH000          ;JMP BACK TO START IF INCORRECT PARITY
0421 F9        = 938          MOV    A,R1           ;R1=COMM DATA
0422 B62D      = 939          JF0    TH015          ;JMP IF CONTROL BYTE ALREADY RECEIVED
               = 940                                ;OTHERWISE, CHECK FOR CONTROL BYTE=01H
0424 D301      = 941          XRL    A,#001H
0426 9600      = 942          JNZ    TH000          ;JMP BACK TO START IF NOT CONTROL BYTE
0428 95        = 943          CPL    F0             ;SET F0=1 TO INDICATE CONTROL BYTE RCVD
0429 8940      = 944          ORL    P1,#EBDLT      ;BD-LT ON SAYS CNTL BYTE RCVD
042B 840A      = 945          JMP    TH005          ;BACK TO TH005 TO GET 16 DATA BYTES
               = 946 ;
               = 947 ;        PUT EVEN BYTES IN HIGH NIBBLE & ODD BYTES IN LOW NIBBLE
               = 948 ;
042D F9        = 949 TH015:   MOV    A,R1           ;R1=COMM DATA
042E 7634      = 950          JF1    TH020          ;JMP IF THIS IS ODD BYTE
0430 47        = 951          SWAP   A
0431 A0        = 952          MOV    @R0,A          ;PUT EVEN BYTE IN HIGH NIBBLE
0432 8436      = 953          JMP    TH029
0434 30        = 954 TH020:   XCHD   A,@R0          ;PUT ODD BYTE IN LOW NIBBLE
0435 18        = 955          INC    R0             ;INC R0 TO NEXT SEG TABLE ADDRESS
               = 956 ;
               = 957 ;        CHECK FOR LAST BYTE OF CONTROL BYTE
               = 958 ;
0436 85        = 959 TH029:   CPL    F1
0437 F9        = 960          MOV    A,R1
0438 9200      = 961          JB4    TH000          ;JMP = CONTROL BYTE
043A B240      = 962          JB5    TH030          ;JMP = LAST BYTE RCVD
043C EB0A      = 963          DJNZ   R3,TH005       ;JMP = MORE TO COME
043E 8400      = 964          JMP    TH000
               = 965 ;
               = 966 ;        IF 16 BYTES RECEIVED, PERFORM TEST
               = 967 ;
0440 EB00      = 968 TH030:   DJNZ   R3,TH000       ;JMP = NOT 16 BYTES
0442 9462      = 969          CALL   TSCNT          ;GO COLLECT SEGMENTS
               = 970 ;
               = 971 ;        SEND HEADER, COUNTS AND LAST BYTE TO COMPUTER
               = 972 ;
0444 B915      = 973          MOV    R1,#15H        ;SEND COUNT HEADER BYTE TO HOST
0446 B400      = 974          CALL   THSND          ;SEND HEADER
               = 975 ;
0448 BB08      = 976          MOV    R3,#8
044A B838      = 977          MOV    R0,#TCNT1      ;R0=COUNT POINTER
044C FB        = 978 TH050:   MOV    A,R3
044F F0        = 980          MOV    A,@R0
0450 47        = 981          SWAP   A
0451 8455      = 982          JMP    TH059
0453 30        = 983 TH055:   XCHD   A,@R0
0454 18        = 984          INC    R0
0455 530F      = 985 TH059:   ANL    A,#0FH
0457 A9        = 986          MOV    R1,A
0458 B400      = 987          CALL   THSND
045A EB4C      = 988          DJNZ   R3,TH050
               = 989 ;                              ;2AH = COUNT TRAILER BYTE
045C B92A      = 990          MOV    R1,#2AH        ;SEND TRAILER BYTE
045E B400      = 991          CALL   THSND
0460 8400      = 992          JMP    TH000          ;FINISHED WITH THIS REQUEST, START OVER.
                 993 $        INCLUDE(:F1:HORSE2.SRC)
               = 994 ;***********************************************************
               = 995 ;  FILE:  HORSE2.SRC  HORSE TEST PART 2 OF 3.
               = 996 ;        07-03-86 10:35 BOB ACTIS
               = 997 ;
```

```
= 998 ; ROUTINE: TSCNT - COUNT TEST SEGMENTS
= 999 ;
=1000 ; FUNCTION: COUNT THE NUMBER OF TIMES EACH OF TWO SEGMENTS ARE DETECTED
=1001 ;           OVER A ONE SECOND PERIOD. TURN THE LASER ON DURING THE TEST.
=1002 ;           EXIT TO POWER ON ENTRY IF ANYTHING RECEIVED FROM HOST.
=1003 ;           WILL COMPARE 1ST 2 CHAR'' OF SEGMENT CAPTURED WITH
=1004 ;           TSEG1 & TSEG2 AND RESET FCA SHIFT REG IF NO COMPARE.
=1005 ;           4 CHAR SEG'S MUST BE PRECEDED BY 00H IN THE SEG TABLE...
=1006 ;
=1007 ; ENTRY:
=1008 ;           TSEG1 = SEGMENT 1 DEFINITION (4 BYTES)
=1009 ;           TSEG2 = SEGMENT 2 DEFINITION (4 BYTES)
=1010 ;
=1011 ; EXIT:
=1012 ;           TCNT1 = SEGMENT 1 COUNT (2 BYTES)
=1013 ; .         TCNT2 = SEGMENT 2 COUNT (2 BYTES)
=1014 ;
=1015 ; *( A)
=1016 ; *(R0)
=1017 ; *(R1)
=1018 ; *(TSCBUF) TO (TSCBUF+3)
=1019 ;   RB0 (R7) = SECOND TIMER = 0
=1020 ;
=1021 ; PARAMETERS:
=1022 ;
=1023 ;           SEGMENT DEFINITION TABLE
=1024 ;                                  *
=1025 ;           BYTE 0 - 1ST AND 2ND CHAR (AS DETECTED OR ZERO IF 4-CHAR)
=1026 ;           BYTE 1 - 3RD AND 4TH CHAR (1ST & 2ND ON 4-CHAR)
=1027 ;           BYTE 2 - 5TH AND 6TH CHAR (3RD & 4TH ON 4-CHAR)
=1028 ;           BYTE 3 - DECODED PARITY WORD
=1029 ;
0462 99EF   =1030 TSCNT:  ANL    P1,#0FFH-ELASDB  ;LASER ON
0464 BF02   =1031         MOV    R7,#02H
0466 B43B   =1032         CALL   TMWAIT           ;WAIT FOR LASER TO TURN ON
0468 BF32   =1033         MOV    R7,#E1000H
046A 27     =1034         CLR    A
046B B838   =1035         MOV    R0,#TCNT1
046D B909   =1036         MOV    R1,#9
046F A0     =1037 TSC02:  MOV    @R0,A            ;CLEAR TCNT1 TO TCNT1+9
0470 18     =1038         INC    R0
0471 E96F   =1039         DJNZ   R1,TSC02
            =1040 ;
            =1041 ; RESET FCA TO CLEAR ANY SEGMENTS
            =1042 ;
0473 B803   =1043         MOV    R0,#EFCRST
0475 90     =1044         MOVX   @R0,A
            =1045 ;
            =1046 ; IF SYMCAP THEN READ THE SEGMENT; EXIT IF HOST BYTE RECEIVED.
            =1047 ;
0476 A5     =1048 TSC04:  CLR    F1               ;F1 REMEMBERS TO INC TCNT1 OR TCNT2
0477 B801   =1049         MOV    R0,#ESRRD
0479 8680   =1050 TSC05:  JNI    TSC08            ;JMP IF SYMCAP OR HOST COMM. OCCURED
047B FF     =1051 TSC06:  MOV    A,R7             ;CHECK FOR 1 SECOND TIMEOUT
047C 9676   =1052         JNZ    TSC04
            =1053 ;
            =1054 ;   TURN LASER OFF & RETURN TO CALLER
            =1055 ;
0480 83     =1057         RET
            =1058 ;
0481 90     =1059 TSC07:  MOVX   @R0,A            ;RESET FCA SHIFT REG
0482 847B   =1060         JMP    TSC06
            =1061 ;
0484 80     =1062 TSC12:  MOVX   A,@R0            ;SHIFT OUT 2ND CHAR FROM FCA
0485 27     =1063         CLR    A
0486 B950   =1064         MOV    R1,#TSCBUF
0488 A1     =1065         MOV    @R1,A            ;PUT 00 TO R4 FOR 1ST TWO CHAR'S
0489 8499   =1066         JMP    TSC09
048B 0400   =1067 TSC11:  JMP    RSTTRP
048D B950   =1068 TSC08:  MOV    R1,#TSCBUF       ;START OF DATA CAPTURE BUFFER
048F 80     =1069         MOVX   A,@R0            ;READ 1ST CHAR FROM FCA
0490 F288   =1070         JB7    TSC11            ;JMP TO POWER UP SEQ IF COMM. FROM HOST
0492 9284   =1071         JB4    TSC12            ;JMP IF 4 CHAR SEG...1ST 2 CHARS=00
0494 47     =1072         SWAP   A
0495 A1     =1073         MOV    @R1,A
0496 80     =1074         MOVX   A,@R0            ;READ 2ND CHAR FROM FCA
0497 31     =1075         XCHD   A,@R1
0498 F1     =1076         MOV    A,@R1
0499 B930   =1077 TSC09:  MOV    R1,#TSEG1
049B D1     =1078         XRL    A,@R1            ;COMPARE 1ST 2 CHAR'S WITH TSEG1
049C C6A6   =1079         JZ     TSC10            ;JMP IF COMPARED
049E B934   =1080         MOV    R1,#TSEG2
04A0 F1     =1081         MOV    A,@R1
04A1 B950   =1082         MOV    R1,#TSCBUF
04A3 D1     =1083         XRL    A,@R1            ;COMPARE 1ST 2 CHAR'S WITH TSEG2
04A4 9681   =1084         JNZ    TSC07            ;JMP TO RESET FCA S.R. IF NO COMPARE
            =1085 ;
04A6 B951   =1086 TSC10:  MOV    R1,#TSCBUF+1     ;SET UP TO READ NEXT 4 CHAR'S
```

```
04A8 B416    =1087           CALL    NEXT4       ;READ 3RD-6TH CHAR'S
             =1088 ;
04AA B831    =1089           MOV     R0,#TSEG1+1 ;COMPARE COMPLETE SEG TO TSEG1 & 2
04AC B42A    =1090           CALL    SGMTCH      ;COMPARE LAST 4 CHAR'S OF CAPTURED SEG
             =1091                               ;TO TSEG1
04AE C68B    =1092           JZ      SEGONE      ;JMP IF SEG 1 COMPARED
04B0 B5      =1093           CPL     F1          ;F1=1 SAYS TSEG2 BEING COMPARED
04B1 B835    =1094           MOV     R0,#TSEG2+1
04B3 B42A    =1095           CALL    SGMTCH
04B5 967B    =1096           JNZ     TSC06       ;JMP IF NO MATCH
04B7 B83B    =1097           MOV     R0,#TCNT2+1
04B9 7680    =1098           JF1     INCREM      ;JMP IF TSEG 2 MATCHED TO INCREMENT
04BB B839    =1099 SEGONE:   MOV     R0,#TCNT1+1 ;SET UP R0 TO INCREMENT TSEG 1 CNTR
04BD 17      =1100 INCREM:   INC     A           ;ACC NOW = 01
04BE 60      =1101           ADD     A,@R0       ;INC LOW BYTE
04BF A0      =1102           MOV     @R0,A
04C0 C8      =1103           DEC     R0
04C1 27      =1104           CLR     A
04C2 70      =1105           ADDC    A,@R0       ;INC HIGH BYTE IF CARRY
04C3 A0      =1106           MOV     @R0,A
04C4 847B    =1107           JMP     TSC06       ;JMP TO CHK FOR 1 SECOND TIMEOUT
              1108 ;************************************
04C6 A3       1109 TROPG4:   MOVP    A,@A
04C7 83       1110           RET
              1111           ORG     500H
0500          1112 $ INCLUDE(:F1:HORSE3.SRC)
             =1113 ;*********************************************************
             =1114 ; FILE: HORSE3.SRC HORSE TEST FILE 3 OF 3.
             =1115 ; 07-03-86 09:30 BOB ACTIS
             =1116 ;*********************************************************
             =1117 ; ROUTINE: THSND
             =1118 ;
             =1119 ; FUNCTION: SEND A BYTE TO HOST. WAITS FOR TRANSMITTER READY.
             =1120 ;
             =1121 ; ENTRY:
             =1122 ;         (R1) = BYTE TO SEND (NO PARITY)
             =1123 ;
             =1124 ; EXIT:
             =1125 ;         *(A)
             =1126 ;         *(R1)
             =1127 ;         *(R4)
             =1128 ;
0500 0A      =1129 THSND:    IN      A,P2
0501 9200    =1130           JB4     THSND       ;JMP = HOST COMM. REG. NOT READY
0503 F9      =1131           MOV     A,R1        ;(A) = BYTE
0504 B40E    =1132           CALL    CPARTY
0507 53C0    =1134           ANL     A,#0C0H
0509 49      =1135           ORL     A,R1        ;(A) = FINAL BYTE WITH PARITY
050A B902    =1136           MOV     R1,#EOCIA
050C 91      =1137           MOVX    @R1,A
050D 83      =1138           RET
             =1139 ;*********************************************************
             =1140 ; ROUTINE: CPARTY
             =1141 ;
             =1142 ; FUNCTION: COMPUTE PARITY OF ALTERNATE BITS OF BYTE
             =1143 ;
             =1144 ; ENTRY:
             =1145 ;         (A) = BYTE
             =1146 ;
             =1147 ; EXIT:
             =1148 ;         (A) = PARITY
             =1149 ;               B7 = B5 = B3 = B1 = PARITY OF ODD BITS
             =1150 ;               B6 = B4 = B2 = B0 = PARITY OF EVEN BITS
             =1151 ;         *(R4)
             =1152 ;
050E AC      =1153 CPARTY:   MOV     R4,A
050F 47      =1154           SWAP    A
0510 DC      =1155           XRL     A,R4
0511 AC      =1156           MOV     R4,A
0512 E7      =1157           RL      A
0513 E7      =1158           RL      A
0514 DC      =1159           XRL     A,R4
0515 83      =1160           RET
             =1161 ;*********************************************************
             =1162 ; NEXT4: READ 3RD-6TH CHARACTERS
             =1163 ;
0516 80      =1164 NEXT4:    MOVX    A,@R0       ;READ 3RD CHAR FROM LSI3
0517 47      =1165           SWAP    A
0518 A1      =1166           MOV     @R1,A       ;PUT 3RD TO HI NIB. OF TSCBUF+1
0519 80      =1167           MOVX    A,@R0       ;READ 4TH CHAR
051A 31      =1168           XCHD    A,@R1       ;PUT 4TH TO LO TSCBUF+1
051B 19      =1169           INC     R1          ;POINTS TO TSCBUF+2 NOW
051C 80      =1170           MOVX    A,@R0       ;READ 5TH CHAR
051D 47      =1171           SWAP    A
051E A1      =1172           MOV     @R1,A       ;PUT 5TH TO HI TSCBUF+2
051F 80      =1173           MOVX    A,@R0       ;READ 6TH CHAR
0520 31      =1174           XCHD    A,@R1       ;PUT 6TH TO LO TSCBUF+2
```

```
0521 19      =1175          INC    R1
0522 B804    =1176          MOV    R0,#04H
0524 80      =1177          MOVX   A,@R0        ;R0=04H,@R0=PARITY DECODE READ OF LSI3
0525 A1      =1178          MOV    @R1,A        ;PUT PARITY DECODE TO TSCBUF+3
0526 B801    =1179          MOV    R0,#01H
0528 90      =1180          MOVX   @R0,A        ;FR.RST TO LSI 3
0529 83      =1181          RET
             =1182 ;************************************************************
             =1183 ; ROUTINE: SGMTCH - MATCH SEGMENTS
             =1184 ;
             =1185 ; FUNCTION: DETERMINE IF TWO SEGMENTS HAVE IDENTICAL DATA AND PARITY
             =1186 ;           (LAST 4 CHARACTERS OF SEG AND PARITY)
             =1187 ;
             =1188 ; ENTRY:
             =1189 ;      (R0) = ADRS OF ONE SEGMENT - SAME FORMAT AS REG 4-7
             =1190 ;      (TSCBUF+1) = 3RD AND 4TH CHAR
             =1191 ;      (TSCBUF+2) = 5TH AND 6TH CHAR
             =1192 ;      (TSCBUF+3) = DECODED PARITY WORD
             =1193 ;
             =1194 ; EXIT:
             =1195 ;      (A) = 0 FOR MATCH
             =1196 ;      *(R0)
             =1197 ;
052A F0      =1198 SGMTCH: MOV   A,@R0
052B B951    =1199          MOV   R1,#TSCBUF+1
052D D1      =1200          XRL   A,@R1
052E 963A    =1201          JNZ   SGM90        ;JMP = 2ND BYTE NO MATCH
0530 18      =1202          INC   R0
0531 19      =1203          INC   R1
0532 F0      =1204          MOV   A,@R0
0533 D1      =1205          XRL   A,@R1
0534 963A    =1206          JNZ   SGM90        ;JMP = 3RD BYTE NO MATCH
0536 18      =1207          INC   R0
0537 19      =1208          INC   R1
0538 F0      =1209          MOV   A,@R0
053A 83      =1211 SGM90:  RET
             =1212 ;************************************************************
             =1213 ; ROUTINE: TMWAIT
             =1214 ;
             =1215 ; FUNCTION: WAIT FOR 20MSEC TIMER TO EXHAUST
             =1216 ;
             =1217 ; ENTRY:
             =1218 ;      RB0 (R7) = TIMER (20MSEC RES)
             =1219 ;
             =1220 ; EXIT:
             =1221 ;      RB0 (R7) = 0
             =1222 ;
053B 27      =1223 TMWAIT: CLR   A
053C 62      =1224          MOV   T,A          ;CLEAR THE TIMER COUNTER
053D 25      =1225          EN    TCNTI        ;ENABLE TIMER INTERRUPT
053E 55      =1226          STRT  T            ;CLEAR TIMER PRESCALER
             =1227 ;
053F FF      =1228 TMWAI0: MOV   A,R7
0540 963F    =1229          JNZ   TMWAI0
0542 83      =1230          RET
             1231 ;***********************************
0543 A3      1232 TROPG5: MOVP  A,@A
0544 83      1233          RET
0600         1234          ORG   600H
             1235 $        INCLUDE(:F1:FCKCTS.SRC)
             =1236 ;************************************************************
             =1237 ; FILE: FCKCTS.SRC  10-08-86 15:45  BOB ACTIS
             =1238 ; ROUTINE: CKCNTS
             =1239 ; FUNCTION: CHECK SEGMENT BUFFER TOTAL COUNTS FOR ENOUGH SEGMENTS FOR
             =1240 ;           A POSSIBLE VALID VERSION.
             =1241 ; ENTRY: NO SETUP
             =1242 ; EXIT:  A = 0 IF ENOUGH SEGMENTS
             =1243 ;        A <> 0 IF NOT ENOUGH SEGMENTS OR (VERSION D IF IBM-OCR I/F)
             =1244 ;        USES R0,R1,F0
             =1245 ;
0600 B9FE    =1246 CKCNTS: MOV   R1,#-2       ;SETUP MINIMUM SCANS REQUIRED VALUE
             =1247 ;
0602 85      =1248          CLR   F0
0603 0A      =1249          IN    A,P2
0604 37      =1250          CPL   A
0605 F208    =1251          JB7   CKCN05       ;JUMP IF FUJITSU I/F
0607 95      =1252          CPL   F0           ;SET F0 IF IBM-OCR I/F
             =1253 ;
0608 B835    =1254 CKCN05: MOV   R0,#R6STOT
060A F0      =1255          MOV   A,@R0
060B 69      =1256          ADD   A,R1
060C F622    =1257          JC    CKCN20       ;POSSIBLE UPC-A, EAN-13 OR UPC-D-BLK2
             =1258 ;
060E B82D    =1259          MOV   R0,#L6STOT
0610 F0      =1260          MOV   A,@R0
0611 69      =1261          ADD   A,R1
0612 F62F    =1262          JC    CKCN30       ;POSSIBLE UPC-E OR UPC-D-BLK1
             =1263 ;
```

```
0614 B838    =1264         MOV    R0,#L4STOT
0616 F0      =1265         MOV    A,@R0
0617 69      =1266         ADD    A,R1
0618 E695    =1267         JNC    CKCNNG
             =1268 ;
061A B841    =1269 CKCN10: MOV    R0,#R4STOT
061C F0      =1270         MOV    A,@R0
061D 69      =1271         ADD    A,R1
061E F693    =1272         JC     CKCNOK       ;POSSIBLE EAN-8
0620 C495    =1273         JMP    CKCNNG
             =1274 ;
0622 B82D    =1275 CKCN20: MOV    R0,#L6STOT
0624 F0      =1276         MOV    A,@R0
0625 69      =1277         ADD    A,R1
0626 E695    =1278         JNC    CKCNNG
             =1279 ;
0628 B827    =1280         MOV    R0,#L6S1+3   ;GET THE PARITY DECODE BYTE
062A F0      =1281         MOV    A,@R0        ;JUMP IF UPC-D SEGMENT
062B B24F    =1282         JB5    CKCN50       ;POSSIBLE UPC-A OR EAN-13
062D C493    =1283         JMP    CKCNOK
             =1284 ;
062F B827    =1285 CKCN30: MOV    R0,#L6S1+3   ;CHECK L6 BUFFER 1
0631 F0      =1286         MOV    A,@R0
             =1288         JB4    CKCNOK       ;POSSIBLE UPC-E
0634 9293
             =1289 ;
0636 B82B    =1290         MOV    R0,#L6S2+3   ;CHECK L6 BUFFER 2
0638 F0      =1291         MOV    A,@R0
0639 B23F    =1292         JB5    CKCN40       ;JUMP IF UPC-D SEGMENT
063B 9293    =1293         JB4    CKCNOK       ;POSSIBLE UPC-E
063D C495    =1294         JMP    CKCNNG
             =1295 ;
063F B865    =1296 CKCN40: MOV    R0,#N6STOT
0641 F0      =1297         MOV    A,@R0
0642 69      =1298         ADD    A,R1
0643 E695    =1299         JNC    CKCNNG
             =1300 ;
0645 B838    =1301 CKCN45: MOV    R0,#L4STOT
0647 F0      =1302         MOV    A,@R0
0648 69      =1303         ADD    A,R1
0649 B695    =1304         JF0    CKCNNG       ;JUMP IF IBM-OCR
064B F693    =1305         JC     CKCNOK       ;POSSIBLE UPC-D1
064D C495    =1306         JMP    CKCNNG
             =1307 ;
064F B841    =1308 CKCN50: MOV    R0,#R4STOT
0651 F0      =1309         MOV    A,@R0
0652 69      =1310         ADD    A,R1
0653 E695    =1311         JNC    CKCNNG
             =1312 ;
0655 B859    =1313         MOV    R0,#N4STOT
0657 F0      =1314         MOV    A,@R0
0658 69      =1315         ADD    A,R1
0659 F675    =1316         JC     CKCN70       ;POSSIBLE UPC-D4 OR D5
             =1317 ;
065B B85F    =1318         MOV    R0,#N5STOT
065D F0      =1319         MOV    A,@R0
065E 69      =1320         ADD    A,R1
065F F668    =1321         JC     CKCN60
             =1322 ;
0661 B84D    =1323         MOV    R0,#N2STOT
0663 F0      =1324         MOV    A,@R0
0664 69      =1325         ADD    A,R1
0665 B695    =1326         JF0    CKCNNG       ;JUMP IF IBM-OCR
0667 F693    =1327         JC     CKCNOK       ;POSSIBLE UPC-D2
0669 C495    =1328         JMP    CKCNNG
             =1329 ;
066B B853    =1330 CKCN60: MOV    R0,#N3STOT
066D F0      =1331         MOV    A,@R0
066E 69      =1332         ADD    A,R1
066F B695    =1333         JF0    CKCNNG       ;JUMP IF IBM-OCR
0671 F693    =1334         JC     CKCNOK       ;POSSIBLE UPC-D3
0673 C495    =1335         JMP    CKCNNG
             =1336 ;
0675 B847    =1337 CKCN70: MOV    R0,#N1STOT
0677 F0      =1338         MOV    A,@R0
0678 69      =1339         ADD    A,R1
0679 E695    =1340         JNC    CKCNNG
             =1341 ;
067B B865    =1342         MOV    R0,#N6STOT
067D F0      =1343         MOV    A,@R0
067E 69      =1344         ADD    A,R1
067F F688    =1345         JC     CKCN80
             =1346 ;
0681 B85F    =1347         MOV    R0,#N5STOT
0683 F0      =1348         MOV    A,@R0
0684 69      =1349         ADD    A,R1
0685 B695    =1350         JF0    CKCNNG       ;JUMP IF IBM-OCR
0687 F693    =1351         JC     CKCNOK       ;POSSIBLE UPC-D4
0689 C495    =1352         JMP    CKCNNG
```

```
                =1353 ;
0688 8853       =1354 CKCN80:  MOV     R0,#N3STOT
068D F0         =1355          MOV     A,@R0
068E 69         =1356          ADD     A,R1
068F 8695       =1357          JF0     CKCNNG          ;JUMP IF IBM-OCR
0691 E695       =1358          JNC     CKCNNG          ;FALL THRU POSSIBLE UPC-D5
                =1359 ;
0693 27         =1360 CKCNOK:  CLR     A               ;ENOUGH SCANS FOR A POSSIBLE SEGMENT
0694 83         =1361          RET
                =1362 ;
0695 27         =1363 CKCNNG:  CLR     A               ;NO POSSIBLE VERSIONS YET
0697 83         =1365          RET
                 1366 $        INCLUDE(:F1:COPYRT.SRC)
                =1367 ;************************************************************
                =1368 ;
0698 434F5059   =1369          DB      'COPYRIGHT (C)1987 '
069C 52494748
06A0 54202843
06A4 29313938
06A8 3720
06AA 53504543   =1370          DB      'SPECTRA-PHYSICS, INC.
06AE 54524120
06B2 50485953
06B6 4943532C
06BA 20494E43
06BE 2E20
06C0 414C4C20   =1371          DB      'ALL RIGHTS RESERVED'
06C4 52494748
06C8 54532052
06CC 45534552
06D0 564544
                =1372 ;
                =1373 ;************************************************************
                 1374 ;************************************************************
06D3 A3          1375 TROPG6:  MOVP    A,@A
06D4 83          1376          RET
                 1377          ORG     700H
0700             1378 $        INCLUDE(:F1:DRSUMT.SRC)
                =1379 ;************************************************************
                =1380 ; FILE: DRSUMT  05-28-86 11:00  BOB ACTIS
                =1381 ;************************************************************
                =1382 ; ROUTINE: SUM4BY, SUM3BY, SUM2BY
                =1383 ; FUNCTION: ADD 4,3 OR 2 BYTE SEGMENT DATA TO ACCUMULATOR
                =1384 ; ENTRY: R0 = START ADDRESS OF SEGMENT BUFFER TO SUM
                =1385 ; EXIT:  R0 = END ADDRESS OF SEGMENT BUFFER
                =1386 ;        A  = RUNNING SUM (BASE 256) OF SEGMENT BUFFER DATA
                =1387 ;
0700 60         =1388 SUM4BY:  ADD     A,@R0
0701 18         =1389          INC     R0
0702 60         =1390 SUM3BY:  ADD     A,@R0
0703 18         =1391          INC     R0
0704 60         =1392 SUM2BY:  ADD     A,@R0
0705 18         =1393          INC     R0
0706 60         =1394          ADD     A,@R0
0707 83         =1395          RET
                =1396 ;************************************************************
                =1397 ; ROUTINE: DRSUMT  DOUBLE READ SUM TEST
                =1398 ; FUNCTION: CALCULATE THE LABEL DATA SUM (BASE 256)
                =1399 ;           COMPARE IT TO THE PREVIOUS LABEL SUM
                =1400 ;           SAVE THE NEW SUM
                =1401 ; ENTRY: A VALID LABEL VERSION HAS BEEN FOUND
                =1402 ; EXIT:  USES R0
                =1403 ;        LABEL DATA SUM STORED IN DRSUM
                =1404 ;        A=0 IF OLD=NEW (CONSECUTIVE LABELS ARE THE SAME)
                =1405 ;        A<>0 IF OLD<>NEW (CONSECUTIVE LABELS ARE DIFFERENT)
                =1406 ;
0708 FE         =1407 DRSUMT:  MOV     A,R6            ;GET VERSION FLAG
0709 530F       =1408          ANL     A,#0FH          ;MASK VERSION POINTER
070B 0300       =1409          ADD     A,#0            ;SETUP CARRY FOR DA
070D 57         =1410          DA      A
070E 926C       =1411          JB4     DRVRNG          ;JUMP IF POINTER > 9.  ILLEGAL VERSION.
                =1412 ;
0710 0313       =1413          ADD     A,#LOW DRSTBL   ;ADD OFFSET TO TABEL ADDRESS
0712 B3         =1414          JMPP    @A              ;JUMP TO VERSION ROUTINE
0713 6C         =1415 DRSTBL:  DB      LOW DRVRNG      ;NO VALID VERSION. POINTER=0.
0714 1D         =1416          DB      LOW DRSMA
0715 1D         =1417          DB      LOW DRSM13
0716 20         =1418          DB      LOW DRSME
0717 5E         =1419          DB      LOW DRSM8
0718 42         =1420          DB      LOW DRSMD1
0719 48         =1421          DB      LOW DRSMD2
071A 39         =1422          DB      LOW DRSMD3
071B 2C         =1423          DB      LOW DRSMD4
071C 23         =1424          DB      LOW DRSMD5
                =1425 ;
071D            =1426 DRSMA    EQU     $
071D 27         =1427 DRSM13:  CLR     A
```

```
0720 27    =1429 ;
0721 E458  =1430 DRSM6:  CLR    A
           =1431         JMP    DRSM7C       ;GO SUM 7 CHARACTERS
           =1432 ;
0723 27    =1433 DRSM05: CLR    A
0724 B860  =1434         MOV    R0,#N6S1
0726 F404  =1435         CALL   SUM2BY
0728 B84E  =1436         MOV    R0,#N3S1
072A E42F  =1437         JMP    DRSM5X       ;GO FINISH THE D5 SUM
           =1438 ;
072C 27    =1439 DRSM04: CLR    A
072D B85A  =1440         MOV    R0,#N5S1
072F F404  =1441 DRSM5X: CALL   SUM2BY
0731 B854  =1442         MOV    R0,#N4S1
0733 F404  =1443         CALL   SUM2BY
0735 B842  =1444         MOV    R0,#N1S1
0737 E44E  =1445         JMP    DRSM4X       ;GO FINISH THE D4 OR D5 SUM
           =1446 ;
0739 27    =1447 DRSM03: CLR    A
073A B85A  =1448         MOV    R0,#N5S1
073C F404  =1449         CALL   SUM2BY
073E B84E  =1450         MOV    R0,#N3S1
0740 E44E  =1451         JMP    DRSM3X       ;GO FINISH THE D3 SUM
           =1452 ;
0742 27    =1453 DRSM01: CLR    A
0743 B860  =1454         MOV    R0,#N6S1
0745 F404  =1455         CALL   SUM2BY
0747 B836  =1456         MOV    R0,#L4S1
0749 E456  =1457         JMP    DRSM1X       ;GO FINISH THE D1 SUM
           =1458 ;
074B 27    =1459 DRSM02: CLR    A
074C B848  =1460         MOV    R0,#N2S1
074E       =1461 DRSM3X  EQU    $
074E F404  =1462 DRSM4X: CALL   SUM2BY
0750 B83C  =1463         MOV    R0,#R4S1
0752 F404  =1464         CALL   SUM2BY
0754 B82E  =1465 DRSM7B: MOV    R0,#R6S1     ;SUM 7 BYTES
0756 F402  =1466 DRSM1X: CALL   SUM3BY
0758 B824  =1467 DRSM7C: MOV    R0,#L6S1     ;SUM 7 CHARACTERS
075A F400  =1468         CALL   SUM4BY
075C E467  =1469         JMP    DRSMDN       ;JUMP - THE SUM IS FINISHED
           =1470 ;
075E 27    =1471 DRSM8:  CLR    A
075F B836  =1472         MOV    R0,#L4S1
0761 F404  =1473         CALL   SUM2BY
0763 B83C  =1474         MOV    R0,#R4S1
0765 F404  =1475         CALL   SUM2BY
           =1476 ;
0767 B87C  =1477 DRSMDN: MOV    R0,#DRSUM
0769 20    =1478         XCH    A,@R0        ;SAVE THE NEW SUM IN DRSUM
076A D0    =1479         XRL    A,@R0        ;COMPARE THE OLD AND NEW SUM
076B 83    =1480         RET
           =1481 ;                           ;DOUBLE READ VERSION N/G
076C 27    =1482 DRVRNG: CLR    A
076D 83    =1483         RET
           =1484 ;*********************************
076E A3    =1485 TROPG7: MOVP   A,@A
076F 83    =1486         RET
           =1487         ORG    800H         ;START OF MEMORY BANK 1
0800       =1488 $       INCLUDE(:F1:VERDLB.SRC)
           =1489 ;***********************************************
           =1490 ; FILE: VERDLB.SRC  6-17-86 17:15  BOB ACTIS
           =1491 ;       VERSION "D" FIRMWARE LIBRARY.
           =1492 ;***********************************************
           =1493 ; ROUTINE: CLR6SG
           =1494 ; FUNCTION: CLEAR 6-CHAR SEGMENTS AND COUNTERS.
           =1495 ; ENTRY: START ADDRESS AND COUNT IN DEFS TABLE.
           =1496 ; EXIT:   A = 0
           =1497 ;         R0 = END OF 6-CHAR BUFFER/COUNTER SPACE PLUS 1.
           =1498 ;         R2 = 0
           =1499 ;         6-CHAR BUFFER/COUNTER SPACE = 0'S.
           =1500 ;
0800 B824  =1501 CLR6SG: MOV    R0,#BF6CST   ;START OF 6-CHAR BUFFER AREA
0802 BA12  =1502         MOV    R2,#BF6CNT   ;NUMBER OF BYTES IN BUFFER
0804 0410  =1503         JMP    CLRT00       ;JUMP TO THE CLEAR LOOP
           =1504 ;***********************************************
           =1505 ; ROUTINE: CLR4SG
           =1506 ; FUNCTION: CLEAR 4-CHAR SEGMENTS AND COUNTERS.
           =1507 ; ENTRY: START ADDRESS AND COUNT IN DEFS TABLE.
           =1508 ; EXIT:   A = 0
           =1509 ;         R0 = END OF 4-CHAR BUFFER/COUNTER SPACE PLUS 1.
           =1510 ;         R2 = 0
           =1511 ;         4-CHAR BUFFER/COUNTER SPACE = 0'S.
           =1512 ;
0806 B836  =1513 CLR4SG: MOV    R0,#BF4CST   ;START OF 4-CHAR BUFFER AREA
0808 BA30  =1514         MOV    R2,#BF4CNT   ;NUMBER OF BYTES IN BUFFER
080A 0410  =1515         JMP    CLRT00       ;JUMP TO THE CLEAR LOOP
           =1516 ;***********************************************
```

```
              =1517 ; ROUTINE: CLRSNB
              =1518 ; FUNCTION: CLEAR THE SCAN BUFFER.
              =1519 ; ENTRY: START ADDRESS IN DEFS TABLE.
              =1520 ; EXIT:  A = 0
              =1521 ;        R0 = END OF SCAN BUFFER SPACE PLUS 1.
              =1522 ;        R2 = 0
              =1523 ;        SCAN BUFFER SPACE = 0'S.
              =1524 ;
080C B820     =1525 CLRSNB: MOV    R0,#SCNBUF      ;START OF SCAN BUFFER AREA
080E BA04     =1526         MOV    R2,#4           ;NUMBER OF BYTES IN BUFFER
0810 27       =1527 CLRTOO: CLR    A               ;CLEAR LOOP USED BY OTHER ROUTINES
0811 A0       =1528 CLRSN1: MOV    @R0,A
0812 18       =1529         INC    R0
0813 EA11     =1530         DJNZ   R2,CLRSN1
0815 83       =1531         RET
              =1532 ;******************************************************
              =1533 ; ROUTINE: CLRSBF
              =1534 ; FUNCTION: CLEAR SEND BUFFER, POINTER AND FLAG.
              =1535 ; ENTRY: START ADDRESS AND COUNT IN DEFS TABLE.
              =1536 ;        RB0
              =1537 ; EXIT:  A = 0
              =1538 ;        R0 = END OF SEND BUFFER SPACE PLUS 1.
              =1539 ;        R2 = 0
              =1540 ;        SEND BUFFER SPACE = 0CCH'S. (TERMINATION BYTES)
              =1541 ;        SEND BUFFER FULL FLAG CLEAR. RB0-R4-B3
              =1542 ;        SEND BUFFER POINTER SET TO PACKED DATA START ADDRESS.
              =1543 ;
0816 FC       =1544 CLRSBF: MOV    A,R4
0817 53F7     =1545         ANL    A,#255-ESBFUL   ;CLEAR SEND BUFFER FULL FLAG
0819 AC       =1546         MOV    R4,A
              =1547 ;
081A B866     =1548         MOV    R0,#SBFPNT
081C B0CE     =1549         MOV    @R0,#SBSTRT     ;SET POINTER TO PACKED START ADDRESS
              =1550 ;
081E B867     =1551         MOV    R0,#SBUF        ;START OF SEND BUFFER AREA
0820 BA12     =1552         MOV    R2,#SBUFSZ      ;NUMBER OF BYTES IN BUFFER
0822 23CC     =1553         MOV    A,#0CCH         ;LOAD TERMINATION BYTES
0824 0411     =1554         JMP    CLRSN1          ;JUMP TO THE CLEAR LOOP
              =1555 ;******************************************************
              =1556 ; ROUTINE: MOV2BY, MOV3BY, MOV4BY
              =1557 ; FUNCTION: MOVE BYTES FROM ONE BUFFER TO ANOTHER BUFFER.
              =1558 ; ENTRY: R0 = FIRST BYTE ADDRESS OF SOURCE BUFFER.
              =1559 ;        R1 = FIRST AVAILABLE BYTE ADDRESS OF DESTINATION BUFFER.
              =1560 ; EXIT:  DATA MOVED FROM SOURCE BUFFER TO DESTINATION BUFFER.
              =1561 ;        R0 = END OF SOURCE BUFFER ADDRESS PLUS 1.
              =1562 ;        R1 = NEXT AVAILABLE BYTE ADDRESS OF DESTINATION BUFFER.
              =1563 ;        R2 = 0
              =1564 ;        A = LAST BYTE TRANSFERED
              =1565 ;
0826 BA02     =1566 MOV2BY: MOV    R2,#2
0828 0430     =1567         JMP    MOVXBY
082A BA03     =1568 MOV3BY: MOV    R2,#3
082C 0430     =1569         JMP    MOVXBY
082E BA04     =1570 MOV4BY: MOV    R2,#4
0830 F0       =1571 MOVXBY: MOV    A,@R0
0831 A1       =1572         MOV    @R1,A
0832 18       =1573         INC    R0
0833 19       =1574         INC    R1
0834 EA30     =1575         DJNZ   R2,MOVXBY
0836 83       =1576         RET
              =1577 ;******************************************************
              =1578 ; ROUTINE: SGSUM4, SGSUM6
              =1579 ; FUNCTION: SUM THE DIGITS OF A SEGMENT FOR THE MOD-10 TEST.
              =1580 ;        ALL ARITHMETIC IS ASSUMED BCD AND ONLY THE UNITS DIGIT
              =1581 ;        IS VALID IN THE SUMS.
              =1582 ;
              =1583 ; EXIT:  R0 = NOT CHANGED
              =1584 ;        R2 = C1+C3+C5  [C1+C3]
              =1585 ;        A  = C2+C4+C6  [C2+C4]
              =1586 ;        F0 IS USED
              =1587 ;
0837 85       =1588 SGSUM4: CLR    F0
0838 95       =1589         CPL    F0              ;SET F0 FOR 4-CHAR SUM
0839 043C     =1590         JMP    SGSUMX
              =1591 ;
083B 85       =1592 SGSUM6: CLR    F0              ;CLEAR F0 FOR 6-CHAR SUM
083C BAF0     =1593 SGSUMX: MOV    R2,#0F0H        ;MASK FOR ODD DIGITS
083E F0       =1594         MOV    A,@R0           ;C1
083F 5A       =1595         ANL    A,R2
0840 18       =1596         INC    R0
0841 60       =1597         ADD    A,@R0           ;C1+C3
0842 57       =1598         DA     A
0843 5A       =1599         ANL    A,R2
0844 B649     =1600         JF0    SGSUMY          ;JUMP IF 4-CHAR SUM
              =1601 ;
0846 18       =1602         INC    R0
0847 60       =1603         ADD    A,@R0           ;C1+C3+C5
0848 57       =1604         DA     A
```

```
0849 47        =1605 SGSUMY: SWAP    A              ;PUT SUM IN LOW BYTE
084A AA        =1606         MOV     R2,A           ;SAVE C1+C3+C5  [C1+C3]
               =1607 ;
084B F0        =1608         MOV     A,@R0          ;C6  [C4]
084C C8        =1609         DEC     R0
084D 60        =1610         ADD     A,@R0          ;C6+C4  [C4+C2]
084E 57        =1611         DA      A
084F B654      =1612         JF0     SGSUMR         ;JUMP IF 4-CHAR SUM
               =1613 ;
0851 C8        =1614         DEC     R0
0852 60        =1615         ADD     A,@R0          ;C6+C4+C2
0853 57        =1616         DA      A
0854 83        =1617 SGSUMR: RET
               =1618 ;********************************************************
               =1619 ; ROUTINE:  APL3R2
               =1620 ; FUNCTION: ADD 3*R2 TO A.  (BCD)
               =1621 ; ENTRY:    NO SETUP
               =1622 ; EXIT:     A = A+(3*R2)
               =1623 ;           R2 = NOT CHANGED
               =1624 ;
0855 6A        =1625 APL3R2: ADD     A,R2
0856 57        =1626         DA      A
0857 6A        =1627         ADD     A,R2
0858 57        =1628         DA      A
0859 6A        =1629         ADD     A,R2
085A 57        =1630         DA      A
085B 83        =1631         RET
               =1632 ;********************************************************
               =1633 ; ROUTINE:  MOD104  6-2-86  14:25  BOB ACTIS
               =1634 ; FUNCTION: CALCULATE 4 CHARACTER MODULO 10 CHECKSUM VALUE
               =1635 ; ENTRY:    R0 = FIRST BYTE ADDRESS OF SEGMENT TO BE PROCESSED
               =1636 ; EXIT:     A = CALCULATED VALUE
               =1637 ;
085C 1437      =1638 MOD104: CALL    SGSUM4
085E 1455      =1639         CALL    APL3R2
0860 83        =1640         RET
               =1641 ;********************************************************
               =1642 ; ROUTINE:  MOD106  6-2-86  14:25  BOB ACTIS
               =1643 ; FUNCTION: CALCULATE 6 CHARACTER MODULO 10 CHECKSUM VALUE
               =1644 ; ENTRY:    R0 = FIRST BYTE ADDRESS OF SEGMENT TO BE PROCESSED
               =1645 ; EXIT:     A = CALCULATED VALUE
               =1646 ;
0861 1438      =1647 MOD106: CALL    SGSUM6
0863 1455      =1648         CALL    APL3R2
0865 83        =1649         RET
                1650 $        INCLUDE(:F1:EMOD10.SRC)
               =1651 ;********************************************************
               =1652 ; FILE:     EMOD10.SRC  6-17-86 16:25  BOB ACTIS
               =1653 ; ROUTINE:  EMOD10
               =1654 ; FUNCTION: VERIFY THE EMOD10 CHECK CHARACTER
               =1655 ; ENTRY:    SEGMENT IN SCAN BUFFER
               =1656 ; EXIT:     USES R0,R1,R2,A
               =1657 ;           A = 0 IF CHECK CHARACTER IS GOOD
               =1658 ;           A <> 0 IF CHECK CHARACTER IS BAD
0866 B820      =1660 EMOD10: MOV     R0,#SCNBUF
0868 B979      =1661         MOV     R1,#WRKBUF
086A 142A      =1662         CALL    MOV3BY         ;MOVE SCAN BUFFER DATA TO WORK BUFFER
               =1663 ;
086C B822      =1664         MOV     R0,#SCNBUF+2
086E F0        =1665         MOV     A,@R0          ;GET CHARACTER C6
086F 530F      =1666         ANL     A,#0FH
0871 03FD      =1667         ADD     A,#-3
0873 F27C      =1668         JB7     ECASE1         ;JUMP IF C6=0,1,2
0875 C685      =1669         JZ      ECASE2         ;JUMP IF C6=3
0877 07        =1670         DEC     A
0878 C690      =1671         JZ      ECASE3         ;JUMP IF C6=4
087A 0496      =1672         JMP     ECASE4         ;JUMP IF C6=5,6,7,8,9
               =1673 ;
               =1674 ; FOR C6=0,1,2 COMPUTE 3*(C2+C3+C5)+C1+C4+C6
               =1675 ;
087C B879      =1676 ECASE1: MOV     R0,#WRKBUF
087E F0        =1677         MOV     A,@R0
087F 47        =1678         SWAP    A              ;SWAP C1 AND C2
0880 A0        =1679         MOV     @R0,A
0881 1438      =1680         CALL    SGSUM6         ;C2,C1,C3,C4,C5,C6
0883 0498      =1681         JMP     EMODSM
               =1682 ;
               =1683 ; FOR C6=3 COMPUTE 3*(C2+0+C5)+C1+C3+C4
               =1684 ;
0885 B87A      =1685 ECASE2: MOV     R0,#WRKBUF+1
0887 27        =1686         CLR     A
0888 30        =1687         XCHD    A,@R0          ;C4=0
0889 18        =1688         INC     R0
088A 30        =1689         XCHD    A,@R0          ;C6=C4
088B F0        =1690         MOV     A,@R0          ;A=C5,C4
088C 47        =1691         SWAP    A              ;A=C4,C5
088D A0        =1692         MOV     @R0,A
088E 0496      =1693         JMP     ECASE4         ;C1,C2,C3,0,C4,C5
```

```
                  =1694 ;  FOR C6=4  COMPUTE 3*(C2+C4+C5)+C1+C3+0
                  =1695 ;
0890 B87B         =1696 ECASE3: MOV    R0,#WRKBUF+2
0892 27           =1697         CLR    A
0893 20           =1698         XCH    A,@R0            ;C5=C6=0
0894 47           =1699         SWAP   A
0895 30           =1700         XCHD   A,@R0            ;C5=0, C6=C5
                  =1701                                 ;C1,C2,C3,C4,0,C5
                  =1702 ;
                  =1703 ;  FOR C6=5,6,7,8,9  COMPUTE 3*(C2+C4+C6)+C1+C3+C5
                  =1704 ;
0896 B879         =1705 ECASE4: MOV    R0,#WRKBUF       ;C1,C2,C3,C4,C5,C6
0898 143B         =1706         CALL   SGSUM6
089A 2A           =1707         XCH    A,R2
                  =1708 ;
                  =1709 ;  FINAL SUM
                  =1710 ;
089B 1455         =1711 EMODSM: CALL   APL3R2
                  =1712 ;
                  =1713 ;  CHECK AGAINST THE CHECK CHARACTER
                  =1714 ;
089D B823         =1715 EMODCK: MOV    R0,#SCNBUF+3
089F 60           =1716         ADD    A,@R0
08A0 57           =1717         DA     A
08A1 530F         =1718         ANL    A,#0FH
08A3 83           =1719         RET
                  1720 $        INCLUDE(:F1:FCKFCA.SRC)
                  =1721 ;******************************************************
                  =1722 ;  FILE: FCKFCA.SRC  10-25-83  17:10  BOB ACTIS
                  =1723 ;  ROUTINE: CKFCA
                  =1724 ;  FUNCTION: CHECK IF FRAME CONTROL ARRAY HAS DATA.
                  =1725 ;            IF SDATA, PROCESS BYTE.
                  =1726 ;            IF SEGMENT CAPTURE AND SCANNING BIT IS SET, PUT SEGMENT
                  =1727 ;               INTO THE SCAN BUFFER.
                  =1728 ;            IF SEGMENT CAPTURE AND NOT SCANNING, RESET THE FRAME.
                  =1729 ;            IF A SEGMENT IS SEEN, SET R7.
                  =1730 ;  ENTRY: RB0
                  =1731 ;  EXIT: USES R0,R1,A
                  =1732 ;            R7 IS SET IF A SEGMENT IS SEEN.
                  =1733 ;
08A4 86A7         =1734 CKFCA:  JNI    CKFC10           ;JUMP IF FCA HAS DATA
08A6 83           =1735         RET
08A7 B801         =1737 CKFC10: MOV    R0,#ESRRD
08A9 FC           =1738         MOV    A,R4
08AA 12B3         =1739         JB0    CKFC20           ;JUMP IF SCANNING BIT IS SET
08AC 80           =1740         MOVX   A,@R0            ;READ BYTE
08AD F2DF         =1741         JB7    CKFC95           ;JUMP IF HOST DATA
08AF 90           =1742         MOVX   @R0,A            ;RESET FRAME CAPTURE
08B0 BF08         =1743         MOV    R7,#EWAIT        ;SET THE "SEG SEEN" TIMER
08B2 83           =1744         RET
                  =1745 ;
08B3 80           =1746 CKFC20: MOVX   A,@R0            ;READ 1ST CHAR OF SEGMENT
08B4 F2DF         =1747         JB7    CKFC95           ;JUMP IF HOST DATA
08B6 D2DB         =1748         JB6    CKFC90           ;JUMP IF PERIODICAL CAPTURE
08B8 B920         =1749         MOV    R1,#SCNBUF
                  =1750 ;
08BA 47           =1751         SWAP   A
08BB A1           =1752         MOV    @R1,A            ;STORE 1ST CHAR
08BC 80           =1753         MOVX   A,@R0            ;READ 2ND CHAR OF SEGMENT
08BD 31           =1754         XCHD   A,@R1            ;1ST AND 2ND STORED
08BE 19           =1755         INC    R1
08BF 80           =1756         MOVX   A,@R0            ;READ 3RD CHAR
                  =1757 ;
08C0 47           =1758         SWAP   A
08C1 A1           =1759         MOV    @R1,A            ;STORE 3RD CHAR
08C2 80           =1760         MOVX   A,@R0            ;READ 4TH CHAR
08C3 31           =1761         XCHD   A,@R1            ;3RD AND 4TH STORED
08C4 19           =1762         INC    R1
08C5 80           =1763         MOVX   A,@R0            ;READ 5TH CHAR
                  =1764 ;
08C6 47           =1765         SWAP   A
08C7 A1           =1766         MOV    @R1,A            ;STORE 5TH CHAR
08C8 80           =1767         MOVX   A,@R0
08C9 31           =1768         XCHD   A,@R1            ;5TH AND 6TH STORED
08CA 19           =1769         INC    R1
                  =1770 ;
08CB B804         =1771         MOV    R0,#EPRDEC
08CD 80           =1772         MOVX   A,@R0            ;READ PARITY DECODE BYTE
08CE 537F         =1773         ANL    A,#07FH          ;MASK OFF THE UNUSED BIT
08D0 A1           =1774         MOV    @R1,A            ;STORE PARITY DECODE B0-B6
                  =1775 ;
08D1 D37F         =1776         XRL    A,#07FH          ;TEST FOR NO DECODE. (BAD PARITY MAP)
08D3 9609         =1777         JNZ    CKFC80           ;JUMP IF DECODE IS OK.
08D5 140C         =1778         CALL   CLRSNB           ;CLEAR THE SCAN BUFFER
08D7 04DB         =1779         JMP    CKFC90
                  =1780 ;
08D9 BF08         =1781 CKFC80: MOV    R7,#EWAIT*       ;SET THE "SEG SEEN" TIMER
                  =1782 ;
```

```
0808 B801      =1783 CKFC90: MOV    R0,#EFRRST      ;RESET THE FRAME
080D 90        =1784         MOVX   @R0,A
080E 83        =1785         RET
               =1786 ;
080F E5        =1787 CKFC95: SEL    MB0
08E0 143F      =1788         CALL   SDATA
08E2 F5        =1789         SEL    MB1
08E3 83        =1790         RET
               =1791 ;************************************
08E4 A3        =1792 TROPG8: MOVP   A,@A
08E5 83        =1793         RET
               =1794         ORG    0900H
0900           =1795 $       INCLUDE(:F1:NCOMM.SRC)
               =1796 ;************************************************************
               =1797 ; FILE:    NCOMM.SRC  4-16-87  DREW TAUSSIG
               =1798 ;          MODIFIED   8-5-87 REMOVE P13 FROM HANDSHAKE
               =1799 ;          FOR THE IBM 4683 SERIAL IO CHANNEL
               =1800 ; ROUTINE: NCOMM -- COMMUNICATES WITH ZILOG SUPER-8 CHANNEL CONTROLLER
               =1801 ; FUNCTION: SEND NEXT CHARACTER IN SEND BUFFER TO HOST
               =1802 ;           CHECK FOR AND RECEIVE COMMAND FROM HOST (SUPER-8).
               =1803 ; ENTRY: RB0 SELECTED
               =1804 ; EXIT:  USES R0,R1,R2,R3,A
               =1805 ;
0900           =1806 NCOMM   EQU    $
0900 0A        =1807         IN     A,P2
0901 F211      =1808         JB7    NCOM05          ;JUMP IF SUPER-8 DOES NOT HAVE DATA
               =1809 ;
               =1810 ; DATA AVAILABLE - READ AND SET HANDSHAKE
               =1811 ;
0903 B808      =1812         MOV    R0,#ESUP8       ;ADDRESS OF SUPER-8 DATA BYTE
0906 99FB      =1814         ANL    P1,#255-EP12    ;P12 LOW TO ACKNOWLEDGE RECEIPT OF DATA
0908 A8        =1815         MOV    R0,A            ;SAVE BYTE
               =1816 ;
0909 0A        =1817 NCOM03: IN     A,P2
090A 37        =1818         CPL    A
090B F209      =1819         JB7    NCOM03          ;JUMP WAIT FOR SUPER-8 TO ACKNOWLEDGE
090D 8904      =1820         ORL    P1,#EP12        ;P12 HIGH TO END HANDSHAKE SEQUENCE
               =1821 ;
               =1822 ; CHECK RECEIVED COMMAND
               =1823 ;
090F 245E      =1824         JMP    CKRCV           ;GO EXECUTE COMMAND
               =1825 ;
               =1826 ; SUPER-8 IN RECEIVE MODE - CHECK FOR DATA AVAILABLE AND SEND
               =1827 ;
0911 FC        =1828 NCOM05: MOV    A,R4
0912 721A      =1829         JB3    NCOM10          ;JUMP IF SEND BUFFER HAS DATA
0914 37        =1830         CPL    A
0915 B250      =1831         JB5    NCOM90          ;JUMP IF BUFMAN REQUEST FLAG NOT SET
0917 F409      =1832         CALL   BUFMAN          ;PUT MESSAGE INTO THE COMM BUFFER
0919 83        =1833         RET
               =1834 ;
091A 2650      =1835 NCOM10: JNT0   NCOM90          ;JUMP IF HOST NOT READY
               =1836 ;
091C B966      =1837         MOV    R1,#SBFPNT      ;GET POINTER ADDRESS
091E F1        =1838         MOV    A,@R1           ;GET POINTER
091F 97        =1839         CLR    C
0920 67        =1840         RRC    A               ;PUT NIBBLE POINTER IN CARRY
0921 11        =1841         INC    @R1             ;INCREMENT POINTER
0922 A9        =1842         MOV    R1,A            ;BYTE ADDRESS
               =1843 ;
0923 F1        =1844         MOV    A,@R1           ;GET DATA
0924 53F0      =1845         ANL    A,#0FOH         ;MASK POSSIBLE TERMINATOR FLAG
0926 D3F0      =1846         XRL    A,#0FOH         ;TEST FOR TERMINATOR FLAG, 0FXH
0928 C63D      =1847         JZ     NCOM50          ;JUMP IF TERMINATOR FLAG
               =1848 ;
092A F1        =1849         MOV    A,@R1           ;GET DATA AGAIN
092B D3CC      =1850         XRL    A,#ETRMBY
092D C653      =1851         JZ     NCOM70          ;JUMP IF TERMINATION BYTE
               =1852 ;
092F F1        =1853         MOV    A,@R1           ;GET DATA AGAIN
0930 F633      =1854         JC     NCOM20          ;JUMP IF LOW NIBBLE IS NEXT
               =1855 ;
0932 47        =1856         SWAP   A
0933 530F      =1857 NCOM20: ANL    A,#0FH          ;MASK NIBBLE
0935 AB        =1858         MOV    R3,A            ;SAVE NIBBLE
0936 D30C      =1859         XRL    A,#0CH
0938 C650      =1860         JZ     NCOM90          ;JUMP IF FILLER CHARACTER (DON'T SEND)
               =1861 ;
               =1862 ; IBM-OCR CHARACTER FORMAT
093A FB        =1863 NCOM40: MOV    A,R3            ;GET CHARACTER
093B 2455      =1864         JMP    NCOM80
               =1865 ;
               =1866 ; PROCESS THE TERMINATOR FLAG BYTE
093D B866      =1867 NCOM50: MOV    R0,#SBFPNT      ;COMM BUFFER POINTER ADDRESS
093F 10        =1868         INC    @R0             ;INCREMENT PAST TERMINATION FLAG BYTE
0940 BB4A      =1869         MOV    R3,#LOW NCTBLI  ;IBM-OCR TABLE ADDRESS
               =1870 ;
```

```
0942 F1        =1871 HCOM60: MOV    A,@R1           ;GET TERMINATION FLAG BYTE
0943 530F      =1872         ANL    A,#0FH          ;MASK VERSION POINTER, 1 TO 9
0945 07        =1873         DEC    A               ;ADJUST POINTER, 0 TO 8
0946 68        =1874         ADD    A,R3            ;VERSION POINTER + TABLE ADDRESS
0947 A3        =1875         MOVP   A,@A            ;GET TERMINATION CHARACTER
0948 2455      =1876         JMP    HCOM80
               =1877 ;
               =1878 ; TERMINATION CHARACTERS FOR IBM-OCR
094A           =1879 HCTBLI  EQU    $               ;TABLE START ADDRESS
094A 0D        =1880         DB     0DH             ; A
094B 16        =1881         DB     16H             ; 13
094C 0A        =1882         DB     0AH             ; E
094D 0C        =1883         DB     0CH             ; 8
094E 00        =1884         DB     00H             ; D1, NOT DEFINED
094F 00        =1885         DB     00H             ; D2, NOT DEFINED
0950 00        =1886         DB     00H             ; D3, NOT DEFINED
0951 00        =1887         DB     00H             ; D4, NOT DEFINED
0952 00        =1888         DB     00H             ; D5, NOT DEFINED
               =1889 ;
0953 2380      =1891 HCOM70: MOV    A,#80H          ;EOT WITH DUMMY DATA (00H WITH B7 SET)
               =1892 ;
               =1893 ; SEND FORMATED CHARACTER TO SUPER-8
0955 B808      =1894 HCOM80: MOV    R0,#ESUP8       ;OUTPUT FORMATTED CHARACTER
0957 90        =1895         MOVX   @R0,A
0958 37        =1896         CPL    A
0959 F250      =1897         JB7    HCOM90          ;JUMP IF NOT END OF DATA
095B 1416      =1898         CALL   CLRSBF          ;CLEAR SEND BUFFER, ETC.
095D 83        =1899 HCOM90: RET
               =1900 ;****************************************************************
               =1901 ; ROUTINE: CKRCV
               =1902 ; FUNCTION: CHECK RECEIVED BYTE COMMAND AND EXECUTE IT
               =1903 ; ENTRY: R0 IS RECEIVED BYTE
               =1904 ; EXIT:  COMMAND EXECUTED
               =1905 ;
095E           =1906 CKRCV   EQU    $
095E F8        =1907         MOV    A,R0
               =1908 ;
095F D311      =1909 CKRCV1: XRL    A,#ENSCAN       ;JUMP IF NOT ENABLE SCANNING COMMAND
0961 9666      =1910         JNZ    CKRCV2
0963 99EF      =1911         ANL    P1,#0FFH-ELASDB ;TURN ON LASER
0965 83        =1912         RET
               =1913 ;
0966 F8        =1914 CKRCV2: MOV    A,R0
0967 D312      =1915         XRL    A,#DISCAN       ;JUMP IF NOT DISABLE SCANNING COMMAND
0969 966E      =1916         JNZ    CKRCV3
096B 8910      =1917         ORL    P1,#ELASDB      ;TURN OFF LASER
096D 83        =1918         RET
               =1919 ;
096E F8        =1920 CKRCV3: MOV    A,R0
096F D314      =1921         XRL    A,#ENBEEP       ;JUMP IF NOT ENABLE TONE COMMAND
0971 9677      =1922         JNZ    CKRCV4
0973 D5        =1923         SEL    RB1             ;SET TONE ENABLE FLAG TO 0 (ENABLE TONE)
0974 AB        =1924         MOV    R3,A
0975 C5        =1925         SEL    RB0
0976 83        =1926         RET
               =1927 ;
0977 F8        =1928 CKRCV4: MOV    A,R0
0978 D318      =1929         XRL    A,#DIBEEP       ;JUMP IF NOT DISABLE TONE COMMAND
097A 9681      =1930         JNZ    CKRCV5          ;A IS 0FFH NOW
097C 37        =1931         CPL    A
097D D5        =1932         SEL    RB1             ;SET TONE ENABLE FLAG TO 1'S (DISABLE TONE)
097E AB        =1933         MOV    R3,A
097F C5        =1934         SEL    RB0
0980 83        =1935         RET
               =1936 ;
0981 F8        =1937 CKRCV5: MOV    A,R0
0982 D332      =1938         XRL    A,#COMRST
0984 9689      =1939         JNZ    CKRCV6          ;JUMP IF NOT RESET COMMAND
0986 E5        =1940         SEL    MB0             ;RESET SCANNER
0987 0400      =1941         JMP    RSTTRP
               =1942 ;                                                (ADDED 1/21/88)
0989 F8        =1943 CKRCV6: MOV    A,R0            ;INTERFACE ROM SUM GOOD (IF ROM CHKSUM)
098A D377      =1944         XRL    A,#IFRSMG
               =1945 ;                              ;INVALID COMMAND
098C 83        =1946 CKRCV9: RET
               =1947 $       INCLUDE(:F1:PROCSG.SRC)
               =1948 ;****************************************************************
               =1949 ; FILE: PROCSG.SRC  07-03-86 15:15  BOB ACTIS
               =1950 ;****************************************************************
               =1951 ; ROUTINE: SWP4SN, SWP6SN
               =1952 ; FUNCTION: SWAP (REVERSE) ORDER OF PACKED CHARACTERS IN SCAN BUFFER.
               =1953 ;           SWP4SN SWAPS CHARACTERS IN SCNBUF+1 AND SCNBUF+2.
               =1954 ;           SWP6SN SWAPS CHARACTERS IN SCNBUF, SCNBUF+1 AND SCNBUF+2.
               =1955 ;           CLEARS BACKWARD BIT IN THE PARITY DECODE BYTE SCNBUF+3.
               =1956 ; ENTRY: NO SETUP
               =1957 ; EXIT:  CHARACTERS SWAPED.
               =1958 ;        R0 = SCNBUF+3 (PARITY DECODE BYTE ADDRESS)
```

```
                  =1959 ;              BACKWARD BIT IS CLEARED.
                  =1960 ;         A = PARITY DECODE BYTE
                  =1961 ;
098D B822         =1962 SWP4SN: MOV   R0,#SCNBUF+2
098F F0           =1963         MOV   A,@R0
0990 47           =1964         SWAP  A
0991 C8           =1965         DEC   R0
0992 20           =1966         XCH   A,@R0
                                INC   R0
0994 18           =1968         MOV   @R0,A
0995 A0           =1969         JMP   SWPXEX
0996 24A6         =1970
                  =1971 ;
0998 B822         =1972 SWP6SN: MOV   R0,#SCNBUF+2
099A F0           =1973         MOV   A,@R0
099B 47           =1974         SWAP  A
099C C8           =1975         DEC   R0
099D 20           =1976         XCH   A,@R0
099E 47           =1977         SWAP  A
099F 20           =1978         XCH   A,@R0
09A0 C8           =1979         DEC   R0
09A1 20           =1980         XCH   A,@R0
09A2 47           =1981         SWAP  A
09A3 18           =1982         INC   R0
09A4 18           =1983         INC   R0
09A5 A0           =1984         MOV   @R0,A
                  =1985 ;
09A6 18           =1986 SWPXEX: INC   R0
09A7 F0           =1987         MOV   A,@R0
09A8 538F         =1988         ANL   A,#255-EDECBK
09AA A0           =1989         MOV   @R0,A
09AB 4409         =1990         JMP   SWPXRT
                  =1991 ;*********************************************************
                  =1992 ; ROUTINE: INCHNB, INCLNB
                  =1993 ; FUNCTION: INCREMENT SEGMENT COUNTERS.
                  =1994 ;             LOW NIBBLE IS SEGMENT ONE COUNTER.
                  =1995 ;             HIGH NIBBLE IS SEGMENT TWO COUNTER.
                  =1996 ;             TERMINAL COUNT IS 15. (0FH)
                  =1997 ;             IF NOT ALREADY TERMINAL COUNT, INCREMENT THE SEGMENT
                  =1998 ;             COUNTER AND TOTAL COUNTER.
                  =1999 ; ENTRY: R0 = PACKED SEGMENT COUNTER ADDRESS
                  =2000 ;        R0+1 = SEGMENT TOTAL COUNTER ADDRESS
                  =2001 ; EXIT:  IF NIBBLE WAS INCREMENTED:
                  =2002 ;             R0 = SEGMENT TOTAL COUNTER ADDRESS
                  =2003 ;             A = PACKED COUNTER
                  =2004 ;             CARRY = CLEAR
                  =2005 ;        IF NIBBLE WAS ALREADY 0FH:
                  =2006 ;             R0 = PACKED SEGMENT COUNTER ADDRESS
                  =2007 ;             A = NOT DEFINED
                  =2008 ;             CARRY = SET
                  =2009 ;
09AD F0           =2010 INCHNB: MOV   A,@R0              ;GET PACKED COUNTER
09AE 97           =2011         CLR   C
09AF 0310         =2012         ADD   A,#10H             ;INCREMENT HIGH NIBBLE
09B1 F6C0         =2013         JC    INCXRT             ;JUMP IF ALREADY 0F0H
09B3 24BD         =2014         JMP   INCX90
                  =2015 ;
09B5 F0           =2016 INCLNB: MOV   A,@R0
09B6 47           =2017         SWAP  A
09B7 97           =2018         CLR   C
09B8 0310         =2019         ADD   A,#10H
09BA F6C0         =2020         JC    INCXRT             ;JUMP IF ALREADY 00FH
09BC 47           =2021         SWAP  A
                  =2022 ;
09BD A0           =2023 INCX90: MOV   @R0,A              ;UPDATE THE PACKED COUNTER
09BE 18           =2024         INC   R0
09BF 10           =2025         INC   @R0                ;INCREMENT TOTAL COUNTER
                  =2026 ;
09C0 83           =2027 INCXRT: RET
                  =2028 ;*********************************************************
                  =2029 ; ROUTINE: MCH2BY, MCH3BY, MCH4BY
                  =2030 ; FUNCTION: COMPARE BYTES IN ONE BUFFER WITH A SECOND BUFFER.
                  =2031 ; ENTRY: R0 = FIRST BYTE ADDRESS OF FIRST BUFFER
                  =2032 ;        R1 = FIRST BYTE ADDRESS OF SECOND BUFFER
                  =2033 ; EXIT:  IF BUFFER ONE EQUALS BUFFER TWO:
                  =2034 ;             R0 = END OF FIRST BUFFER ADDRESS PLUS 1.
                  =2035 ;             R1 = END OF SECOND BUFFER ADDRESS PLUS 1.
                  =2036 ;             R2 = 0
                  =2037 ;             A = 0
                  =2038 ;        IF BUFFER ONE DOESN'T EQUAL BUFFER TWO:
                  =2039 ;             R0 = BUFFER ONE "NOT EQUAL" BYTE ADDRESS
                  =2040 ;             R1 = BUFFER TWO "NOT EQUAL" BYTE ADDRESS
                  =2041 ;             R2 <> 0
                  =2042 ;             A <> 0
                  =2043 ;
                  =2045         JMP   MCHXBY
09C3 24CB         =2046 MCH3BY: MOV   R2,#3
09C5 BA03         =2047         JMP   MCHXBY
09C7 24CB         =2048 MCH4BY: MOV   R2,#4
09C9 BA04
```

```
09CB F0     =2049 MCHXBY: MOV    A,@R0
09CC D1     =2050         XRL    A,@R1
09CD 9603   =2051         JNZ    MCHXRT       ;JUMP IF NOT EQUAL
09CF 18     =2052         INC    R0
09D0 19     =2053         INC    R1
09D1 EACB   =2054         DJNZ   R2,MCHXBY
09D3 83     =2055 MCHXRT: RET
            =2056 ;****************************************************
            =2057 TROPG9: MOVP   A,@A
09D4 A3     =2058         RET
09D5 83     =2059         ORG    0A00H
0A00        =2060 ;****************************************************
            =2061 ; ROUTINE:  PROCSG
            =2062 ; FUNCTION: CHECK FOR SCAN BUFFER DATA.
            =2063 ;           SWAP SCAN BUFFER DATA IF BACKWARDS.
            =2064 ;           CHECK FOR MISMATCHES.
            =2065 ;           MOVE SCAN BUFFER TO PROPER SEGMENT BUFFER.
            =2066 ;           INCREMENT SEGMENT AND TOTAL COUNTERS.
            =2067 ; ENTRY: NO SETUP
            =2068 ; EXIT:  USES R0,R1,R2,R3,A
            =2069 ;
0A00 2480   =2070 SWP4SJ: JMP    SWP4SN
0A02 2498   =2071 SWP6SJ: JMP    SWP6SN
            =2072 ;
0A04 B823   =2073 PROCSG: MOV    R0,#SCNBUF+3
0A06 F0     =2074         MOV    A,@R0          ;GET PARITY DECODE BYTE
0A07 C650   =2075         JZ     PROCRT         ;JUMP IF NO DATA
            =2076 ;
0A09 B228   =2077 SWPXRT: JB5    PROCDX         ;JUMP IF UPC-D BIT SET
0A0B 923D   =2078         JB4    PROCE          ;JUMP IF UPC-E BIT SET
0A0D 530F   =2079         ANL    A,#0FH
0A0F 0300   =2080         ADD    A,#0           ;SETS CARRY FLAGS FOR DA
0A11 57     =2081         DA     A
0A12 9219   =2082         JB4    PROC05         ;JUMP IF DECODE > 9.
            =2083 ;                             ;PROCESS AN EAN-13-L
0A14        =2084 PROC3L  EQU    $              ;PROCESS A D-SEGMENT
0A14 F0     =2085 PROCD:  MOV    A,@R0
0A15 D202   =2086         JB6    SWP6SJ         ;JUMP IF BACKWARDS
0A17 6400   =2087         JMP    PRO7CH
            =2088 ;
0A19 3245   =2089 PROC05: JB1    PROCA          ;JUMP IF UPC-A
0A1B F0     =2090 PROC8:  MOV    A,@R0          ;EAN-8 COMES HERE
0A1C D200   =2091         JB6    SWP4SJ         ;JUMP IF BACKWARDS
0A1E 1224   =2092         JB0    PROC8R         ;JUMP IF EAN-8-R
0A20 BB3A   =2093 PROC8L: MOV    R3,#L4SCNT
0A22 4451   =2094         JMP    PRO4CH         ;GO PROCESS A 4-CHAR SEG
0A24 BB40   =2095 PROC8R: MOV    R3,#R4SCNT
0A26 4451   =2096         JMP    PRO4CH
            =2097 ;
0A28 530F   =2098 PROCDX: ANL    A,#0FH
0A2A C614   =2099         JZ     PROCD          ;JUMP IF UPC-D SEG
0A2C F0     =2100 PROCDN: MOV    A,@R0
0A2D D200   =2101         JB6    SWP4SJ
0A2F 530F   =2102         ANL    A,#0FH         ;PROCESS N(1) TO N(6) SEGS
0A31 0336   =2103         ADD    A,#LOW PROCNT-1 ;GET THE SEGMENT COUNTER ADDRESS
0A33 A3     =2104         MOVP   A,@A
0A34 AB     =2105         MOV    R3,A
0A35 4451   =2106         JMP    PRO4CH
0A37 46     =2107 PROCNT: DB     LOW N1SCNT
0A38 4C     =2108         DB     LOW N2SCNT
0A39 52     =2109         DB     LOW N3SCNT
0A3A 58     =2110         DB     LOW N4SCNT
0A3B 5E     =2111         DB     LOW N5SCNT
0A3C 64     =2112         DB     LOW N6SCNT
            =2113 ;
0A3D D202   =2114 PROCE:  JB6    SWP6SJ
0A3F 1466   =2115         CALL   EMOD10
0A41 964E   =2116         JNZ    PROCEX         ;JUMP IF EMOD10 TEST FAILED
0A43 6400   =2117         JMP    PRO7CH
            =2118 ;
0A45 F0     =2119 PROCA:  MOV    A,@R0
0A46 D202   =2120         JB6    SWP6SJ
0A4A 6400   =2122 PROCAL: JMP    PRO7CH
0A4C 4495   =2123 PROCAR: JMP    PRO6CH
            =2124 ;
0A4E 140C   =2125 PROCEX: CALL   CLRSNB         ;GO CLEAR THE SCAN BUFFER
0A50 83     =2126 PROCRT: RET                   ;RETURN FROM PROCESS SEGMENT ROUTINE
            =2127 ;****************************************************
            =2128 ; ROUTINE:  PRO4CH
            =2129 ; FUNCTION: PROCESS 4-CHAR SEGMENTS (2 BYTES)
            =2130 ;           CHECKS FOR MISMATCHES.
            =2131 ;           MOVES SEGMENT FROM SCAN BUFFER TO SEGMENT BUFFER.
            =2132 ;           INCREMENTS SCAN AND TOTAL COUNTERS.
            =2133 ; ENTRY:  R3 = PACKED SCAN COUNTER ADDRESS
            =2134 ;         R3-4 = SCAN 1 BUFFER ADDRESS
            =2135 ;         R3-2 = SCAN 2 BUFFER ADDRESS
            =2136 ;         R3+1 = TOTAL COUNTER ADDRESS
```

```
                    =2137 ; EXIT:   SEGMENT PROCESSED
                    =2138 ;         SCAN BUFFER CLEARED
                    =2139 ;         USES R0,R1,R2,R3,A
                    =2140 ;
0A51 FB             =2141 PRO4CN: MOV    A,R3
0A52 A8             =2142         MOV    R0,A
0A53 F0             =2143         MOV    A,@R0              ;GET S2/S1 PACKED COUNTS
0A54 530F           =2144         ANL    A,#0FH
0A56 B821           =2145         MOV    R0,#SCNBUF+1
0A58 9662           =2146         JNZ    PRO4C2             ;JUMP IF SCAN 1 COUNTER <> 0
                    =2147 ;                                 ;SCAN 1 COUNTER = 0
0A5A FB             =2148         MOV    A,R3
0A5B 03FC           =2149         ADD    A,#-4
0A5D A9             =2150         MOV    R1,A               ;SCAN 1 BUFFER ADDRESS
0A5E 1426           =2151         CALL   MOV2BY
0A60 446A           =2152         JMP    PRO4C3
                    =2153 ;                                 ;SCAN 1 COUNTER <> 0
0A62 FB             =2154 PRO4C2: MOV    A,R3
0A63 03FC           =2155         ADD    A,#-4
0A65 A9             =2156         MOV    R1,A               ;SCAN 1 BUFFER ADDRESS
0A66 34C1           =2157         CALL   MCH2BY
0A68 9670           =2158         JNZ    PRO4C4             ;JUMP IF NO MATCH
                    =2159 ;
0A6A FB             =2160 PRO4C3: MOV    A,R3
0A6B A8             =2161         MOV    R0,A
0A6C 34B5           =2162         CALL   INCLNB             ;INCREMENT SCAN 1 COUNTER AND TOTAL
0A6E 444E           =2163         JMP    PROCEX
                    =2164 ;                                 ;SCAN 1 BUFFER DOESN'T MATCH
0A70 FB             =2165 PRO4C4: MOV    A,R3
0A71 A8             =2166         MOV    R0,A
0A72 F0             =2167         MOV    A,@R0
0A73 53F0           =2168         ANL    A,#0F0H
0A75 B821           =2169         MOV    R0,#SCNBUF+1
0A77 9681           =2170         JNZ    PRO4C6             ;JUMP IF SCAN 2 COUNTER <> 0
                    =2171 ;
0A79 FB             =2172         MOV    A,R3
0A7A 03FE           =2173         ADD    A,#-2
0A7C A9             =2174         MOV    R1,A               ;SCAN 2 BUFFER ADDRESS
0A7D 1426           =2175         CALL   MOV2BY
0A7F 4489           =2176         JMP    PRO4C7
                    =2177 ;                                 ;SCAN 2 COUNT <> 0
0A81 FB             =2178 PRO4C6: MOV    A,R3
0A82 03FE           =2179         ADD    A,#-2
0A84 A9             =2180         MOV    R1,A               ;SCAN 2 BUFFER ADDRESS
0A85 34C1           =2181         CALL   MCH2BY
0A87 968F           =2182         JNZ    PRO4C8             ;JUMP IF NO MATCH
                    =2183 ;
0A89 FB             =2184 PRO4C7: MOV    A,R3
0A8A A8             =2185         MOV    R0,A
0A8B 34AD           =2186         CALL   INCHNB             ;INCREMENT SCAN 2 COUNT AND TOTAL
0A8D 444E           =2187         JMP    PROCEX
                    =2188 ;                                 ;NEITHER SCAN BUFFER MATCHED
0A8F FB             =2189 PRO4C8: MOV    A,R3
0A90 17             =2190         INC    A
0A91 A8             =2191         MOV    R0,A               ;TOTAL COUNTER ADDRESS
0A92 10             =2192         INC    @R0                ;INCREMENT TOTAL COUNTER
0A93 444E           =2193         JMP    PROCEX
                    =2194 ;*****************************************************************
                    =2195 ; ROUTINE:  PRO6CN
                    =2196 ; FUNCTION: PROCESS 6-CHAR SEGMENTS (3 BYTES)
                    =2197 ;           CHECKS FOR MISMATCHES.
                    =2198 ;           INCREMENTS SCAN AND TOTAL COUNTERS.
                    =2199 ;
                    =2200 ; ENTRY:  NO SETUP
                    =2201 ; EXIT:   SEGMENT IS PROCESSED
                    =2202 ;         SCAN BUFFER CLEARED
                    =2203 ;         USES R0,R1,R2,R3,A
                    =2204 ;
0A95 B834           =2205 PRO6CN: MOV    R0,#R6SCNT
0A97 F0             =2206         MOV    A,@R0              ;GET S2/S1 PACKED COUNTS
0A98 530F           =2207         ANL    A,#0FH
0A9A B92E           =2208         MOV    R1,#R6S1
0A9C B820           =2209         MOV    R0,#SCNBUF
0A9E 96A4           =2210         JNZ    PRO6C2             ;JUMP IF SCAN 1 COUNTER <> 0
                    =2211 ;                                 ;SCAN 1 COUNTER = 0
0AA0 142A           =2212         CALL   MOV3BY
0AA2 44A8           =2213         JMP    PRO6C3
                    =2214 ;                                 ;SCAN 1 COUNTER <> 0
0AA4 34C5           =2215 PRO6C2: CALL   MCH3BY
0AA6 96AE           =2216         JNZ    PRO6C4             ;JUMP IF NO MATCH
                    =2217 ;
0AA8 B834           =2218 PRO6C3: MOV    R0,#R6SCNT
0AAA 34B5           =2219         CALL   INCLNB             ;INCREMENT SCAN 1 COUNTER AND TOTAL
0AAC 444E           =2220         JMP    PROCEX
                    =2221 ;
0AAE B834           =2222 PRO6C4: MOV    R0,#R6SCNT         ;SCAN 1 BUFFER DOESN'T MATCH
0AB0 F0             =2223         MOV    A,@R0
0AB1 53F0           =2224         ANL    A,#0F0H
```

```
0A83 8931      =2225           MOV     R1,#R6S2
0A85 B820      =2226           MOV     R0,#SCNBUF
0A87 968D      =2227           JNZ     PRO6C6          ;JUMP IF SCAN 2 COUNTER <> 0
               =2228 ;
0A89 142A      =2229           CALL    MOV3BY
0A8B 44C1      =2230           JMP     PRO6C7
               =2231 ;
0A8D 34C5      =2232 PRO6C6:   CALL    MCH3BY          ;SCAN 2 COUNTER <> 0
0A8F 96C7      =2233           JNZ     PRO6C8          ;JUMP IF NO MATCH
               =2234 ;
0AC1 B834      =2235 PRO6C7:   MOV     R0,#R6SCNT
0AC3 34AD      =2236           CALL    INCHNB          ;INCREMENT SCAN 2 COUNT AND TOTAL
0AC5 444E      =2237           JMP     PROCEX
               =2238 ;
0AC7 B835      =2239 PRO6C8:   MOV     R0,#R6STOT      ;NEITHER SCAN BUFFER MATCHED
0AC9 10        =2240           INC     @R0             ;INCREMENT TOTAL COUNTER
0ACA 444E      =2241           JMP     PROCEX
               =2242 ;***********************************************
0ACC A3        =2243 TROPGA:   MOVP    A,@A
0ACD 83        =2244           RET
0800           =2245           ORG     0800H
               =2246 ;***********************************************
               =2247 ; ROUTINE: PRO7CH
               =2248 ; FUNCTION: PROCESS 7-CHAR SEGMENTS (4 BYTES)
               =2249 ;           CHECKS FOR MISMATCHES.
               =2250 ;           MOVES SEGMENT FROM SCAN BUFFER TO SEGMENT BUFFER.
               =2251 ;           INCREMENTS SCAN AND TOTAL COUNTERS.
               =2252 ; ENTRY: NO SETUP
               =2253 ; EXIT:  SEGMENT IS PROCESSED
               =2254 ;        SCAN BUFFER CLEARED
               =2255 ;        USES R0,R1,R2,R3,A
               =2256 ;
0800 B82C      =2257 PRO7CH:   MOV     R0,#L6SCNT
0802 F0        =2258           MOV     A,@R0           ;GET S2/S1 PACKED COUNTS
0803 530F      =2259           ANL     A,#0FH
0805 B924      =2260           MOV     R1,#L6S1
0807 B820      =2261           MOV     R0,#SCNBUF
0809 960F      =2262           JNZ     PRO7C2          ;JUMP IF SCAN 1 COUNTER <> 0
               =2263 ;
080B 142E      =2264           CALL    MOV4BY          ;SCAN 1 COUNTER = 0
080D 6413      =2265           JMP     PRO7C3
               =2266 ;
080F 34C9      =2267 PRO7C2:   CALL    MCH4BY          ;SCAN 1 COUNTER <> 0
0811 9619      =2268           JNZ     PRO7C4          ;JUMP IF NO MATCH
               =2269 ;
0813 B82C      =2270 PRO7C3:   MOV     R0,#L6SCNT
0815 3485      =2271           CALL    INCLNB          ;INCREMENT SCAN 1 COUNTER AND TOTAL
0817 444E      =2272           JMP     PROCEX
               =2273 ;
0819 B82C      =2274 PRO7C4:   MOV     R0,#L6SCNT      ;SCAN 1 BUFFER DOESN'T MATCH
081C 53F0      =2276           ANL     A,#0F0H
081E B928      =2277           MOV     R1,#L6S2
0820 B820      =2278           MOV     R0,#SCNBUF
0822 9628      =2279           JNZ     PRO7C6          ;JUMP IF SCAN 2 COUNTER <> 0
               =2280 ;
0824 142E      =2281           CALL    MOV4BY
0826 642C      =2282           JMP     PRO7C7
               =2283 ;
0828 34C9      =2284 PRO7C6:   CALL    MCH4BY          ;SCAN 2 COUNTER <> 0
082A 9632      =2285           JNZ     PRO7C8          ;JUMP IF NO MATCH
               =2286 ;
082C B82C      =2287 PRO7C7:   MOV     R0,#L6SCNT
082E 34AD      =2288           CALL    INCHNB          ;INCREMENT SCAN 2 COUNT AND TOTAL
0830 444E      =2289           JMP     PROCEX
               =2290 ;
0832 B82D      =2291 PRO7C8:   MOV     R0,#L6STOT      ;NEITHER SCAN BUFFER MATCHED
0834 10        =2292           INC     @R0             ;INCREMENT TOTAL COUNTER
0835 444E      =2293           JMP     PROCEX
               2294 $          INCLUDE(:F1:VERTAG.SRC)
               =2295 ;***********************************************
               =2296 ; FILE: VERTAG.SRC  12-09-86  13:50  BOB ACTIS
               =2297 ;***********************************************
               =2298 ; ROUTINE: CKMAJ
               =2299 ; FUNCTION: DETERMINE MAJORITY SEGMENT COUNTER
               =2300 ; ENTRY: R0 = PACKED COUNTER ADDRESS
               =2301 ; EXIT:  R0 = NOT CHANGED
               =2302 ;        USES R2,A
               =2303 ;        CARRY SET IF LOW>=HIGH NIBBLE  (S1CNT>=S2CNT)
               =2304 ;        CARRY CLEAR IF LOW<HIGH NIBBLE (S1CNT<S2CNT)
               =2305 ;
0837 F0        =2306 CKMAJ:    MOV     A,@R0           ;GET PACKED COUNTER
0838 530F      =2307           ANL     A,#0FH
083A AA        =2308           MOV     R2,A            ;S1CNT
083B F0        =2309           MOV     A,@R0
083C 47        =2310           SWAP    A
083D 530F      =2311           ANL     A,#0FH          ;MASK S2CNT
083F C645      =2312           JZ      CKMAJ9          ;JUMP IF S2CNT=0
```

```
0841 37        =2313           CPL     A
0842 17        =2314           INC     A               ;2'S COMP S2CNT
0843 6A        =2315           ADD     A,R2            ;S1CNT-S2CNT
0844 83        =2316           RET
               =2317 ;
0845 97        =2318 CKMAJ9:   CLR     C               ;S2CNT=0 IS A SPECIAL CASE
0846 A7        =2319           CPL     C
0847 83        =2320           RET
               =2321 ;*********************************************************
               =2322 ;  ROUTINE:  CKMISM
               =2323 ;  FUNCTION: CHECK FOR EXCESS MISMATCHED SEGMENTS.
               =2324 ;            CLEAR COUNTERS IF EXCESS MISMATCHES.
               =2325 ;  ENTRY:  SCAN 1 COUNTER HAS THE MAJORITY SEGMENT COUNT.
               =2326 ;          R0 = PACKED SCAN2/SCAN1 SEGMENT COUNTER ADDRESS.
               =2327 ;          R0+1 = TOTAL SEGMENT COUNTER ADDRESS.
               =2328 ;  EXIT:   USES R1,R2,A
               =2329 ;          R0 = NOT CHANGED
               =2330 ;          IF TOTAL=MAJORITY (0 MISMATCHES)
               =2331 ;              OR TOTAL-1=MAJORITY (1 MISMATCH) AND MAJORITY>=3
               =2332 ;              OR TOTAL-2=MAJORITY (2 MISMATCH) AND MAJORITY>=15
               =2333 ;            THEN RETURN,
               =2334 ;            ELSE COUNTERS ARE CLEARED.
               =2335 ;
0848 F0        =2336 CKMISM:   MOV     A,@R0
0849 C66F      =2337           JZ      CKMS90          ;JUMP IF S2/S1 COUNTERS=0
               =2338 ;
084B F8        =2339           MOV     A,R0
084C 17        =2340           INC     A
084D A9        =2341           MOV     R1,A            ;SCAN TOTAL COUNTER ADDRESS
               =2342 ;
084E F0        =2343           MOV     A,@R0
084F 530F      =2344           ANL     A,#0FH          ;MASK S1 COUNT
0851 AA        =2345           MOV     R2,A            ;SAVE MAJORITY COUNT
0852 D1        =2346           XRL     A,@R1
0853 C66F      =2347           JZ      CKMS90          ;JUMP IF TOTAL=MAJORITY (0 MISMATCHES)
               =2348 ;
0855 F1        =2349           MOV     A,@R1
0856 07        =2350           DEC     A
0857 DA        =2351           XRL     A,R2
               =2353 ;
085A F1        =2354           MOV     A,@R1
085B 07        =2355           DEC     A
085C 07        =2356           DEC     A
085D DA        =2357           XRL     A,R2
085E 966C      =2358           JNZ     CKMS80          ;JUMP IF >2 MISMATCHES
               =2359 ;
               =2360 ; TOTAL-2=MAJORITY (2 MISMATCHES).  CHECK FOR MAJORITY>=15.
               =2361 ;
0860 FA        =2362           MOV     A,R2
0861 03F1      =2363           ADD     A,#-15
0863 E66C      =2364           JNC     CKMS80          ;JUMP IF <15
0865 83        =2365           RET
               =2366 ;
               =2367 ; TOTAL-1=MAJORITY (1 MISMATCH).  CHECK FOR MAJORITY>=3.
               =2368 ;
0866 FA        =2369 CKMS30:   MOV     A,R2
0867 03FD      =2370           ADD     A,#-3
0869 E66C      =2371           JNC     CKMS80          ;JUMP IF <3
086B 83        =2372           RET
               =2373 ;
               =2374 ; FAILED TEST.  CLEAR COUNTERS.
               =2375 ;
086C 27        =2376 CKMS80:   CLR     A
086D A0        =2377           MOV     @R0,A           ;CLEAR S2/S1 COUNTERS
086E A1        =2378           MOV     @R1,A           ;CLEAR TOTAL COUNTER
086F 83        =2379 CKMS90:   RET
               =2380 ;*********************************************************
               =2381 ;  ROUTINE:  EXSBF2, EXSBF3, EXSBF4
               =2382 ;  FUNCTION: EXCHANGE SEGMENT BUFFERS AND COUNTERS. (2,3 OR 4 BYTES)
               =2383 ;            (I.E. EXCHANGE BUFFER 1 DATA WITH BUFFER 2 DATA)
               =2384 ;  ENTRY:  R0 = SCAN 1 BUFFER ADDRESS
               =2385 ;          R0+2[3,4] = SCAN 2 BUFFER ADDRESS
               =2386 ;          R0+3[4,5] = SCAN2/SCAN1 PACKED COUNTER ADDRESS
               =2387 ;  EXIT:   USES R1,R2
               =2388 ;          SCAN 1 AND SCAN 2 DATA AND COUNTERS EXCHANGED.
               =2389 ;          R0 = SCAN2/SCAN1 COUNTER ADDRESS.
               =2390 ;          A  = SCAN2/SCAN1 COUNTERS
               =2391 ;
0870 BA02      =2392 EXSBF2:   MOV     R2,#2
0872 647A      =2393           JMP     EXSBFX
0874 BA03      =2394 EXSBF3:   MOV     R2,#3
0876 647A      =2395           JMP     EXSBFX
0878 BA04      =2396 EXSBF4:   MOV     R2,#4
087A F8        =2397 EXSBFX:   MOV     A,R0            ;GET SCAN 1 BUFFER ADDRESS
087B A9        =2398           MOV     R1,A            ;SAVE IT
087C 6A        =2399           ADD     A,R2            ;CALCULATE SCAN 2 BUFFER ADDRESS
087D A8        =2400           MOV     R0,A            ;SAVE IT
               =2401 ;
```

```
087E F0      =2402 EXSBFL: MOV    A,@R0         ;GET SCAN 2 DATA
087F 21      =2403        XCH    A,@R1         ;EXCHANGE DATA
0880 A0      =2404        MOV    @R0,A         ;STORE SCAN 1 DATA
0881 18      =2405        INC    R0
0882 19      =2406        INC    R1
0883 EA7E    =2407        DJNZ   R2,EXSBFL
             =2408 ;
0885 F0      =2409        MOV    A,@R0         ;GET S2/S1 COUNTERS
0886 47      =2410        SWAP   A             ;EXCHANGE COUNTERS
0887 A0      =2411        MOV    @R0,A         ;SAVE COUNTERS
0888 83      =2412        RET
             =2413 ;******************************************************
             =2414 ; ROUTINE: SUM12C
             =2415 ; FUNCTION: CALCULATE L6S1 + R6S1 MOD-10 CHECKSUM.
             =2416 ; ENTRY: L6S1 AND R6S1 HAVE DATA TO USE.
             =2417 ; EXIT: A = MOD-10 CHECKSUM CALCULATION FOR 12 CHARACTERS.
             =2418 ;       USES R0,R2,R3
             =2419 ;
0889 B824    =2420 SUM12C: MOV   R0,#L6S1
088B 1461    =2421        CALL   MOD106
088D AB      =2422        MOV    R3,A          ;SAVE LEFT HALF SUM
             =2423 ;
088E B82E    =2424        MOV    R0,#R6S1
0890 1461    =2425        CALL   MOD106
0892 6B      =2426        ADD    A,R3          ;RIGHT SUM + LEFT SUM
0893 57      =2427        DA     A
0894 530F    =2428        ANL    A,#0FH        ;MASK SUM DIGIT
             =2430 ;******************************************************
             =2431 ; ROUTINE: CK6TOT
             =2432 ; FUNCTION: CHECK L6STOT AND R6STOT FOR COUNTS.
             =2433 ; ENTRY: R1 SETUP WITH MINUS THE MINIMUM NUMBER OF SCANS REQUIRED
             =2434 ; EXIT: A=0 IF EITHER COUNTER < MINIMUM REQUIRED.
             =2435 ;       A<>0 IF BOTH COUNTERS >= MINIMUM REQUIRED.
             =2436 ;       USES R0
             =2437 ;
0897 B82D    =2438 CK6TOT: MOV   R0,#L6STOT
0899 F0      =2439        MOV    A,@R0         ;GET LEFT SEGMENT TOTAL
089A 69      =2440        ADD    A,R1
089B F69F    =2441        JC     CK6T20        ;JUMP IF L6STOT >= -R1
089D 27      =2442 CK6T10: CLR   A
089E 83      =2443        RET                  ;EITHER L6 OR R6 HAD < MINIMUM
             =2444 ;
089F B835    =2445 CK6T20: MOV   R0,#R6STOT
08A1 F0      =2446        MOV    A,@R0         ;GET RIGHT SEGMENT TOTAL
08A2 69      =2447        ADD    A,R1
08A3 E69D    =2448        JNC    CK6T10        ;JUMP R6STOT < -R1
08A5 27      =2449        CLR    A
08A6 37      =2450        CPL    A
08A7 83      =2451        RET                  ;BOTH L6 AND R6 HAD >= MINIMUM
             =2452 ;******************************************************
             =2453 ; ROUTINE: MAJSGS
             =2454 ; FUNCTION: DETERMINE MAJORITY SEGMENTS.
             =2455 ;           MOVE MAJORITY SEGMENT TO BUFFER #1 IF NECESSARY.
             =2456 ;           (I.E. EXCHANGE BUFFER 1 AND BUFFER 2 DATA AND COUNTERS.)
             =2457 ;           CHECK FOR EXCESS MISMATCHES.
             =2458 ;           IF EXCESS MISMATCHES, CLEAR COUNTERS.
             =2459 ; ENTRY: NO SETUP
             =2460 ; EXIT: IF THE MISMATCH RATIO IS OK,
             =2461 ;            SEGMENT BUFFER 1 AND COUNTER 1 HAS MAJORITY.
             =2462 ;            SEGMENT BUFFER 2 AND COUNTER 2 HAS MINORITY.
             =2463 ;       IF EXCESS MISMATCHES, SEGMENT COUNTERS ARE CLEARED.
             =2464 ;
08A8 B82C    =2465 MAJSGS: MOV   R0,#L6SCNT
08AA 7437    =2466        CALL   CKMAJ
08AC F6B2    =2467        JC     MAJSG0        ;JUMP IF S1 IS MAJORITY
08AE B824    =2468        MOV    R0,#L6S1
08B0 7478    =2469        CALL   EXSBF4        ;EXCHANGE S2/S1 DATA AND COUNTERS
08B2 7448    =2470 MAJSG0: CALL  CKMISM
             =2471 ;
08B4 B834    =2472        MOV    R0,#R6SCNT
08B6 7437    =2473        CALL   CKMAJ
08B8 F6BE    =2474        JC     MAJSG1
08BA B82E    =2475        MOV    R0,#R6S1
08BC 7474    =2476        CALL   EXSBF3
08BE 7448    =2477 MAJSG1: CALL  CKMISM
             =2478 ;
08C0 BB08    =2479        MOV    R3,#8         ;NUMBER OF 4-CHAR SEGMENT BUFFERS
08C2 B83A    =2480        MOV    R0,#L4SCNT    ;FIRST S2/S1 COUNTER ADDRESS
             =2481 ;
08C4 7437    =2482 MAJSG4: CALL  CKMAJ
08C6 F6CE    =2483        JC     MAJSG5        ;JUMP IF S1 IS THE MAJORITY
08C8 F8      =2484        MOV    A,R0
08C9 03FC    =2485        ADD    A,#-4         ;CALCULATE THE S1 DATA BUFFER ADDRESS
08CB A8      =2486        MOV    R0,A
08CC 7470    =2487        CALL   EXSBF2        ;EXCHANGE S2/S1 DATA AND COUNTS
```

```
                     =2488 ;
08CE 7448            =2489 MAJSG5: CALL    CKMISM         ;CHECK MISMATCHES
08D0 F8              =2490         MOV     A,R0
08D1 0306            =2491         ADD     A,#6           ;CALCULATE NEXT S2/S1 COUNTER ADDRESS
08D3 A8              =2492         MOV     R0,A
08D4 EBC4            =2493         DJNZ    R3,MAJSG4
08D6 83              =2494         RET
                     =2495 ;******************************************
08D7 A3              =2496 TROPGB: MOVP    A,@A
08D8 83              =2497         RET
0C00                 =2498         ORG     0C00H
                     =2499 ;******************************************
                     =2500 ; ROUTINE: VERTAG
                     =2501 ; FUNCTION: PERFORM MISMATCH TEST AND GET MAJORITY SEGMENT AND COUNT
                     =2502 ;              INTO BUFFER AND COUNTER #1. (MAJSGS)
                     =2503 ;              TRY TO BUILD BLOCKS INTO VERSIONS. (TBLXXX)
                     =2504 ; ENTRY: NO SETUP
                     =2505 ; EXIT:  A=0 IF ENOUGH BLOCKS FOR A VERSION ARE FOUND.
                     =2507 ;        R6 SET TO INDICATE VALID VERSION IF ONE WAS FOUND.
                     =2508 ;        R1 SETUP WITH MINUS THE MINIMUM NUMBER OF SCANS REQUIRED.
                     =2509 ;
0C00 74A8            =2510 VERTAG: CALL    MAJSGS         ;MAJORITY/MISMATCH SEGMENT TEST
0C02 3400            =2511         CALL    NCOMM          ;CHECK COMM. MAJSGS TAKES A WHILE.
0C04 FE              =2512         MOV     A,R6
0C05 53F0            =2513         ANL     A,#0F0H        ;CLEAR THE VERSION POINTER/FLAG.
0C07 AE              =2514         MOV     R6,A
                     =2515 ;
0C08 B9FE            =2516         MOV     R1,#-2         ;REQUIRE 2 SCANS MINIMUM
0C0A B87D            =2517         MOV     R0,#CONFIG
0C0C F0              =2518         MOV     A,@R0          ;GET THE CONFIGURATION BYTE
0C0D 3211            =2519         JB1     TRYBLK         ;JUMP IF 6 CHAR 2 SCAN BIT IS SET
0C0F B9FF            =2520         MOV     R1,#-1         ;REQUIRE 1 SCAN MINIMUM
                     =2521 ;
0C11 9463            =2522 TRYBLK: CALL    TBLKA
0C13 C661            =2523         JZ      VERA           ;JUMP IF A GOOD UPC-A BLOCK
                     =2524 ;
0C15 9480            =2525         CALL    TBLK13
0C17 C660            =2526         JZ      VER13          ;JUMP IF A GOOD EAN-13 BLOCK
                     =2527 ;
0C19 949F            =2528         CALL    TBLK2
0C1B C635            =2529         JZ      VERT10         ;JUMP IF A GOOD BLK-2
                     =2530 ;
0C1D B9FE            =2531         MOV     R1,#-2         ;ALWAYS REQUIRE 2 SCANS MINIMUM FOR E
0C1F 94AF            =2532         CALL    TBLKE
0C21 C65F            =2533         JZ      VERE           ;JUMP IF A GOOD UPC-E BLOCK
                     =2534 ;
0C23 B9FE            =2535         MOV     R1,#-2
0C25 B87D            =2536         MOV     R0,#CONFIG
0C27 F0              =2537         MOV     A,@R0          ;GET THE CONFIGURATION BYTE
0C28 122C            =2538         JB0     VERT05         ;JUMP IF 4 CHAR 2 SCAN BIT IS SET
0C2A B9FF            =2539         MOV     R1,#-1
                     =2540 ;
0C2C B42F            =2541 VERT05: CALL    TBLK1
0C2E C658            =2542         JZ      VERD1          ;JUMP IF A GOOD BLK-1. (D-1)
                     =2543 ;
0C30 94C2            =2544         CALL    TBLK8
0C32 C65E            =2545         JZ      VER8           ;JUMP IF A GOOD EAN-8 BLOCK
0C34 83              =2546         RET                    ;RETURN IF NOT ENOUGH BLOCKS
                     =2547 ;
0C35 B9FE            =2548 VERT10: MOV     R1,#-2
0C37 B87D            =2549         MOV     R0,#CONFIG
0C39 F0              =2550         MOV     A,@R0          ;GET THE CONFIGURATION BYTE
0C3A 123E            =2551         JB0     VERT15         ;JUMP IF 4 CHAR 2 SCAN BIT IS SET
0C3C B9FF            =2552         MOV     R1,#-1
                     =2553 ;
0C3E B49E            =2554 VERT15: CALL    TBLK5
0C40 C64B            =2555         JZ      VERT20         ;JUMP IF A GOOD BLK-5
                     =2556 ;
0C42 B406            =2557         CALL    TBLK6
0C44 C656            =2558         JZ      VERD3          ;JUMP IF A GOOD BLK-6. (D-3)
                     =2559 ;
0C46 B466            =2560         CALL    TBLK3
0C48 C657            =2561         JZ      VERD2          ;JUMP IF A GOOD BLK-3. (D-2)
0C4A 83              =2562         RET                    ;RETURN IN NOT ENOUGH BLOCKS
                     =2563 ;
0C4B B48A            =2564 VERT20: CALL    TBLK7
0C4D C654            =2565         JZ      VERD5          ;JUMP IF A GOOD BLK-7. (D-5)
                     =2566 ;
0C4F B482            =2567         CALL    TBLK4
0C51 C655            =2568         JZ      VERD4          ;JUMP IF A GOOD BLK-4. (D-4)
0C53 83              =2569         RET                    ;RETURN IF NOT ENOUGH BLOCKS
                     =2570 ;
0C54 1E              =2571 VERD5:  INC     R6             ;SET R6=9
0C55 1E              =2572 VERD4:  INC     R6             ;SET R6=8
0C56 1E              =2573 VERD3:  INC     R6             ;SET R6=7
0C57 1E              =2574 VERD2:  INC     R6             ;SET R6=6
0C58 1E              =2575 VERD1:  INC     R6             ;SET R6=5
```

```
                =2576 ;
                =2577 ;
0C59 2301       =2578           MOV     A,#1            ;NO VERSION D ALLOWED
                =2579 ;
0C5B BE00       =2580 VERT80:   MOV     R6,#0           ;CLEAR THE VERSION FLAG
0C5D 83         =2581           RET                     ;RETURN W/ A<>0, NO VERSIONS
                =2582 ;
0C5F 1E         =2584 VERE:     INC     R6              ;SET R6=3
0C60 1E         =2585 VER13:    INC     R6              ;SET R6=2
0C61 1E         =2586 VERA:     INC     R6              ;SET R6=1
                =2587 ;
0C62 83         =2588 VERT90:   RET
                 2589 $         INCLUDE(:F1:TBLXXX.SRC)
                =2590 ;****************************************************
                =2591 ;   FILE: TBLXXX.SRC   09-11-86 09:10  BOB ACTIS
                =2592 ;****************************************************
                =2593 ;   ROUTINE: TBLKA
                =2594 ;   FUNCTION: TRY FOR A VALID UPC-A BLOCK.
                =2595 ;             CHECK THAT L6 AND R6 HAVE ENOUGH DATA.
                =2596 ;             CHECK THAT L6 IS AN A-L.
                =2597 ;             IF OK SO FAR, CALCULATE MOD-10 CHECK CHARACTER.
                =2598 ;             IF STILL OK, RETURN WITH A=0.
                =2599 ;             IF MOD-10 ERROR, CLEAR 4&6-CHAR SEGMENT COUNTERS AND
                =2600 ;                CLEAR VERSION POINTER/FLAG.
                =2601 ;   ENTRY: SCAN 1 BUFFER IS MAJORITY SCAN.
                =2602 ;          R1 SETUP WITH MINUS THE MINIMUM NUMBER OF SCANS REQUIRED
                =2603 ;   EXIT: USES R0,R2,R3,A
                =2604 ;         A=0 IF GOOD BLOCK
                =2605 ;         A<>0 IF NO BLOCK
                =2606 ;
0C63 7497       =2607 TBLKA:    CALL    CK6TOT
0C65 C67D       =2608           JZ      TBNONE          ;JUMP IF NO LEFT OR NO RIGHT SEGMENTS
                =2609 ;
0C67 B827       =2610           MOV     R0,#L6S1+3
0C69 F0         =2611           MOV     A,@R0           ;GET PARITY DECODE BYTE
0C6A 530C       =2612           ANL     A,#0CH
0C6C D30C       =2613           XRL     A,#0CH
0C6E 967D       =2614           JNZ     TBNONE          ;JUMP IF NOT AN AL
                =2615 ;
0C70 7489       =2616           CALL    SUM12C          ;GO CALCULATE LEFT + RIGHT CHECKSUM
0C72 9675       =2617           JNZ     TBERR6          ;JUMP IF MOD-10 IS BAD
0C74 83         =2618           RET
                =2619 ;
                =2620 ;   THE FOLLOWING IS USED BY OTHER TBLXXX ROUTINES, BUFMAN, & RDTAG
                =2621 ;
0C75            =2622 CLRVER    EQU     $               ;ENTRY POINT TO CLEAR VERSION FLAGS & DATA
0C75 1400       =2623 TBERR6:   CALL    CLR6SG          ;CLEAR 6-CHAR SEGMENTS AND COUNTERS
0C77 1406       =2624 TBERR4:   CALL    CLR4SG          ;CLEAR 4-CHAR SEGMENTS AND COUNTERS
0C79 FE         =2625           MOV     A,R6
0C7A 53F0       =2626           ANL     A,#0F0H         ;CLEAR VERSION POINTER/FLAG
0C7C AE         =2627           MOV     R6,A
0C7D 27         =2628 TBNONE:   CLR     A
0C7E 37         =2629           CPL     A
0C7F 83         =2630           RET
                =2631 ;****************************************************
                =2632 ;   ROUTINE: TBLK13
                =2633 ;   FUNCTION: TRY FOR A VALID EAN-13 BLOCK.
                =2634 ;             CHECK THAT L6 AND R6 HAVE ENOUGH DATA.
                =2635 ;             CHECK THAT L6 IS AN EAN-13-L.
                =2636 ;             IF OK SO FAR, CALCULATE MOD-10 CHECK CHARACTER.
                =2637 ;             IF STILL OK, RETURN WITH A=0.
                =2638 ;             IF MOD-10 FAILS, CLEAR 4&6-CHAR SEGMENT COUNTER AND
                =2639 ;                CLEAR VERSION POINTER/FLAG.
                =2640 ;   ENTRY: SCAN 1 BUFFER IS MAJORITY SCAN.
                =2641 ;          R1 SETUP WITH MINUS THE MINIMUM NUMBER OF SCANS REQUIRED
                =2642 ;   EXIT: USES R0,R2,R3,A
                =2643 ;         A=0 IF GOOD BLOCK.
                =2644 ;         A<>0 IF NO BLOCK FOUND.
                =2645 ;
0C80 7497       =2646 TBLK13:   CALL    CK6TOT
0C82 C67D       =2647           JZ      TBNONE          ;JUMP IF NO LEFT OR NO RIGHT SEGMENTS
                =2648 ;
0C84 B827       =2649           MOV     R0,#L6S1+3
0C86 F0         =2650           MOV     A,@R0           ;GET PARITY DECODE BYTE
0C87 5330       =2651           ANL     A,#EDECE+EDECD  ;MASK D AND E SEG BITS
0C89 967D       =2652           JNZ     TBNONE          ;JUMP IF D OR E SEGMENT
                =2653 ;
0C8B F0         =2654           MOV     A,@R0
0C8C 530F       =2655           ANL     A,#0FH          ;MASK THE DECODED CHARACTER
0C8E 03F6       =2656           ADD     A,#-10          ;A>9 IS AN A OR B SEGMENT
0C90 F67D       =2657           JC      TBNONE          ;JUMP IS A OR B SEGMENT
                =2658 ;
0C92 7489       =2659           CALL    SUM12C
                =2661 ;
0C95 B827       =2662           MOV     R0,#L6S1+3
0C97 F0         =2663           MOV     A,@R0           ;GET PARITY DECODE CHARACTER
0C98 68         =2664           ADD     A,R3            ;ADD 13TH CHARACTER
```

```
OC99 57      =2665        DA      A
OC9A 530F    =2666        ANL     A,#0FH
OC9C 9675    =2667        JNZ     TBERR6          ;JUMP IF MOD-10 IS BAD
OC9E 83      =2668        RET
             =2669 ;*********************************************************
             =2670 ; ROUTINE: TBLK2
             =2671 ; FUNCTION: TRY FOR A VALID VERSION-D BLOCK-2.
             =2672 ;             CHECK THAT L6 AND R6 HAVE ENOUGH DATA.
             =2673 ;             CHECK THAT L6 IS A D-TAG.
             =2674 ;             IF OK SO FAR, CALCULATE MOD-10 CHECK CHARACTER.
             =2675 ;             IF STILL OK, RETURN WITH A=0.
             =2676 ;             IF MOD-10 ERROR, CLEAR 4&6-CHAR SEGMENT COUNTERS AND
             =2677 ;                CLEAR VERSION POINTER/FLAG.
             =2678 ; ENTRY: SCAN 1 BUFFER IS MAJORITY SCAN.
             =2679 ;        R1 SETUP WITH MINUS THE MINIMUM NUMBER OF SCANS REQUIRED
             =2680 ; EXIT: USER R0,R2,R3,A
             =2681 ;        A=0 IF GOOD BLOCK
             =2682 ;        A<>0 IF NO BLOCK
             =2683 ;
OC9F 7497    =2684 TBLK2: CALL    CK6TOT
OCA1 C67D    =2685        JZ      TBNONE          ;JUMP IF NO LEFT OR NO RIGHT SEGMENTS
             =2686 ;
OCA3 B827    =2687        MOV     R0,#L6S1+3
OCA5 F0      =2688        MOV     A,@R0           ;GET PARITY DECODE BYTE
OCA6 5320    =2689        ANL     A,#EDECD
OCA8 C67D    =2690        JZ      TBNONE          ;JUMP IF NOT A D-TAG.
             =2691 ;
OCAA 7489    =2692        CALL    SUM12C
OCAC 9675    =2693        JNZ     TBERR6          ;JUMP IF MOD-10 TEST FAILED
OCAE 83      =2694        RET
             =2695 ;*********************************************************
             =2696 ; ROUTINE: TBLKE
             =2697 ; FUNCTION: TRY FOR A VALID UPC-E BLOCK.
             =2698 ;             CHECK THAT L6 HAS ENOUGH DATA
             =2699 ;             CHECK THAT L6 IS AN E-TAG.
             =2700 ;             CHECK THAT R6 HAS NO DATA.
             =2701 ;             IF OK, RETURN WITH A=0.
             =2702 ;             ELSE, CLEAR 4&6-CHAR SEGMENT COUNTERS AND
             =2703 ;                CLEAR THE VERSION POINTER/FLAG.
             =2704 ; ENTRY: SCAN 1 BUFFER IS THE MAJORITY SCAN.
             =2705 ;        R1 SETUP WITH MINUS THE MINIMUM NUMBER OF SCANS REQUIRED
             =2706 ; EXIT: USES R0,A
             =2707 ;        A=0 IF GOOD BLOCK.
             =2708 ;        A<>0 IF NO BLOCK.
             =2709 ;
OCAF B82D    =2710 TBLKE: MOV     R0,#L6STOT
OCB1 F0      =2711        MOV     A,@R0
OCB2 69      =2712        ADD     A,R1
OCB3 E67D    =2713        JNC     TBNONE          ;JUMP IF < -R1 LEFT SEGMENTS
             =2714 ;
OCB5 B827    =2715        MOV     R0,#L6S1+3
OCB7 F0      =2716        MOV     A,@R0           ;GET PARITY DECODE BYTE
OCB8 5310    =2717        ANL     A,#EDECE
OCBA C67D    =2718        JZ      TBNONE          ;JUMP IF NOT AN E-SEG.
             =2719 ;
OCBC B835    =2720        MOV     R0,#R6STOT
OCBE F0      =2721        MOV     A,@R0
OCBF 9675    =2722        JNZ     TBERR6          ;JUMP IF R6 SEGMENTS ARE PRESENT
             =2723 ;
OCC1 83      =2724        RET
             =2725 ;*********************************************************
             =2726 ; ROUTINE: TBLK8
             =2727 ; FUNCTION: TRY FOR A VALID EAN-8 BLOCK.
             =2728 ;             IF ANY 6-CHAR SEGMENTS ARE PRESENT, CLEAR 4-CHAR
             =2729 ;                SEGMENT COUNTERS AND VERSION POINTER/FLAG.
             =2730 ;             CHECK THAT L4 AND R4 HAVE ENOUGH DATA.
             =2731 ;             IF OK SO FAR, CALCULATE THE MOD-10 CHECK CHARACTER.
             =2732 ;             IF STILL OK, RETURN WITH A=0.
             =2733 ;             IF MOD-10 ERROR, CLEAR 4-CHAR SEGMENT COUNTERS AND
             =2734 ;                CLEAR VERSION POINTER/FLAG.
             =2735 ; ENTRY: SCAN 1 BUFFER IS THE MAJORITY SCAN.
             =2736 ;        R1 SETUP WITH MINUS THE MINIMUM NUMBER OF SCANS REQUIRED
             =2738 ;        A=0 IF GOOD BLOCK
             =2739 ;        A<>0 IF NO BLOCK
             =2740 ;
OCC2 B82D    =2741 TBLK8: MOV     R0,#L6STOT
OCC4 F0      =2742        MOV     A,@R0
OCC5 9677    =2743        JNZ     TBERR4          ;JUMP IF ANY 6L SEGMENTS
             =2744 ;
OCC7 B835    =2745        MOV     R0,#R6STOT
OCC9 F0      =2746        MOV     A,@R0
OCCA 9677    =2747        JNZ     TBERR4          ;JUMP IF ANY 6R SEGMENTS
             =2748 ;
OCCC B838    =2749        MOV     R0,#L4STOT
OCCE F0      =2750        MOV     A,@R0
OCCF 69      =2751        ADD     A,R1
OCD0 E67D    =2752        JNC     TBNONE          ;JUMP IF < -R1 LEFT HALF SEGMENTS
```

```
                    =2753 ;
0CD2 8841           =2754           MOV    R0,#R4STOT
0CD4 F0             =2755           MOV    A,@R0
0CD5 69             =2756           ADD    A,R1
0CD6 E67D           =2757           JNC    TBNONE        ;JUMP IF < -R1 RIGHT HALF SEGMENTS
                    =2758 ;
0CD8 8836           =2759           MOV    R0,#L4S1
0CDA 145C           =2760           CALL   MOD104
0CDC AB             =2761           MOV    R3,A          ;SAVE LEFT SUM
0CDD 883C           =2762           MOV    R0,#R4S1
0CDF 145C           =2763           CALL   MOD104
0CE1 6B             =2764           ADD    A,R3          ;RIGHT SUM + LEFT SUM
0CE2 57             =2765           DA     A
0CE3 530F           =2766           ANL    A,#0FH
0CE5 9677           =2767           JNZ    TBERR4        ;JUMP IF MOD-10 IS BAD
0CE7 83             =2768           RET
                    =2769 ;************************************
0CE8 A3             =2770 TROPGC:   MOVP   A,@A
0CE9 83             =2771           RET
0000                =2772           ORG    0000H
                    =2773 ;************************************************************
                    =2774 ; ROUTINE: TBLK6
                    =2775 ; FUNCTION: TRY FOR A VALID VERSION-D BLOCK-6.
                    =2776 ;           CHECK THAT N(3), N(5) AND 8(R) HAVE ENOUGH DATA.
                    =2777 ;           IF THEY DO, CALCULATE MOD-10 CHECK CHARACTER.
                    =2778 ;           IF OK, RETURN WITH A=0.
                    =2779 ;           ELSE, CLEAR 4-CHAR SEGMENT COUNTERS AND
                    =2780 ;               CLEAR THE VERSION POINTER/FLAG.
                    =2781 ; ENTRY: SCAN 1 IS THE MAJORITY SCAN.
                    =2782 ;         R1 SETUP WITH MINUS THE MINIMUM NUMBER OF SCANS REQUIRED
                    =2783 ; EXIT:  USES R0,R2,R3,A
                    =2784 ;         A=0 IF GOOD BLOCK
                    =2785 ;         A<>0 IF NO BLOCK
                    =2786 ;
0000 8477           =2787 TBER4J:   JMP    TBERR4
0002 8475           =2788 TBER6J:   JMP    TBERR6
0004 847D           =2789 TBNONJ:   JMP    TBNONE
                    =2790 ;
0006 8853           =2791 TBLK6:    MOV    R0,#N3STOT
0008 F0             =2792           MOV    A,@R0
0009 69             =2793           ADD    A,R1
000A E604           =2794           JNC    TBNONJ        ;JUMP IF < -R1 N3 SEGMENTS
                    =2795 ;
000C 885F           =2796           MOV    R0,#N5STOT
000E F0             =2797           MOV    A,@R0
000F 69             =2798           ADD    A,R1
0010 E604           =2799           JNC    TBNONJ        ;JUMP IF < -R1 N5 SEGMENTS
                    =2800 ;
0012 8841           =2801           MOV    R0,#R4STOT
0014 F0             =2802           MOV    A,@R0
0015 69             =2803           ADD    A,R1
0016 E604           =2804           JNC    TBNONJ        ;JUMP IF < -R1 8R SEGMENTS
                    =2805 ;
0018 884E           =2806           MOV    R0,#N3S1
001A 145C           =2807           CALL   MOD104
001C AB             =2808           MOV    R3,A
                    =2809 ;
001D 885A           =2810           MOV    R0,#N5S1
001F 145C           =2811           CALL   MOD104
0021 6B             =2812           ADD    A,R3
0022 57             =2813           DA     A
                    =2815 ;
0024 883C           =2816           MOV    R0,#R4S1
0026 145C           =2817           CALL   MOD104
0028 6B             =2818           ADD    A,R3
0029 57             =2819           DA     A
002A 530F           =2820           ANL    A,#0FH
002C 9600           =2821           JNZ    TBER4J
002E 83             =2822           RET
                    =2823 ;************************************************************
                    =2824 ; ROUTINE: TBLK1
                    =2825 ; FUNCTION: TRY FOR A VALID VERSION-D BLOCK-1.
                    =2826 ;           CHECK THAT L6, N(6) AND 8(L) HAVE ENOUGH DATA.
                    =2827 ;           CHECK THAT L6 IS A D-TAG
                    =2828 ;           REVERSE 8L DATA
                    =2829 ;           CALCULATE MOD-10 CHECK CHARACTER.
                    =2830 ;           IF OK, RETURN WITH A=0.
                    =2831 ;           ELSE, CLEAR 4&6-CHAR SEGMENT COUNTERS AND
                    =2832 ;               CLEAR THE VERSION POINTER/FLAG.
                    =2833 ; ENTRY: SCAN 1 IS THE MAJORITY SCAN.
                    =2834 ;         R1 SETUP WITH MINUS THE MINIMUM NUMBER OF SCANS REQUIRED
                    =2835 ; EXIT:  USES R0,R2,R3,A
                    =2836 ;         A=0 IF GOOD BLOCK
                    =2837 ;         A<>0 IF NO BLOCK
                    =2838 ;
002F 882D           =2839 TBLK1:    MOV    R0,#L6STOT
0031 F0             =2840           MOV    A,@R0
0032 69             =2841           ADD    A,R1
```

```
0033 E604    =2842        JNC    TBNONJ     ;JUMP IF < -R L6 SEGMENTS
             =2843 ;
0035 B827    =2844        MOV    R0,#L6S1+3
0037 F0      =2845        MOV    A,@R0       ;GET PARITY DECODE BYTE
0038 5320    =2846        ANL    A,#EDECD
003A C604    =2847        JZ     TBNONJ      ;JUMP IF NOT A D-TAG
             =2848 ;
003C B865    =2849        MOV    R0,#N6STOT
003E F0      =2850        MOV    A,@R0
003F 69      =2851        ADD    A,R1
0040 E604    =2852        JNC    TBNONJ      ;JUMP IF < -R1 N6 SEGMENTS
             =2853 ;
0042 B83B    =2854        MOV    R0,#L4STOT
0044 F0      =2855        MOV    A,@R0
0045 69      =2856        ADD    A,R1
0046 E604    =2857        JNC    TBNONJ      ;JUMP IF < -R1 8L SEGMENTS
             =2858 ;
0048 B824    =2859        MOV    R0,#L6S1
004A 1461    =2860        CALL   MOD106
004C AB      =2861        MOV    R3,A
             =2862 ;
004D B860    =2863        MOV    R0,#N6S1
004F 145C    =2864        CALL   MOD104
0051 68      =2865        ADD    A,R3
0052 57      =2866        DA     A
0053 AB      =2867        MOV    R3,A
             =2868 ;
0054 B836    =2869        MOV    R0,#L4S1    ;REVERSE 8L DATA
0056 F0      =2870        MOV    A,@R0       ;GET CHAR 1&2
0057 47      =2871        SWAP   A
0058 18      =2872        INC    R0
0059 20      =2873        XCH    A,@R0       ;GET CHAR 3&4, SAVE CHAR 2&1
005A 47      =2874        SWAP   A
005B C8      =2875        DEC    R0
005C A0      =2876        MOV    @R0,A       ;SAVE CHAR 4&3
             =2877 ;
005D 145C    =2878        CALL   MOD104
005F 68      =2879        ADD    A,R3
0060 57      =2880        DA     A
0061 530F    =2881        ANL    A,#0FH
0063 9602    =2882        JNZ    TBER6J
0065 83      =2883        RET
             =2884 ;***********************************************
             =2885 ; ROUTINE: TBLK3
             =2886 ; FUNCTION: TRY FOR A VALID VERSION-D BLOCK-3.
             =2887 ;           CHECK THAT N(2) AND 8(R) HAVE ENOUGH DATA.
             =2888 ;           IF THEY DO, CALCULATE MOD-10 CHECK CHARACTER.
             =2889 ;           IF OK, RETURN WITH A=0.
             =2890 ;           ELSE, CLEAR 4-CHAR SEGMENT COUNTERS AND
             =2891 ;
             =2892 ; ENTRY: SCAN 1 IS THE MAJORITY SCAN.
             =2893 ;        R1 SETUP WITH MINUS THE MINIMUM NUMBER OF SCANS REQUIRED
             =2894 ; EXIT:  USES R0,R2,R3,A
             =2895 ;        A=0 IF GOOD BLOCK
             =2896 ;        A<>0 IF NO BLOCK
             =2897 ;
0066 B840    =2898 TBLK3: MOV    R0,#N2STOT
0068 F0      =2899        MOV    A,@R0
0069 69      =2900        ADD    A,R1
006A E604    =2901        JNC    TBNONJ      ;JUMP IF < -R1 N2 SEGMENTS
             =2902 ;
006C B841    =2903        MOV    R0,#R4STOT
006E F0      =2904        MOV    A,@R0
006F 69      =2905        ADD    A,R1
0070 E604    =2906        JNC    TBNONJ      ;JUMP IF < -R1 8R SEGMENTS
             =2907 ;
0072 B848    =2908        MOV    R0,#N2S1
0074 145C    =2909        CALL   MOD104
0076 AB      =2910        MOV    R3,A
             =2911 ;
0077 B83C    =2912        MOV    R0,#R4S1
0079 145C    =2913        CALL   MOD104
007B 68      =2914        ADD    A,R3
007C 57      =2915        DA     A
007D 530F    =2916        ANL    A,#0FH
007F 9600    =2917        JNZ    TBER4J
0081 83      =2918        RET
             =2919 ;***********************************************
             =2920 ; ROUTINE: TBLK4
             =2921 ; FUNCTION: TRY FOR A VALID VERSION-D BLOCK-4.
             =2922 ;           CHECK THAT N(5) AND N(1) HAVE ENOUGH DATA.
             =2923 ;           IF THEY DO, CALCULATE MOD-10 CHECK CHARACTER.
             =2924 ;           IF OK, RETURN WITH A=0.
             =2925 ;           ELSE, CLEAR 4-CHAR SEGMENT COUNTERS AND
             =2926 ;              CLEAR THE VERSION POINTER/FLAG.
             =2927 ; ENTRY: SCAN 1 IS THE MAJORITY SCAN.
             =2928 ;        R1 SETUP WITH MINUS THE MINIMUM NUMBER OF SCANS REQUIRED
             =2929 ; EXIT:  USES R0,R2,R3,A
```

```
                    =2930 ;        A=0 IF GOOD BLOCK
                    =2931 ;        A<>0 IF NO BLOCK
                    =2932 ;
0082 B85F           =2933 TBLK4:   MOV    R0,#N5STOT
0084 F0             =2934          MOV    A,@R0
0085 69             =2935          ADD    A,R1
0086 E604           =2936          JNC    TBNONJ         ;JUMP IF < -R1 N5 SEGMENTS
                    =2937 ;
0088 B847           =2938          MOV    R0,#N1STOT
008A F0             =2939          MOV    A,@R0
008B 69             =2940          ADD    A,R1
008C E604           =2941          JNC    TBNONJ         ;JUMP IF < -R1 N1 SEGMENTS
                    =2942 ;
008E B85A           =2943          MOV    R0,#N5S1
0090 145C           =2944          CALL   MOD104
0092 A8             =2945          MOV    R3,A
                    =2946 ;
0093 B842           =2947          MOV    R0,#N1S1
0095 145C           =2948          CALL   MOD104
0097 6B             =2949          ADD    A,R3
0098 57             =2950          DA     A
0099 530F           =2951          ANL    A,#0FH
009B 9600           =2952          JNZ    TBER4J
009D 83             =2953          RET
                    =2954 ;****************************************************
                    =2955 ; ROUTINE: TBLK5
                    =2956 ; FUNCTION: TRY FOR A VALID VERSION-D BLOCK-5.
                    =2957 ;           CHECK THAT N(4) AND 8(R) HAVE ENOUGH DATA.
                    =2958 ;           IF THEY DO, CALCULATE MOD-10 CHECK CHARACTER.
                    =2959 ;           IF OK, RETURN WITH A=0.
                    =2960 ;           ELSE, CLEAR 4-CHAR SEGMENT COUNTERS AND
                    =2961 ;           CLEAR THE VERSION POINTER/FLAG.
                    =2962 ; ENTRY: SCAN 1 IS THE MAJORITY SCAN.
                    =2963 ;        R1 SETUP WITH MINUS THE MINIMUM NUMBER OF SCANS REQUIRED
                    =2964 ; EXIT:  USES R0,R2,R3,A
                    =2965 ;        A=0 IF GOOD BLOCK
                    =2966 ;        A<>0 IF NO BLOCK
                    =2967 ;
00A0 F0             =2969          MOV    A,@R0
00A1 69             =2970          ADD    A,R1
00A2 E604           =2971          JNC    TBNONJ         ;JUMP IF < -R1 N4 SEGMENTS
                    =2972 ;
00A4 B841           =2973          MOV    R0,#R4STOT
00A6 F0             =2974          MOV    A,@R0
00A7 69             =2975          ADD    A,R1
00A8 E604           =2976          JNC    TBNONJ         ;JUMP IF < -R1 8R SEGMENTS
                    =2977 ;
00AA B854           =2978          MOV    R0,#N4S1
00AC 145C           =2979          CALL   MOD104
00AE A8             =2980          MOV    R3,A
                    =2981 ;
00AF B83C           =2982          MOV    R0,#R4S1
00B1 145C           =2983          CALL   MOD104
00B3 68             =2984          ADD    A,R3
00B4 57             =2985          DA     A
00B5 530F           =2986          ANL    A,#0FH
00B7 9600           =2987          JNZ    TBER4J
00B9 83             =2988          RET
                    =2989 ;****************************************************
                    =2990 ; ROUTINE: TBLK7
                    =2991 ; FUNCTION: TRY FOR A VALID VERSION-D BLOCK-7.
                    =2992 ;           CHECK THAT N(3), N(6) AND N(1) HAVE ENOUGH DATA.
                    =2993 ;           IF THEY DO, CALCULATE MOD-10 CHECK CHARACTER.
                    =2994 ;           IF OK, RETURN WITH A=0.
                    =2995 ;           ELSE, CLEAR 4-CHAR SEGMENT COUNTERS AND
                    =2996 ;           CLEAR THE VERSION POINTER/FLAG.
                    =2997 ; ENTRY: SCAN 1 IS THE MAJORITY SCAN.
                    =2998 ;        R1 SETUP WITH MINUS THE MINIMUM NUMBER OF SCANS REQUIRED
                    =2999 ; EXIT:  USES R0,R2,R3,A
                    =3000 ;        A=0 IF GOOD BLOCK
                    =3001 ;        A<>0 IF NO BLOCK
                    =3002 ;
00BA B853           =3003 TBLK7:   MOV    R0,#N3STOT
00BC F0             =3004          MOV    A,@R0
00BD 69             =3005          ADD    A,R1
00BE E604           =3006          JNC    TBNONJ         ;JUMP IF < -R1 N3 SEGMENTS
                    =3007 ;
00C0 B865           =3008          MOV    R0,#N6STOT
00C2 F0             =3009          MOV    A,@R0
00C3 69             =3010          ADD    A,R1
00C4 E604           =3011          JNC    TBNONJ         ;JUMP IF < -R1 N6 SEGMENTS
                    =3012 ;
00C6 B847           =3013          MOV    R0,#N1STOT
00C8 F0             =3014          MOV    A,@R0
00C9 69             =3015          ADD    A,R1
00CA E604           =3016          JNC    TBNONJ         ;JUMP IF < -R1 N1 SEGMENTS
```

```
                    =3017 ;
OOCC B84E           =3018          MOV    R0,#N3S1
OOCE 145C           =3019          CALL   MOD104
OODO AB             =3020          MOV    R3,A
                    =3021 ;
OOD1 B860           =3022          MOV    R0,#N6S1
OOD3 145C           =3023          CALL   MOD104
OOD5 68             =3024          ADD    A,R3
OOD6 57             =3025          DA     A
OOD7 AB             =3026          MOV    R3,A
                    =3027 ;
OOD8 B842           =3028          MOV    R0,#N1S1
OOOA 145C           =3029          CALL   MOD104
OOOC 68             =3030          ADD    A,R3
OOOD 57             =3031          DA     A
OODE 530F           =3032          ANL    A,#OFH
OOEO 9600           =3033          JNZ    TBER4J
OOE2 83             =3034          RET
                    3035 ;***********************************
OOE3 A3             3036  TROPGD:  MOVP   A,@A
OOE4 83             3037          RET
                    3038          ORG    OEOOH
OE00                3039 $ INCLUDE(:F1:SLRDTG.SRC)
                    =3040 ;***********************************
                    =3041 ; FILE: SLRDTG.SRC  10-08-86 15:55  BOB ACTIS
                    =3042 ; ROUTINE: RDTAG FOR THE 750SL THIS IS THE MAIN PROGRAM
                    =3043 ;                                ;CLEAR THE SCAN FLAGS EXCEPT FOR
OE00 FC             =3044 RDTAG:   MOV    A,R4            ;BUFMAN REQUEST
OE03 AC             =3046          MOV    R4,A
OE04 B208           =3047          JB5    RDT05           ;JUMP IF THE BUFMAN REQUEST FLAG IS SET
                    =3048 ;                               ;CLEAR THE VERSION POINTER/FLAG & DATA
OE06 9475           =3049          CALL   CLRVER
OE08 140C           =3050 RDT05:   CALL   CLRSNB          ;CLEAR THE SCAN BUFFER
                    =3051 ;
                    =3052 ; WAIT FOR THE LABEL TO GO AWAY. CHECK MOTOR SPEED.
                    =3053 ;                               ;CHECK MOTOR SPEED
OE0A D484           =3054 RDT10:   CALL   MTRCHK
OE0C 3400           =3055          CALL   NCOMM           ;SERVICE THE I/F AND BUFMAN
OE0E 8619           =3056          JNI    RDT20           ;JUMP IF SYMCAP (SEGMENT OR SDATA)
                    =3057 ;                               ;GET THE "SEG SEEN" TIMER
OE10 FF             =3058          MOV    A,R7
OE11 960A           =3059          JNZ    RDT10           ;JUMP IF A SEG RECENTLY SEEN
                    =3060 ;                               ;SET THE DOUBLE READ TIMER
OE13 BD16           =3061          MOV    R5,#EDRDLY
                    =3062 ;                               ;SET THE GD-LT ON TIMER
OE15 BF2A           =3063 RDT15:   MOV    R7,#EGDLTW
OE17 C41F           =3064          JMP    RDT30           ;GO WAIT FOR A LABEL TO READ
                    =3065 ;
                    =3066 ; RESET THE SYMCAP OR SERVICE SDATA
                    =3067 ;                               ;RESET THE SEG, ALSO CHECK FOR SDATA
OE19 14A4           =3068 RDT20:   CALL   CKFCA           ;SERVICE THE I/F AND BUFMAN.  ALSO
OE1B 3400           =3069          CALL   NCOMM
OE1D C40A           =3070          JMP    RDT10           ;DELAY FOR FCA TO RESET
                    =3071 ;
                    =3072 ; WAIT FOR A LABEL TO READ. CHECK GD-LT ON TIME AND MOTOR SPEED.
                    =3073 ;
OE1F FC             =3074 RDT30:   MOV    A,R4            ;SET THE SCAN FLAG SO CKFCA WILL
OE20 4301           =3075          ORL    A,#ESCNG        ;PUT THE SEGMENT INTO THE SCAN BUFFER
OE22 AC             =3076          MOV    R4,A
                    =3077 ;
OE23 3400           =3078 RDT35:   CALL   NCOMM
OE25 14A4           =3079          CALL   CKFCA           ;SERVICE FCA. POSSIBLE SEG OR SDATA.
OE27 B823           =3080          MOV    R0,#SCNBUF+3
OE29 F0             =3081          MOV    A,@R0           ;GET THE SCAN BUF PARITY DECOTE BYTE
OE2A 9637           =3082          JNZ    RDT40           ;JUMP IF SCAN BUFFER HAS DATA
                    =3083 ;                               ;CHECK MOTOR SPEED
OE2C D484           =3084          CALL   MTRCHK
                    =3085 ;
OE2E FF             =3086          MOV    A,R7
OE2F 9623           =3087          JNZ    RDT35           ;JUMP IF GD-LT TIMER <> 0
OE31 990F           =3088          ANL    P1,#255-EGDLT   ;GD-LT OFF
OE33 8940           =3089          ORL    P1,#EBDLT       ;BD-LT ON
OE35 C423           =3090          JMP    RDT35           ;STILL WAITING FOR A LABEL
                    =3091 ;
                    =3092 ; START READING THE LABEL
                    =3093 ;
OE37 3400           =3094 RDT40:   CALL   NCOMM
OE39 990F           =3095          ANL    P1,#255-EGDLT   ;GREEN LIGHT OFF
OE3B 8940           =3096          ORL    P1,#EBDLT       ;RED LIGHT ON
OE3D FC             =3097          MOV    A,R4
OE3E B200           =3098          JB5    RDTAG           ;JUMP IF THE BUFMAN REQUEST FLAG IS SET
OE40 C448           =3099          JMP    RDT60           ;GO PROCESS THE FIRST SEGMENT
                    =3100 ;
                    =3101 ; COLLECT AND PROCESS SEGMENTS. CHECK MOTOR SPEED.
                    =3102 ;                               ;CHECK MOTOR SPEED
OE42 D484           =3103 RDT50:   CALL   MTRCHK
OE44 3400           =3104          CALL   NCOMM
```

```
0E46 14A4    =3105         CALL    CKFCA       ;GET SEGMENTS IF ANY
0E48 5404    =3106 RDT60:  CALL    PROCSG      ;PROCESS SEGMENTS IF ANY
0E4A E5      =3107         SEL     MB0
0E4B D400    =3108         CALL    CKCNTS      ;CHK FOR ENOUGH SEGS FOR PSBL VERSION
0E4D F5      =3109         SEL     MB1
0E4E C653    =3110         JZ      RDT70       ;JUMP IF ENOUGH SEGMENTS
             =3111 ;
0E50 FF      =3112         MOV     A,R7
0E51 9642    =3113         JNZ     RDT50       ;JUMP IF SEGMENTS RECENTLY SEEN
             =3114 ;
             =3115 ; TRY FOR A VALID LABEL
             =3116 ;
0E53 3400    =3117 RDT70:  CALL    NCOMM
0E55 9400    =3118         CALL    VERTAG
0E57 C660    =3119         JZ      GOODRD      ;JUMP IF A GOOD VERSION WAS FOUND
             =3120 ;
0E59 FF      =3121         MOV     A,R7
             =3123 ;
0E5C 3400    =3124 BADRD:  CALL    NCOMM
0E5E C400    =3125         JMP     RDTAG       ;GO START OVER. NO BUFMAN REQUEST.
             =3126 ;
0E60 3400    =3127 GOODRD: CALL    NCOMM
0E62 FD      =3128         MOV     A,R5         ;GET THE DOUBLE READ TIMER
0E63 C660    =3129         JZ      GOOD10      ;JUMP IF DR TIMER=0 (OK TO DOUBLE READ)
             =3130 ;
0E65 E5      =3131         SEL     MB0
0E66 F408    =3132         CALL    DRSUMT      ;CALCULATE AND TEST THE DOUBLE READ SUM
0E68 F5      =3133         SEL     MB1
0E69 9671    =3134         JNZ     GOOD20      ;JUMP IF OLD<>NEW (NO DOUBLE READ)
0E6B C400    =3135         JMP     RDTAG       ;JUMP IF DOUBLE READ TOO SOON
             =3136 ;
0E6D E5      =3137 GOOD10: SEL     MB0
0E6E F408    =3138         CALL    DRSUMT      ;CALCULATE AND SAVE THE LABEL SUM
0E70 F5      =3139         SEL     MB1
0E71 998F    =3140 GOOD20: ANL     P1,#255-EBDLT ;BD-LT OFF
0E73 8920    =3141         ORL     P1,#EGDLT   ;GD-LT ON
0E75 D5      =3142         SEL     RB1
0E76 FB      =3143         MOV     A,R3         ;TONE ENABLE FLAG
0E77 967B    =3144         JNZ     GOOD30      ;JUMP IF TONE DISABLED
0E79 BE04    =3145         MOV     R6,#EGDTON  ;GOOD TONE LENGTH
0E7B C5      =3146 GOOD30: SEL     RB0
             =3147 ;
0E7C FC      =3148 RDT90:  MOV     A,R4
0E7D 4320    =3149         ORL     A,#EBFREQ   ;SET THE BUFMAN REQUEST FLAG
0E7F AC      =3150         MOV     R4,A
0E80 F409    =3151         CALL    BUFMAN
0E82 C400    =3152         JMP     RDTAG
             =3153 ;
             =3154 ; CHECK MOTOR UP2SPD* SIGNAL (UP TO SPEED & OVER SPEED)
0E84 0A      =3155 MTRCHK: IN      A,P2
0E85 37      =3156         CPL     A
0E86 B289    =3157         JB5     MTRC10      ;JUMP IF MOTOR SPEED PROBLEM
0E88 83      =3158         RET                 ;RETURN IF OK
             =3159 ;
0E89 BF64    =3160 MTRC10: MOV     R7,#100     ;SET TIMER FOR 2 SECONDS
0E8B FF      =3161 MTRC20: MOV     A,R7
0E8C 9688    =3162         JNZ     MTRC20      ;WAIT IN CASE OF SPURIOUS ERROR
             =3163 ;
0E8E 0A      =3164         IN      A,P2
0E8F 37      =3165         CPL     A
0E90 B293    =3166         JB5     MTRERR      ;JUMP IF STILL A PROBLEM AFTER WAIT
0E92 83      =3167         RET                 ;REUTRN IF OK
             =3168 ;
             =3169 ; COME HERE IF THERE IS A MOTOR PROBLEM DURING RDTAG
0E93 8910    =3170 MTRERR: ORL     P1,#ELASDB  ;LASER OFF
0E95 99DD    =3171         ANL     P1,#255-(EMTREB+EGDLT) ;MOTOR OFF, GREEN LIGHT OFF
0E97 B804    =3172         MOV     R0,#4
0E99 E5      =3173         SEL     MB0
0E9A 747F    =3174         CALL    TERRWT      ;GIVE 4 BEEPS FOR A MOTOR ERROR
0E9C F5      =3175         SEL     MB1
             =3176 ;
             =3177 ; STICK HERE WITH THE RED LIGHT FLASHING
0E9D BF05    =3178 MTRE20: MOV     R7,#5       ;SET TIMER FOR 100MS
0E9F FF      =3179 MTRE30: MOV     A,R7
0EA0 969F    =3180         JNZ     MTRE30      ;WAIT BETWEEN LIGHT TOGGLES
             =3181 ;
0EA2 09      =3182         IN      A,P1
0EA3 998F    =3183         ANL     P1,#255-EBDLT ;RED LIGHT OFF
0EA5 D29D    =3184         JB6     MTRE20      ;JUMP IF THE RED LIGHT WAS ON
0EA7 8940    =3185         ORL     P1,#EBDLT   ;RED LIGHT ON
0EA9 C49D    =3186         JMP     MTRE20
             3187 ;*********************************
0EAB A3       3188 TROPGE: MOVP    A,@A
0EAC 83       3189         RET
0F00          3190         ORG     0F00H
              3191 $       INCLUDE(:F1:BUFMAN.SRC)
```

```
=3192 ;***********************************************************
=3193 ; FILE: BUFMAN.SRC  10-08-86 16:15  BOB ACTIS
=3194 ;***********************************************************
=3195 ; ROUTINE: BUF12C
=3196 ; FUNCTION: LOAD 12 CHARACTERS INTO THE COMMUNICATIONS BUFFER.
=3197 ;           (LOAD L6 AND R6 DATA)
=3198 ; ENTRY: R1 = NEXT AVAILABLE COMM BUFFER BYTE.

OF4D 1426    =3277         CALL    MOV2BY
OF4F B836    =3278         MOV     R0,#L4S1     ;ALREADY SWAPPED
OF51 1426    =3279         CALL    MOV2BY
OF53 E48F    =3280         JMP     BUFM90
             =3281 ;
OF55 F400    =3282 BUFM02: CALL    BUF12C
OF57 B848    =3283         MOV     R0,#N2S1
OF59 E471    =3284         JMP     BUFM8R
             =3285 ;
OF5B F400    =3286 BUFM03: CALL    BUF12C
OF5D B84E    =3287         MOV     R0,#N3S1
OF5F 1426    =3288         CALL    MOV2BY
OF61 B85A    =3289         MOV     R0,#N5S1
OF63 E471    =3290         JMP     BUFM8R
             =3291 ;
OF65 F400    =3292 BUFM04: CALL    BUF12C
OF67 B85A    =3293         MOV     R0,#N5S1
OF69 1426    =3294         CALL    MOV2BY
OF6B B842    =3295         MOV     R0,#N1S1
OF6D 1426    =3296         CALL    MOV2BY
OF6F B854    =3297         MOV     R0,#N4S1
OF71 1426    =3298 BUFM8R: CALL    MOV2BY
OF73 B83C    =3299         MOV     R0,#R4S1
OF75 1426    =3300         CALL    MOV2BY
OF77 E48F    =3301         JMP     BUFM90
             =3302 ;
OF79 F400    =3303 BUFM05: CALL    BUF12C
OF7B B854    =3304         MOV     R0,#N4S1
OF7D 1426    =3305         CALL    MOV2BY
OF7F B83C    =3306         MOV     R0,#R4S1
OF81 1426    =3307         CALL    MOV2BY
OF83 B84E    =3308         MOV     R0,#N3S1
OF85 1426    =3309         CALL    MOV2BY
OF87 B860    =3310         MOV     R0,#N6S1
OF89 1426    =3311         CALL    MOV2BY
OF8B B842    =3312         MOV     R0,#N1S1
OF8D 1426    =3313         CALL    MOV2BY
             =3314 ;
OF8F FE      =3315 BUFM90: MOV     A,R6         ;GET VERSION FLAG
OF90 43F0    =3316         ORL     A,#0F0H      ;PUT IN TERMINATION FLAG NIBBLE
OF92 A1      =3317         MOV     @R1,A        ;PUT TERMINATION FLAG BYTE IN BUFFER
OF93 19      =3318         INC     R1
             =3319 ;
OF94 B1CC    =3320         MOV     @R1,#ETRMBY  ;LOAD THE DATA TERMINATION CHARACTER
OF96 B966    =3321         MOV     R1,#SBFPNT   ;SEND BUFFER POINTER ADDRESS
OF98 B1CE    =3322         MOV     @R1,#SBSTRT  ;PUT PACKED DATA START ADRS IN POINTER
OF9A 9475    =3323         CALL    CLRVER       ;CLEAR THE VERSION POINTER/FLAG & DATA
             =3324 ;
OF9C FC      =3325         MOV     A,R4
OF9D 53DF    =3326         ANL     A,#255-EBFREQ ;CLEAR THE BUFMAN REQUEST FLAG
OF9F 4308    =3327         ORL     A,#ESBFUL    ;SET THE SEND BUFFER FULL BIT
OFA1 AC      =3328         MOV     R4,A
OFA2 83      =3329         RET
             =3330 ;
OFA3 FE      =3331 BUFM93: MOV     A,R6
OFA4 530F    =3332         ANL     A,#0FH       ;MASK THE VERSION POINTER/FLAG
OFA6 96AC    =3333         JNZ     BUFM95       ;JUMP IF A VALID VERSION
             =3334 ;
OFA8 FC      =3335 BUFM94: MOV     A,R4
OFA9 53DF    =3336         ANL     A,#255-EBFREQ ;CLEAR THE BUFMAN REQUEST FLAG
OFAB AC      =3337         MOV     R4,A
             =3338 ;
OFAC 83      =3339 BUFM95: RET
             3340 ;*********************************************
OFAD A3      3341 TROPGF: MOVP    A,@A
OFAE 83      3342         RET
             3343 ;*********************************************
OFF7         3344         ORG     0FF7H
             3345 ;
             3346 ; CHECKSUM BYTE
             3347 ;
OFF7 25      3348         DB      25H
             3349 ;
             3350 ; DATE
             3351 ;
OFF8 02      3352         DB      02H,20H,88H
```

```
OFFA 88
                    3353 ;
                    3354 ; PART NUMBER
                    3355 ;
OFFB 52             3356         DB      'R',96H,01H,53H
OFFC 96
OFFD 01
OFFE 53
                    3357 ;
                    3358 ; REVISION
                    3359 ;
OFFF 41             3360         DB      'A'
                    3361 ;*************************************
                    3362         END
```

| USER SYMBOLS | | | | | | | |
|---|---|---|---|---|---|---|---|
| APL3R2 0855 | BADRD 0E5C | BF4CNT 0030 | BF4CST 0036 | BF6CNT 0012 | BF6CST 0024 | BUF12C 0F00 | BUFM10 0F00 |
| BUFM12 0F26 | BUFM13 0F2A | BUFM20 0F0F | BUFM8 0F43 | BUFM8L 0F43 | BUFM8R 0F71 | BUFM90 0F8F | BUFM93 0FA3 |
| BUFM94 0FA8 | BUFM95 0FAC | BUFMA 0F26 | BUFMAN 0F09 | BUFMD1 0F47 | BUFMD2 0F55 | BUFMD3 0F5B | BUFMD4 0F65 |
| BUFMD5 0F79 | BUFME 0F33 | CK6T10 0B9D | CK6T20 0B9F | CK6TOT 0B97 | CKCN05 0608 | CKCN10 061A |
| CKCN20 0622 | CKCN30 062F | CKCN40 063F | CKCN45 0645 | CKCN50 064F | CKCN60 0668 | CKCN70 0675 | CKCN80 068B |
| CKCNNG 0695 | CKCNOK 0693 | CKCNTS 0600 | CKFC10 08A7 | CKFC20 0883 | CKFC80 0809 | CKFC90 08DB | CKFC95 08DF |
| CKFCA 08A4 | CKMAJ 0837 | CKMAJ9 0845 | CKMS30 0866 | CKMS80 086C | CKMS90 086F | CKRCV 095E |
| CKRCV1 095F | CKRCV2 0966 | CKRCV3 096E | CKRCV4 0977 | CKRCV5 0981 | CKRCV6 0989 | CKRCV9 098C | CLR4SG 0806 |
| CLR6SG 0800 | CLRRAM 02A4 | CLRSBF 0816 | CLRSN1 0811 | CLRSNB 080C | CLRTOO 0810 | CLRVER 0C75 | COMRST 0032 |
| CONFIG 007D | CPARTY 050E | DIBEEP 0018 | DISCAN 0012 | DRSM13 071D | DRSM1X 0756 | DRSM3X 074E | DRSM4X 074E |
| DRSM5X 072F | DRSM7B 0754 | DRSM7C 0758 | DRSM8 075E | DRSMA 071D | DRSMD1 0742 | DRSMD2 074B | DRSMD3 0739 |
| DRSMD4 072C | DRSMD5 0723 | DRSMOM 0767 | DRSME 0720 | DRSTBL 0713 | DRSUM 007C | DRSUMT 0708 | DRTIMR 0005 |
| DRVRNG 076C | E1000M 0032 | E2000M 0064 | E200MS 0018 | E480MS 0018 | E4CH2S 0001 | E6CH2S 0002 | E8OMS 0004 |
| EBDLT 0040 | EBDTON 0014 | EBFREQ 0020 | ECASE1 087C | ECASE2 0885 | ECASE3 0890 | ECASE4 0896 | EDEC8L 000A |
| EDEC8R 000B | EDECAL 000C | EDECAR 0000 | EDECB7 0080 | EDECBE 000E | EDECBF 000F | EDECBK 0040 | EDECD 0020 |
| EDECE 0010 | EDECDD 000F | EDISMS 0080 | EDRDLF 002A | EDRDLY 0016 | EFCRST 0003 | EMDCK 0890 | EMDSM 0898 | EMSNBY 00BB |
| EGDLTW 002A | EGDTON 0004 | EHCNTL 0001 | ELASDB 0010 | EMOD10 0866 | EP12 0004 | EP13 0008 | EPARRD 0000 | EPRDEC 0004 |
| EMTREB 0002 | ENBEEP 0014 | ENSCAN 0011 | EOCIA 0002 | ER4B6 0040 | ER4B7 0080 | ER684 0010 | ER685 0020 | ER686 0040 |
| ER4B1 0002 | ER4B2 0004 | ER4B4 0010 | ESCNG 0001 | ESENT 0010 | ESR4CM 0010 | ESRCHR 000F | ESRF13 0020 | ESRPER 0040 |
| ER687 0080 | ESBFUL 0008 | ETMARK 0002 | ETONCT 0028 | ETONE 0080 | ETONFQ FFFA |
| ESRRD 0001 | ESRSDT 0080 | ESUP8 0008 | ETEST 0001 | EVER13 0002 | EVER8 0004 | EVERA 0001 | EVERD1 0005 | EVERD2 0006 |
| ETRMBY 00CC | EUP2SP 0020 | EVER00 0000 | EVERD5 0009 | EVERE 0003 | EVLSIR 0040 | EWAIT 0008 | EXSBF2 0870 | EXSBF3 0B74 |
| EVERD3 0007 | EVERD4 0008 | EXSBFL 0B7E | GETLUP 0275 | GOOD10 0E60 | GOOD20 0E71 | GOOD30 0E78 | GOODRD 0E60 |
| EXSBF4 0B78 | HCOM05 0911 | HCOM10 091A | HCOM20 0933 | HCOM40 093A | HCOM50 0930 | HCOM60 0942 | HCOM70 0953 |
| HCOM03 0909 | HCOM90 095D | HCOMM 0900 | HCTBLI 094A | IFRSMG 0077 | INCHNB 09AD | INCLNB 09B5 | INCREM 04BD |
| HCOM80 0955 | INCXRT 09C0 | INTTRP 0003 | L4S1 0036 | L4S2 0038 | L4SCNT 003A | L4STOT 003B | L6S1 0024 |
| L6S2 0028 | L6SCNT 002C | L6STOT 0020 | LOOPCK 0292 | LSTUSD 007D | MAJSG0 0BB2 | MAJSG4 0BC4 |
| MAJSG5 0BCE | MAJSGS 0BA8 | MCH2BY 09C1 | MCH3BY 09C5 | MCH4BY 082E | MOV4BY 082E | MOVXBY 0830 | MCHXBY 09CB | MCHXRT 09D3 | MOD104 085C |
| MOD106 0861 | MOV2BY 0826 | MOV3BY 082A | MTRC20 0E88 | MTRCHK 0E84 | MTRE20 0E9D | MTRE30 0E9F | MTRERR 0E93 | M1S1 0042 |
| MRB1R4 001C | MTRC10 0E89 | M1STOT 0047 | M2S1 0048 | M2S2 004A | M2SCNT 004C | M2STOT 004D | M3S1 004E |
| M1S2 0054 | M1SCNT 0046 | M3STOT 0053 | M4S1 0054 | M4S2 0056 | M4SCNT 0058 | M4STOT 0059 | M5S1 005A |
| M3S2 0050 | M3SCNT 0052 | M5STOT 005F | M6S1 0060 | M6S2 0062 | M6SCNT 0064 | M6STOT 0065 | NEXT4 0516 |
| M5S2 005C | M5SCNT 005E | POW30 0305 | POWUP 039F | PRO4C2 0A62 | PRO4C3 0A6A | PRO4C4 0A70 |
| POW00 039E | POW20 03C5 | POW25 03CE | PRO4CM 0A51 | PRO6C2 0AA4 | PRO6C3 0AA8 | PRO6C4 0AAE | PRO6C6 0ABD |
| PRO4C6 0A81 | PRO4C7 0A89 | PRO4C8 0A8F | PRO7C3 0B13 | PRO7C4 0B19 | PRO7C6 0B28 | PRO7C7 0B2C |
| PRO6C7 0AC1 | PRO6C8 0AC7 | PRO6CM 0A95 | PROC3L 0A14 | PROC8 0A1B | PROC8L 0A20 | PROC8R 0A24 | PROCA 0A45 |
| PRO7C8 0B32 | PRO7CM 0B00 | PROC05 0A19 | PROCD 0A14 | PROCDM 0A2C | PROCDX 0A2B | PROCE 0A30 | PROCEX 0A4E | PROCHT 0A37 |
| PROCAL 0A4A | PROCAR 0A4C | R4S1 003C | R4S2 003E | R4SCNT 0040 | R4STOT 0041 | R6S1 002E | R6S2 0031 |
| PROCRT 0A50 | PROCSG 0A04 | RDT05 0E08 | RDT10 0E0A | RDT15 0E15 | RDT20 0E19 | RDT30 0E1F | RDT35 0E23 |
| R6SCNT 0034 | R6STOT 0035 | RDT60 0E48 | RDT70 0E53 | RDT90 0E7C | RDTAG 0E00 | RSTTRP 0000 | SBFEND 0078 |
| RDT40 0E37 | RDT50 0E42 | SBUFAD 0067 | SBUFSZ 0012 | SCNBUF 0020 | SCNFLG 0004 | SDATA 003F |
| SBFPNT 0066 | SBSTRT 00CE | SBUF 0067 | SEGBUF 0020 | SEGONE 0488 | SGM90 053A | SGMTCH 052A | SGSUM4 0837 |
| SDATA4 0042 | SDATA9 0056 | SDATAM 0046 | SGSUMX 083C | SGSUMY 0849 | STACK 0008 | SUM12C 0889 | SUM2BY 0704 | SUM3BY 0702 |
| SGSUM6 0838 | SGSUMR 0854 | SUP4SJ 0A00 | SUP4SM 098D | SUP6SJ 0A02 | SUP6SM 0998 | SUP6XEX 09A6 | SUPXRT 0A09 | TASAVE 001F |
| SUM4BY 0700 | TBER6J 0C02 | TBERR4 0C77 | TBERR6 0C75 | TBLK1 002F | TBLK13 0C80 | TBLK2 0C9F | TBLK3 0066 |
| TBER4J 0000 | TCXCNT 0280 | TBLK6 0006 | TBLK7 00BA | TBLK8 0CC2 | TBLKA 0C63 | TBLKE 0CAF | TBNONE 0C7D |
| TBLK4 0082 | TERR12 039A | TCNT1 0038 | TCNT2 003A | TERRO2 0385 | TERRO4 0388 | TERRO6 0380 | TERRO8 0393 |
| TBNONJ 0004 | TM010 040E | TERRWT 037F | THO14 041C | TEST2 0245 | TEST3 0248 | TEST4 0258 | THO00 0400 |
| TERR10 0398 | TMO55 0453 | THO12 041A | THO59 0455 | TH015 042D | TH020 0434 | THO29 0436 | TH030 0440 |
| THO05 040A | TIME40 0026 | TIME45 002F | THSND 0500 | TIME60 003B | TIME05 0015 | TIME10 0019 | TIME20 001B |
| THO50 044C | TMOT20 030F | TMOT22 0311 | TIME50 0034 | TMOT28 0323 | TIMER 0007 | TIMREG 0007 | TIMTRP 0007 |
| TIME30 001F | TMOT90 0346 | TMOT95 0348 | TMOT24 0313 | TMOTOR 0300 | TMOT40 0329 | TMOT50 032F | TMOT60 0331 |
| TMOT10 0306 | TRAM 0131 | TPON20 0355 | TPON30 0350 | TMWAIT 053B | TONCNT 001D | TONLTH 001E |
| TMOT80 0333 | TRARET 0357 | TRAM10 0133 | TRAM20 0139 | TPON40 0367 | TPON50 0371 | TPON60 0379 | TPON90 037B |
| TPON 0340 | TROPG3 03E3 | TRO10 0109 | TRO20 0110 | TRO50 011C | TROMSM 0100 | TROPG0 0057 | TROPG1 0176 |
| TPORET 03B2 | TROPGB 0807 | TROPG4 04C6 | TROPG5 0543 | TROPG6 0603 | TROPG7 076E | TROPG8 08E4 | TROPG9 09D4 |
| TRAMER 0174 | TSC11 0488 | TROPGC 0CE8 | TROPGD 0DE3 | TROPGE 0FAD | TRORET 034F | TROTAB 0121 |
| TROPG2 0280 | TST32 0255 | TSC12 0484 | TSC20 047E | TSCBUF 0050 | TSCNT 0462 | TSEG1 0030 | TSEG2 0034 |
| TROPGA 0ACC | UNPK1 0210 | TST41 0262 | TST42 0266 | TTA90 02A7 | TTACHK 02A9 | TTAG 020E | TTARET 0369 |
| TSC10 04A6 | VERD4 0C55 | UNPK2 0222 | VER13 0C60 | VER8 0C5E | VERA 0C61 | VERD1 0C58 | VERD2 0C57 |
| TST31 0251 | VERT80 0C5B | VERD5 0C54 | VERE 0C5F | VERFLG 0006 | VERT05 0C2C | VERT10 0C35 | VERT15 0C3E |
| TTATAB 0200 | | VERT90 0C62 | VERTAG 0C00 | WRKBUF 0079 | | | |
| VERD3 0C56 | | | | | | | |
| VERT20 0C4B | | | | | | | |

ASSEMBLY COMPLETE, NO ERRORS

| | | | | | | | | | | | | | | | | | |
|---|---|---|---|---|---|---|---|---|---|---|---|---|---|---|---|---|---|
| APL3R2 | 1625# | 1639 | 1648 | 1711 | | | | | | | | | | | | | |
| BADRD | 3124# | | | | | | | | | | | | | | | | |
| BF4CNT | 251# | 1514 | | | | | | | | | | | | | | | |
| BF4CST | 211# | 251 | 1513 | | | | | | | | | | | | | | |
| BF6CNT | 209# | 1502 | | | | | | | | | | | | | | | |
| BF6CST | 199# | 209 | 1501 | | | | | | | | | | | | | | |
| BUF12C | 3202# | 3249 | 3282 | 3286 | 3292 | 3303 | | | | | | | | | | | |
| BUFM10 | 3224 | 3226# | | | | | | | | | | | | | | | |
| BUFM12 | 3249# | 3257 | | | | | | | | | | | | | | | |
| BUFM13 | 3239 | 3252# | | | | | | | | | | | | | | | |
| BUFM20 | 3228# | | | | | | | | | | | | | | | | |
| BUFM8 | 3241 | 3270# | | | | | | | | | | | | | | | |
| BUFM8L | 3271# | | | | | | | | | | | | | | | | |
| BUFM8R | 3272 | 3284 | 3290 | 3298# | | | | | | | | | | | | | |
| BUFM90 | 3250 | 3268 | 3280 | 3301 | 3315# | | | | | | | | | | | | |
| BUFM93 | 3226 | 3331# | | | | | | | | | | | | | | | |
| BUFM94 | 3233 | 3237 | 3335# | | | | | | | | | | | | | | |
| BUFM95 | 3333 | 3339# | | | | | | | | | | | | | | | |
| BUFMA | 3238 | 3248# | | | | | | | | | | | | | | | |
| BUFMAM | 1832 | 3151 | 3223# | | | | | | | | | | | | | | |
| BUFMD1 | 3242 | 3274# | | | | | | | | | | | | | | | |
| BUFMD2 | 3243 | 3282# | | | | | | | | | | | | | | | |
| BUFMD3 | 3244 | 3286# | | | | | | | | | | | | | | | |
| BUFMD4 | 3245 | 3292# | | | | | | | | | | | | | | | |
| BUFMD5 | 3246 | 3303# | | | | | | | | | | | | | | | |
| BUFME | 3240 | 3259# | | | | | | | | | | | | | | | |
| BUFTBL | 3235 | 3237# | | | | | | | | | | | | | | | |
| CK6T10 | 2442# | 2448 | | | | | | | | | | | | | | | |
| CK6T20 | 2441 | 2445# | | | | | | | | | | | | | | | |
| CK6TOT | 2438# | 2607 | 2646 | 2684 | | | | | | | | | | | | | |
| CKCN05 | 1251 | 1254# | | | | | | | | | | | | | | | |
| CKCN10 | 1269# | | | | | | | | | | | | | | | | |
| CKCN20 | 1257 | 1275# | | | | | | | | | | | | | | | |
| CKCN30 | 1262 | 1285# | | | | | | | | | | | | | | | |
| CKCN40 | 1287 | 1292 | 1296# | | | | | | | | | | | | | | |
| CKCN45 | 1301# | | | | | | | | | | | | | | | | |
| CKCN50 | 1282 | 1308# | | | | | | | | | | | | | | | |
| CKCN60 | 1321 | 1330# | | | | | | | | | | | | | | | |
| CKCN70 | 1316 | 1337# | | | | | | | | | | | | | | | |
| CKCN80 | 1345 | 1354# | | | | | | | | | | | | | | | |
| CKCHNG | 1267 | 1273 | 1278 | 1294 | 1299 | 1304 | 1306 | 1311 | 1326 | 1328 | 1333 | 1335 | 1340 | 1350 | 1352 | 1357 | 1358 | 1363# |
| CKCHOK | 1272 | 1283 | 1288 | 1293 | 1305 | 1327 | 1334 | 1351 | 1360# | | | | | | | | | |
| CKCNTS | 1246# | 3108 | | | | | | | | | | | | | | | |
| CKFC10 | 1734 | 1737# | | | | | | | | | | | | | | | |
| CKFC20 | 1739 | 1746# | | | | | | | | | | | | | | | |
| CKFC80 | 1777 | 1781# | | | | | | | | | | | | | | | |
| CKFC90 | 1748 | 1779 | 1783# | | | | | | | | | | | | | | |
| CKFC95 | 1741 | 1747 | 1787# | | | | | | | | | | | | | | |
| CKFCA | 616 | 1734# | 3068 | 3079 | 3105 | | | | | | | | | | | | |
| CKMAJ | 2306# | 2466 | 2473 | 2482 | | | | | | | | | | | | | |
| CKMAJ9 | 2312 | 2318# | | | | | | | | | | | | | | | |
| CKMISM | 2336# | 2470 | 2477 | 2489 | | | | | | | | | | | | | |
| CKMS30 | 2352 | 2369# | | | | | | | | | | | | | | | |
| CKMS80 | 2358 | 2364 | 2371 | 2376# | | | | | | | | | | | | | |
| CKMS90 | 2337 | 2347 | 2379# | | | | | | | | | | | | | | |
| CKRCV | 1824 | 1906# | | | | | | | | | | | | | | | |
| CKRCV1 | 1909# | | | | | | | | | | | | | | | | |
| CKRCV2 | 1910 | 1914# | | | | | | | | | | | | | | | |
| CKRCV3 | 1916 | 1920# | | | | | | | | | | | | | | | |
| CKRCV4 | 1922 | 1928# | | | | | | | | | | | | | | | |
| CKRCV5 | 1930 | 1937# | | | | | | | | | | | | | | | |
| CKRCV6 | 1939 | 1943# | | | | | | | | | | | | | | | |
| CKRCV9 | 1946# | | | | | | | | | | | | | | | | |
| CLR4SG | 1513# | 2624 | | | | | | | | | | | | | | | |
| CLR6SG | 608 | 1501# | 2623 | | | | | | | | | | | | | | |
| CLRRAM | 651# | 652 | | | | | | | | | | | | | | | |
| CLRSBF | 1544# | 1898 | | | | | | | | | | | | | | | |
| CLRSM1 | 1528# | 1530 | 1554 | | | | | | | | | | | | | | |
| CLRSMB | 1525# | 1778 | 2125 | 3050 | | | | | | | | | | | | | |
| CLRTOO | 1503 | 1515 | 1527# | | | | | | | | | | | | | | |
| CLRVER | 2622# | 3049 | 3323 | | | | | | | | | | | | | | |
| COMRST | 155# | 1938 | | | | | | | | | | | | | | | |
| CONFIG | 269# | 881 | 2517 | 2536 | 2549 | | | | | | | | | | | | |
| CPARTY | 935 | 1132 | 1153# | | | | | | | | | | | | | | |
| DIBEEP | 154# | 1929 | | | | | | | | | | | | | | | |
| DISCAN | 152# | 1915 | | | | | | | | | | | | | | | |
| DRSM13 | 1417 | 1427# | | | | | | | | | | | | | | | |
| DRSM1X | 1457 | 1466# | | | | | | | | | | | | | | | |
| DRSM3X | 1451 | 1461# | | | | | | | | | | | | | | | |
| DRSM4X | 1445 | 1462# | | | | | | | | | | | | | | | |
| DRSM5X | 1437 | 1441# | | | | | | | | | | | | | | | |
| DRSM7B | 1428 | 1465# | | | | | | | | | | | | | | | |
| DRSM7C | 1431 | 1467# | | | | | | | | | | | | | | | |
| DRSM8 | 1419 | 1471# | | | | | | | | | | | | | | | |
| DRSMA | 1416 | 1426# | | | | | | | | | | | | | | | |
| DRSMD1 | 1420 | 1453# | | | | | | | | | | | | | | | |
| DRSMD2 | 1421 | 1459# | | | | | | | | | | | | | | | |
| DRSMD3 | 1422 | 1447# | | | | | | | | | | | | | | | |
| DRSMD4 | 1423 | 1439# | | | | | | | | | | | | | | | |
| DRSMD5 | 1424 | 1433# | | | | | | | | | | | | | | | |
| DRSMDN | 1469 | 1477# | | | | | | | | | | | | | | | |

```
DRSHE    1418  1430#
DRSTBL   1413  1415#
DRSUM    266#  1477
DRSUMT   1407# 3132  3138
DRTIMR   178#
DRVRNG   1411  1415  1482#
E1000H   134#  808   856   1033
E2000H   135#
E200HS   132#
E480HS   133#
E4CH2S   126#
E6CH2S   127#
E80HS    131#  853
EBDLT    46#   377   695   698   701   787   862   913   944   3089  3096  3140  3183  3185
EBDTON   138#
EBFREQ   102#  3045  3149  3326  3336
ECASE1   1668  1676#
ECASE2   1669  1685#
ECASE3   1671  1696#
ECASE4   1672  1693  1705#
EDEC8L   74#
EDEC8R   75#
EDECAL   76#
EDECAR   77#
EDECB7   83#
EDECBE   78#
EDECBF   79#
EDECBK   82#   1988
EDECD    81#   2651  2689  2846
EDECE    80#   2651  2717
EDECOO   73#
EDISHS   55#
EDRDLF   162#
EDRDLY   161#  3061
EFCRST   68#   534   835   864   1043
EFRRST   66#   1783
EGDLT    45#   376   695   698   701   727   730   786   851   861   913   3088  3095  3141  3171
EGDLTW   160#  3063
EGDTON   137#  3145
EHCNTL   170#  366
ELASDB   44#   377   569   669   831   855   861   914   1030  1056  1911  1917  3170
EMOD10   1660# 2115
EMODCK   1715#
EMODSM   1681  1711#
EMSNBY   147#
EMTREB   41#   377   669   682   703   734   862   3171
ENBEEP   153#  1921
ENSCAN   151#  1909
EOCIA    67#   363   1136
EP12     42#   569   831   1814  1820
EP13     43#   569   831
EPARRD   64#
EPRDEC   69#   1771
ER4B1    98#
ER4B2    99#
ER4B4    101#
ER4B6    103#
ER4B7    104#
ER6B4    119#
ER6B5    120#
ER6B6    121#
ER6B7    122#
ESBFUL   100#  1545  3045  3327
ESCNG    97#   613   3075
ESENT    52#
ESR4CH   88#
ESRCHR   87#
ESRF13   89#
ESRPER   90#
ESRRD    65#   1049  1737
ESRSDT   91#
ESUP8    144#  1812  1894
EJEST    38#   536   569   765
ETMARK   40#   583   585   597   599   765
ETONCT   140#  334   796   845   878
ETONE    47#   328   330   347   569   831
ETONFQ   141#  350
ETRMBY   148#  1850  3320
EUP2SP   53#
EVER00   108#
EVER13   110#
EVER8    112#
EVERA    109#
EVERD1   113#
EVERD2   114#
EVERD3   115#
EVERD4   116#
EVERD5   117#
```

```
EVERE   111#
EVLSIR   54#    828     830
EWAIT   159#    160     161     162     1743    1781
EXSBF2  2392#   2487
EXSBF3  2394#   2476
EXSBF4  2396#   2469
EXSBFL  2402#   2407
EXSBFX  2393    2395    2397#
GETLUP  615#    619
GOOD10  3129    3137#
GOOD20  3134    3140#
GOOD30  3144    3146#
GOODRD  3119    3127#
HCOM03  1817#   1819
HCOM05  1808    1828#
HCOM10  1829    1835#
HCOM20  1854    1857#
HCOM40  1863#
HCOM50  1847    1867#
HCOM60  1871#
HCOM70  1851    1891#
HCOM80  1864    1876    1894#
HCOM90  1831    1835    1860    1897    1899#   3078    3094    3104    3117    3124    3127
HCOMM    758    1806#   2511    3055    3069
HCTBLI  1869    1879#
IFRSMG  156#    1944
INCHNB  2010#   2186    2236    2288
INCLNB  2016#   2162    2219    2271
INCREM  1098    1100#
INCX90  2014    2023#
INCXRT  2013    2020    2027#
INTTRP  284#
L4S1    212#    1456    1472    2759    2869    3271    3278
L4S2    213#
L4SCNT  214#    2093    2480
L4STOT  215#    1264    1301    2749    2854    2260    2420    2468    2610    2649    2662    2687    2715    2844    2859    3202    3253    3261
L6S1    200#    634     1280    1285    1467
        3264    3274
L6S2    201#    1290    2277
L6SCNT  202#    622     2257    2270    2274    2287    2465
L6STOT  203#    1259    1275    2291    2438    2710    2741    2839
LOOPCX  636#    643     648
LSTUSD  271#
MAJSG0  2467    2470#
MAJSG1  2474    2477#
MAJSG4  2482#   2493
MAJSG5  2483    2489#
MAJSGS  2465#   2510
MCH2BY  2044#   2157    2181
MCH3BY  2046#   2215    2232
MCH4BY  2048#   2267    2284
MCHXBY  2045    2047    2049#   2054
MCHXRT  2051    2055#   2763    2807    2811    2817    2864    2878    2909    2913    2944    2948    2979    2983    3019    3023    3029
MOD104  1638#   2760    2421    2425    2860
MOD106  1647#                                   3279    3288    3294    3296    3298    3300    3305    3307    3309    3311    3313
MOV2BY  1566#   2151    2175    3277    3279    3288    3294    3296
MOV3BY  1568#   1662    2212    2229    3203    3205    3262    3275
MOV4BY  1570#   2264    2281
MOVXBY  1567    1569    1571#   1575
MRB0    176#
MRB1    186#
MRB1R3  187#
MRB1R4  188#
MTBC10  3157    3160#
MTRC20  3161#   3162
MTRCHK  3054    3084    3103    3155#
MTRE20  3178#   3184    3186
MTRE30  3179#   3180
MTRERR  3166    3170#
N1S1    222#    1444    2947    3028    3295    3312
N1S2    223#
N1SCNT  224#    2107
N1STOT  225#    1337    2938    3013
N2S1    227#    1460    2908    3283
N2S2    228#
N2SCNT  229#    2108
N2STOT  230#    1323    2898    2806    3018    3287    3308
N3S1    232#    1436    1450    2806    3018    3287    3308
N3S2    233#
N3SCNT  234#    2109
N3STOT  235#    1330    1354    2791    3003
N4S1    237#    1442    2978    3297    3304
N4S2    238#
N4SCNT  239#    2110
N4STOT  240#    1313    2968    2810    2943    3289    3293
N5S1    242#    1440    1448    2810    2943    3289    3293
N5S2    243#
N5SCNT  244#    2111
N5STOT  245#    1318    1347    2796    2933    3276    3310
N6S1    247#    1434    1454    2863    3022    3276    3310
```

| Symbol | | | | | | | | | | | | | | |
|---|---|---|---|---|---|---|---|---|---|---|---|---|---|---|
| N6S2 | 248# | | | | | | | | | | | | | |
| N6SCNT | 249# | 2112 | | | | | | | | | | | | |
| N6STOT | 250# | 1296 | 1342 | 2849 | 3008 | | | | | | | | | |
| NEXT4 | 1087 | 1164# | | | | | | | | | | | | |
| POW00 | 819# | 825 | | | | | | | | | | | | |
| POW20 | 861# | | | | | | | | | | | | | |
| POW25 | 867# | 868 | | | | | | | | | | | | |
| POW30 | 874# | 875 | | | | | | | | | | | | |
| POWUP | 281 | 820# | | | | | | | | | | | | |
| PRO4C2 | 2146 | 2154# | | | | | | | | | | | | |
| PRO4C3 | 2152 | 2160# | | | | | | | | | | | | |
| PRO4C4 | 2158 | 2165# | | | | | | | | | | | | |
| PRO4C6 | 2170 | 2178# | | | | | | | | | | | | |
| PRO4C7 | 2176 | 2184# | | | | | | | | | | | | |
| PRO4C8 | 2182 | 2189# | | | | | | | | | | | | |
| PRO4CH | 2094 | 2096 | 2106 | 2141# | | | | | | | | | | |
| PRO6C2 | 2210 | 2215# | | | | | | | | | | | | |
| PRO6C3 | 2213 | 2218# | | | | | | | | | | | | |
| PRO6C4 | 2216 | 2222# | | | | | | | | | | | | |
| PRO6C6 | 2227 | 2232# | | | | | | | | | | | | |
| PRO6C7 | 2230 | 2235# | | | | | | | | | | | | |
| PRO6C8 | 2233 | 2239# | | | | | | | | | | | | |
| PRO6CH | 2123 | 2205# | | | | | | | | | | | | |
| PRO7C2 | 2262 | 2267# | | | | | | | | | | | | |
| PRO7C3 | 2265 | 2270# | | | | | | | | | | | | |
| PRO7C4 | 2268 | 2274# | | | | | | | | | | | | |
| PRO7C6 | 2279 | 2284# | | | | | | | | | | | | |
| PRO7C7 | 2282 | 2287# | | | | | | | | | | | | |
| PRO7C8 | 2285 | 2291# | | | | | | | | | | | | |
| PRO7CH | 2087 | 2117 | 2122 | 2257# | | | | | | | | | | |
| PROC05 | 2082 | 2089# | | | | | | | | | | | | |
| PROC3L | 2084# | | | | | | | | | | | | | |
| PROC8 | 2090# | | | | | | | | | | | | | |
| PROC8L | 2093# | | | | | | | | | | | | | |
| PROC8R | 2092 | 2095# | | | | | | | | | | | | |
| PROCA | 2089 | 2119# | | | | | | | | | | | | |
| PROCAL | 2122# | | | | | | | | | | | | | |
| PROCAR | 2121 | 2123# | | | | | | | | | | | | |
| PROCD | 2085# | 2099 | | | | | | | | | | | | |
| PROCDN | 2100# | | | | | | | | | | | | | |
| PROCDX | 2077 | 2098# | | | | | | | | | | | | |
| PROCE | 2078 | 2114# | | | | | | | | | | | | |
| PROCEX | 2116 | 2125# | 2163 | 2187 | 2193 | 2220 | 2237 | 2241 | 2272 | 2289 | 2293 | | | |
| PROCNT | 2103 | 2107# | | | | | | | | | | | | |
| PROCRT | 2075 | 2126# | | | | | | | | | | | | |
| PROCSG | 617 | 2073# | 3106 | | | | | | | | | | | |
| R4S1 | 217# | 1463 | 1474 | 2762 | 2816 | 2912 | 2982 | 3299 | 3306 | | | | | |
| R4S2 | 218# | | | | | | | | | | | | | |
| R4SCNT | 219# | 2095 | | | | | | | | | | | | |
| R4STOT | 220# | 1269 | 1308 | 2754 | 2801 | 2903 | 2973 | | | | | | | |
| R6S1 | 205# | 645 | 1465 | 2208 | 2424 | 2475 | 3204 | | | | | | | |
| R6S2 | 206# | 2225 | | | | | | | | | | | | |
| R6SCNT | 207# | 629 | 2205 | 2218 | 2222 | 2235 | 2472 | | | | | | | |
| R6STOT | 208# | 1254 | 2239 | 2445 | 2720 | 2745 | | | | | | | | |
| RDT05 | 3047 | 3050# | | | | | | | | | | | | |
| RDT10 | 3054# | 3059 | 3070 | | | | | | | | | | | |
| RDT15 | 3063# | | | | | | | | | | | | | |
| RDT20 | 3056 | 3068# | | | | | | | | | | | | |
| RDT30 | 3064 | 3074# | | | | | | | | | | | | |
| RDT35 | 3078# | 3087 | 3090 | | | | | | | | | | | |
| RDT40 | 3082 | 3094# | | | | | | | | | | | | |
| RDT50 | 3103# | 3113 | 3122 | | | | | | | | | | | |
| RDT60 | 3099 | 3106# | | | | | | | | | | | | |
| RDT70 | 3110 | 3117# | | | | | | | | | | | | |
| RDT90 | 3148# | | | | | | | | | | | | | |
| RDTAG | 885 | 3044# | 3098 | 3125 | 3135 | 3152 | | | | | | | | |
| RSTTRP | 280# | 778 | 933 | 1067 | 1941 | | | | | | | | | |
| SBFEND | 260# | | | | | | | | | | | | | |
| SBFPNT | 254# | 1548 | 1837 | 1867 | 3321 | | | | | | | | | |
| SBSTRT | 258# | 1549 | 3322 | | | | | | | | | | | |
| SBUF | 257# | 258 | 259 | 1551 | 3228 | | | | | | | | | |
| SBUFAD | 256# | | | | | | | | | | | | | |
| SBUFSZ | 259# | 1552 | | | | | | | | | | | | |
| SCNBUF | 197# | 1525 | 1660 | 1664 | 1715 | 1749 | 1962 | 1972 | 2073 | 2145 | 2169 | 2209 | 2226 | 2261 | 2278 | 3080 |
| SCNFLG | 177# | | | | | | | | | | | | | |
| SDATA | 363# | 1788 | | | | | | | | | | | | |
| SDATA4 | 366# | | | | | | | | | | | | | |
| SDATA9 | 367 | 380# | | | | | | | | | | | | |
| SDATAH | 368# | | | | | | | | | | | | | |
| SEGBUF | 196# | | | | | | | | | | | | | |
| SEGONE | 1092 | 1099# | | | | | | | | | | | | |
| SGM90 | 1201 | 1206 | 1211# | | | | | | | | | | | |
| SGMTCH | 1090 | 1095 | 1198# | | | | | | | | | | | |
| SGSUM4 | 1588# | 1638 | | | | | | | | | | | | |
| SGSUM6 | 1592# | 1647 | 1680 | 1706 | | | | | | | | | | |
| SGSUMR | 1612 | 1617# | | | | | | | | | | | | |
| SGSUMX | 1590 | 1593# | | | | | | | | | | | | |
| SGSUMY | 1600 | 1605# | | | | | | | | | | | | |
| STACK | 183# | 393 | | | | | | | | | | | | |

| | | | | | | | | | | | | | | | | | | |
|---|---|---|---|---|---|---|---|---|---|---|---|---|---|---|---|---|---|---|
| SUM12C | 2420# | 2616 | 2659 | 2692 | 1449 | 1455 | 1462 | 1464 | 1473 | 1475 | | | | | | | | |
| SUM2BY | 1392# | 1435 | 1441 | 1443 | | | | | | | | | | | | | | |
| SUM3BY | 1390# | 1466 | | | | | | | | | | | | | | | | |
| SUM4BY | 1388# | 1468 | | | | | | | | | | | | | | | | |
| SVP4SJ | 2070# | 2091 | 2101 | | | | | | | | | | | | | | | |
| SVP4SN | 1962# | 2070 | | | | | | | | | | | | | | | | |
| SVP6SJ | 2071# | 2086 | 2114 | 2120 | | | | | | | | | | | | | | |
| SVP6SN | 1972# | 2071 | | | | | | | | | | | | | | | | |
| SVPXEX | 1970 | 1986# | | | | | | | | | | | | | | | | |
| SVPXRT | 1990 | 2077# | | | | | | | | | | | | | | | | |
| TASAVE | 191# | | | | | | | | | | | | | | | | | |
| TBER4J | 2787# | 2821 | 2917 | 2952 | 2987 | 3033 | | | | | | | | | | | | |
| TBER6J | 2788# | 2882 | | | | | | | | | | | | | | | | |
| TBERR4 | 2624# | 2743 | 2747 | 2767 | 2787 | | | | | | | | | | | | | |
| TBERR6 | 2617 | 2623# | 2667 | 2693 | 2722 | 2788 | | | | | | | | | | | | |
| TBLK1 | 2541 | 2839# | | | | | | | | | | | | | | | | |
| TBLK13 | 2525 | 2646# | | | | | | | | | | | | | | | | |
| TBLK2 | 2528 | 2684# | | | | | | | | | | | | | | | | |
| TBLK3 | 2560 | 2898# | | | | | | | | | | | | | | | | |
| TBLK4 | 2567 | 2933# | | | | | | | | | | | | | | | | |
| TBLK5 | 2554 | 2968# | | | | | | | | | | | | | | | | |
| TBLK6 | 2557 | 2791# | | | | | | | | | | | | | | | | |
| TBLK7 | 2564 | 3003# | | | | | | | | | | | | | | | | |
| TBLK8 | 2544 | 2741# | | | | | | | | | | | | | | | | |
| TBLKA | 2522 | 2607# | | | | | | | | | | | | | | | | |
| TBLKE | 2532 | 2710# | | | | | | | | | | | | | | | | |
| TBNONE | 2608 | 2614 | 2628# | 2647 | 2652 | 2657 | 2685 | 2690 | 2713 | 2718 | 2752 | 2757 | 2789 | 2976 | 3006 | 3011 | 3016 | |
| TBNONJ | 2789# | 2794 | 2799 | 2804 | 2842 | 2847 | 2852 | 2857 | 2901 | 2906 | 2936 | 2941 | 2971 | | | | | |
| TCKCNT | 623# | 631 | | | | | | | | | | | | | | | | |
| TCNT1 | 167# | 977 | 1035 | 1099 | | | | | | | | | | | | | | |
| TCNT2 | 168# | 1097 | | | | | | | | | | | | | | | | |
| TERR02 | 792# | | | | | | | | | | | | | | | | | |
| TERR04 | 795# | 806 | | | | | | | | | | | | | | | | |
| TERR06 | 798# | 799 | | | | | | | | | | | | | | | | |
| TERR08 | 803# | 804 | | | | | | | | | | | | | | | | |
| TERR10 | 793 | 808# | | | | | | | | | | | | | | | | |
| TERR12 | 809# | 810 | | | | | | | | | | | | | | | | |
| TERRWT | 777 | 786# | 3174 | | | | | | | | | | | | | | | |
| TEST1 | 574# | 605 | | | | | | | | | | | | | | | | |
| TEST2 | 576# | 604 | | | | | | | | | | | | | | | | |
| TEST3 | 579# | 579 | | | | | | | | | | | | | | | | |
| TEST4 | 592# | 592 | | | | | | | | | | | | | | | | |
| TH000 | 909# | 937 | 942 | 961 | 964 | 968 | 992 | | | | | | | | | | | |
| TH005 | 378 | 915# | 916 | 925 | 945 | 963 | | | | | | | | | | | | |
| TH010 | 915 | 921# | | | | | | | | | | | | | | | | |
| TH012 | 933# | | | | | | | | | | | | | | | | | |
| TH014 | 932 | 935# | | | | | | | | | | | | | | | | |
| TH015 | 939 | 949# | | | | | | | | | | | | | | | | |
| TH020 | 950 | 954# | | | | | | | | | | | | | | | | |
| TH029 | 953 | 959# | | | | | | | | | | | | | | | | |
| TH030 | 962 | 968# | | | | | | | | | | | | | | | | |
| TH050 | 978# | 988 | | | | | | | | | | | | | | | | |
| TH055 | 979 | 983# | | | | | | | | | | | | | | | | |
| TH059 | 982 | 985# | | | | | | | | | | | | | | | | |
| THSND | 974 | 987 | 991 | 1129# | 1130 | | | | | | | | | | | | | |
| TIME02 | 309 | 312# | | | | | | | | | | | | | | | | |
| TIME05 | 314 | 317# | | | | | | | | | | | | | | | | |
| TIME10 | 318 | 321# | 348 | | | | | | | | | | | | | | | |
| TIME20 | 322# | 351 | | | | | | | | | | | | | | | | |
| TIME30 | 306 | 327# | | | | | | | | | | | | | | | | |
| TIME40 | 329 | 332# | | | | | | | | | | | | | | | | |
| TIME45 | 337 | 340# | | | | | | | | | | | | | | | | |
| TIME50 | 342 | 345# | | | | | | | | | | | | | | | | |
| TIME60 | 333 | 346 | 350# | | | | | | | | | | | | | | | |
| TIMER | 303# | | | | | | | | | | | | | | | | | |
| TIMREG | 180# | | | | | | | | | | | | | | | | | |
| TIMTRP | 287# | | | | | | | | | | | | | | | | | |
| TMOT10 | 674# | 675 | | | | | | | | | | | | | | | | |
| TMOT20 | 683# | | | | | | | | | | | | | | | | | |
| TMOT22 | 684# | 696 | 699 | | | | | | | | | | | | | | | |
| TMOT24 | 685# | 688 | | | | | | | | | | | | | | | | |
| TMOT28 | 692 | 701# | | | | | | | | | | | | | | | | |
| TMOT40 | 705# | 706 | | | | | | | | | | | | | | | | |
| TMOT50 | 679 | 712# | | | | | | | | | | | | | | | | |
| TMOT60 | 713# | 728 | 731 | | | | | | | | | | | | | | | |
| TMOT80 | 714# | 717 | | | | | | | | | | | | | | | | |
| TMOT90 | 709 | 724 | 734# | | | | | | | | | | | | | | | |
| TMOT95 | 720 | 740# | | | | | | | | | | | | | | | | |
| TMOTOR | 669# | 770 | | | | | | | | | | | | | | | | |
| TMWAIO | 1228# | 1229 | | | | | | | | | | | | | | | | |
| TMWAIT | 1032 | 1223# | | | | | | | | | | | | | | | | |
| TONCNT | 189# | | | | | | | | | | | | | | | | | |
| TONLTH | 190# | | | | | | | | | | | | | | | | | |
| TPON | 747# | 840 | | | | | | | | | | | | | | | | |
| TPON15 | 857# | 858 | | | | | | | | | | | | | | | | |
| TPON20 | 748 | 752# | | | | | | | | | | | | | | | | |
| TPON30 | 753 | 757# | | | | | | | | | | | | | | | | |
| TPON40 | 760 | 764# | | | | | | | | | | | | | | | | |
| TPON50 | 766 | 770# | | | | | | | | | | | | | | | | |

| | | | | | |
|---|---|---|---|---|---|
| TPON60 | 771 | 775# | | | |
| TPON90 | 750 | 755 | 762 | 768 | 773 | 777# |
| TPORET | 775 | 841# | | | |
| TRAM | 457# | 752 | | | |
| TRAM10 | 458# | 460 | | | |
| TRAM20 | 464# | 467 | | | |
| TRAM30 | 471# | 479 | | | |
| TRAM40 | 483# | 491 | | | |
| TRAM50 | 495# | 503 | | | |
| TRAM60 | 507# | 515 | | | |
| TRAMER | 466 | 487 | 511 | 518# | |
| TRARET | 518 | 753# | | | |
| TR010 | 406# | 420 | | | |
| TR020 | 415# | 418 | | | |
| TR050 | 415 | 426# | | | |
| TRONSM | 393# | 747 | | | |
| TROPG0 | 382# | 433 | | | |
| TROPG1 | 434 | 521# | | | |
| TROPG2 | 435 | 659# | | | |
| TROPG3 | 436 | 887# | | | |
| TROPG4 | 437 | 1109# | | | |
| TROPG5 | 438 | 1232# | | | |
| TROPG6 | 439 | 1375# | | | |
| TROPG7 | 440 | 1485# | | | |
| TROPG8 | 441 | 1792# | | | |
| TROPG9 | 442 | 2057# | | | |
| TROPGA | 443 | 2243# | | | |
| TROPGB | 444 | 2496# | | | |
| TROPGC | 445 | 2770# | | | |
| TROPGD | 446 | 3036# | | | |
| TROPGE | 447 | 3188# | | | |
| TROPGF | 448 | 3341# | | | |
| TRORET | 422 | 748# | | | |
| TRPTAB | 407 | 433# | | | |
| TRYBLK | 2519 | 2522# | | | |
| TSC02 | 1037# | 1039 | | | |
| TSC04 | 1048# | 1052 | | | |
| TSC05 | 1050# | | | | |
| TSC06 | 1051# | 1060 | 1096 | 1107 | |
| TSC07 | 1059# | 1084 | | | |
| TSC08 | 1050 | 1068# | | | |
| TSC09 | 1066 | 1077# | | | |
| TSC10 | 1079 | 1086# | | | |
| TSC11 | 1067# | 1070 | | | |
| TSC12 | 1062# | 1071 | | | |
| TSC20 | 1056# | | | | |
| TSCBUF | 169# | 1064 | 1068 | 1082 | 1086 | 1199 |
| TSCNT | 969 | 1030# | | | |
| TSEG1 | 165# | 374 | 911 | 1077 | 1089 |
| TSEG2 | 166# | 1080 | 1094 | | |
| TST31 | 582 | 585# | | | |
| TST32 | 584 | 589# | | | |
| TST41 | 596 | 599# | | | |
| TST42 | 598 | 603# | | | |
| TTA90 | 627 | 639 | 654# | | |
| TTACHK | 635 | 656# | | | |
| TTAG | 534# | 764 | | | |
| TTARET | 654 | 765# | | | |
| TTATAB | 532# | 537 | | | |
| UNPK1 | 542# | 565 | | | |
| UNPK2 | 546# | 563 | | | |
| VER13 | 2526 | 2585# | | | |
| VER8 | 2545 | 2583# | | | |
| VERA | 2523 | 2586# | | | |
| VERD1 | 2542 | 2575# | | | |
| VERD2 | 2561 | 2574# | | | |
| VERD3 | 2558 | 2573# | | | |
| VERD4 | 2568 | 2572# | | | |
| VERD5 | 2565 | 2571# | | | |
| VERE | 2533 | 2584# | | | |
| VERFLG | 179# | | | | |
| VERT05 | 2538 | 2541# | | | |
| VERT10 | 2529 | 2548# | | | |
| VERT15 | 2551 | 2554# | | | |
| VERT20 | 2555 | 2564# | | | |
| VERT80 | 2580# | | | | |
| VERT90 | 2588# | | | | |
| VERTAG | 2510# | 3118 | | | |
| WRKBUF | 263# | 1661 | 1676 | 1685 | 1696 | 1705 |

CROSS REFERENCE COMPLETE

It can be seen therefore that the use of a common interface according to the present invention in a combined scanner and scale system provides significant advantages over prior art systems in which the scanner and the scale do not share an interface. Only a single connector cable and only a single port of the cash register system are require to connect both the scale and the scanner to the cash register system. Further the costs associated with the scanner and the scale having dedicated interface circuits are eliminated by the sharing of an interface circuit according to the present invention.

Having described the invention in detail and by reference to the preferred embodiment thereof, it will be apparent that other modifications and variations are possible without departing from the scope of the invention defined in the appended claims.

What is claimed is:

1. A data gathering system for use in a checkout counter to determine information relating to products to be purchased and to provide such information to a cash register system, comprising:
    optical scanning means supported on a subplatter for reading coded labels on products presented to said data gathering system, said optical scanning means including a bar code decoder circuit for decoding scan signals to provide coded label data, a scanner microprocessor for correlating and supplying coded label data, and scanner memory means for storing control software for use by said scanner microprocessor,
    scale means supported within said checkout counter for determining weights of said products, said scale means including said subplatter located below the upper surface of said checkout counter, said scale means capable of supplying weight data to said bar code decoder circuit of said optical scanning means, and
    a common interface circuit, responsive to both said scale means and said optical scanning means, for providing weight data and coded label data to said cash register system, wherein said scanner microprocessor of said optical scanning means is capable of supplying said coded label data to said common interface circuit, and said scale means is capable of supplying said weight data to said common interface circuit via said scanner microprocessor without alteration.

2. A data gathering system for use in a checkout counter as claimed in claim 1, in which said subplatter includes scanner locator means for positioning said optical scanning means on said subplatter for assembly of said data gathering system.

3. A data gathering system for use in a checkout counter as claimed in claim 1 further comprising support means for suspending said data gathering system within said checkout counter, said scale means being secured to said support means.

4. A data gathering system for use in a checkout counter as claimed in claim 1, in which said common interface circuit comprises an interface microprocessor, responsive to coded label data from said optical scanning means and to weight data from said scale means, interface memory means for storing control software for use by said interface microprocessor, and a driver circuit, responsive to said interface microprocessor, for supplying weight data and coded label data to said cash register system.

5. A data gathering system for use in a checkout counter as claimed in claim 1, in which said scale means supplied weight data directly to said common interface circuit.

6. A data gathering system for use in a checkout counter to determine information relating to products to be purchased, including weight data and coded label data, and to supply said information to a cash register system, said counter defining an upper surface upon which products are placed for access to said data gathering system, comprising:
    support means for suspending said data gathering system within said checkout counter,
    optical scanning means supported on a subplatter for reading coded labels on products presented to said data gathering system, said optical scanning means having an upper surface including an optical scanning window, said optical scanning means being sized such that its upper surface is substantially aligned with the upper surface of said checkout counter when supported upon said subplatter, said optical scanning means including a bar code decoder circuit for decoding scan signals to provide coded label data, a scanner microprocessor for correlating and supplying coded label data, and scanner memory means for storing control software for use by said scanner microprocessor,
    scale means secured to said support means for determining weights of said products, said scale means including said subplatter located below the upper surface of said checkout counter, said scale means capable of supplying weight data to said bar code decoder circuit of said optical scanning means, and
    a common interface circuit, responsive to both said scale means and said optical scanning means, for providing weight data and coded label data to said cash register system, wherein said scanner microprocessor of said optical scanning means is capable of supplying said coded label data to said common interface circuit, and said scale means is capable of supplying said weight data to said common interface circuit via said scanner microprocessor without alteration.

7. A data gathering system for use in a checkout counter as claimed in claim 6 wherein said subplatter includes scanner locator means for positioning said optical scanning means on said subplatter for assembly of said data gathering system.

8. A data gathering system for use in a checkout counter as claimed in claim 6, in which said common interface circuit comprises an interface microprocessor, responsive to coded label data from said optical scanning means and to weight data from said scale means, memory means for storing control software for use by said interface microprocessor, and a driver circuit, responsive to said interface microprocessor, for supplying weight data and coded label data to said cash register system.

9. A data gathering system for use in a checkout counter as claimed in claim 6, in which said scale means supplies weight data directly to said common interface circuit.

10. A data gathering system for use in a checkout counter as claimed in claim 6 further comprising cables connected between said scale means and said optical scanning means for conducting electrical signals and power, said cables being sized, positioned and secured to prevent interference with the operation of said scale means.

* * * * *